(12) United States Patent
Ponnusamy et al.

(10) Patent No.: US 11,256,392 B2
(45) Date of Patent: Feb. 22, 2022

(54) UNIFIED INTERFACES FOR PAIRED USER COMPUTING DEVICES

(71) Applicant: MICROSOFT TECHNOLOGY LICENSING, LLC, Redmond, WA (US)

(72) Inventors: Kruthika Ponnusamy, Redmond, WA (US); Shivaram Prabhakar, Bothell, WA (US); Ashish Mehta, Issaquah, WA (US); Arash Ghanaie-Sichanie, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/724,111

(22) Filed: Dec. 20, 2019

(65) Prior Publication Data

US 2021/0136129 A1    May 6, 2021

Related U.S. Application Data

(60) Provisional application No. 62/929,764, filed on Nov. 1, 2019.

(51) Int. Cl.
*G06F 3/0482* (2013.01)
*G06F 3/0484* (2013.01)
(Continued)

(52) U.S. Cl.
CPC .......... *G06F 3/0482* (2013.01); *G06F 3/0481* (2013.01); *G06F 3/0484* (2013.01);
(Continued)

(58) Field of Classification Search
None
See application file for complete search history.

(56) References Cited

U.S. PATENT DOCUMENTS 7,279,060 B2 * 10/2007 Chen .................. G02B 1/14
156/230
7,554,571 B1    6/2009 Beck et al.
(Continued)

FOREIGN PATENT DOCUMENTS

CN    103053150 A    4/2013
CN    104685864 A    6/2015
(Continued)

OTHER PUBLICATIONS

J Krumm, K Hinckley; "The nearme wireless proximity server"; Sep. 7-10, 2004 (Year: 2004).*
(Continued)

*Primary Examiner* — Jordany Nunez
(74) *Attorney, Agent, or Firm* — NovoTechIP International PLLC

(57) ABSTRACT

Techniques for providing unified user interfaces among actively paired devices, including determining that first and second devices are actively paired together at a first time based on a determination that the first device is in physical proximity to the second device when the first and second devices are both authenticated for a same user service account; receiving, at the first time, an indication of an actuation of a user interface control associated with a user activity and presented by the first device; and causing, in response to the receipt of the indication and the determination that the first and second devices are actively paired together at the first time, the second device to present a user interface associated with the user activity.

20 Claims, 41 Drawing Sheets

(51) Int. Cl.
*H04W 12/06* (2021.01)
*G06F 3/0481* (2022.01)
*H04L 65/1069* (2022.01)
*H04W 76/14* (2018.01)
*H04W 4/02* (2018.01)
*G06F 3/14* (2006.01)
*H04L 65/403* (2022.01)

(52) U.S. Cl.
CPC ......... *H04L 65/1069* (2013.01); *H04W 12/06* (2013.01); *H04W 76/14* (2018.02); *G06F 3/1454* (2013.01); *G06F 2203/04803* (2013.01); *H04L 65/403* (2013.01); *H04W 4/023* (2013.01)

(56) References Cited

U.S. PATENT DOCUMENTS

| | | | |
|---|---|---|---|
| 8,081,205 B2 | 12/2011 | Baird et al. | |
| 8,350,891 B2 | 1/2013 | Khot et al. | |
| 8,379,077 B2 | 2/2013 | Wu et al. | |
| 8,503,651 B2 | 8/2013 | Virolainen et al. | |
| 8,786,517 B2* | 7/2014 | Lewin | G06F 3/0484 |
| | | | 345/1.3 |
| 8,896,651 B2 | 11/2014 | Chu et al. | |
| 8,934,382 B2 | 1/2015 | Rodman et al. | |
| 9,088,694 B2 | 7/2015 | Navon et al. | |
| 9,131,333 B2* | 9/2015 | Gai | G06F 3/1454 |
| 9,148,627 B2 | 9/2015 | Anderson et al. | |
| 9,172,908 B2* | 10/2015 | Kert | H04N 7/15 |
| 9,369,672 B2 | 6/2016 | Hiller et al. | |
| 9,400,895 B2 | 7/2016 | Dadu et al. | |
| 9,445,054 B2 | 9/2016 | Kato | |
| 9,467,657 B2 | 10/2016 | Decker et al. | |
| 9,609,030 B2 | 3/2017 | Sun et al. | |
| 9,615,058 B2 | 4/2017 | Mattson | |
| 9,801,219 B2* | 10/2017 | Sonnino | H04W 12/04 |
| 10,321,093 B2 | 6/2019 | Duckworth et al. | |
| 10,362,272 B1 | 7/2019 | Van Os et al. | |
| 10,368,032 B2 | 7/2019 | Visosky | |
| 10,824,384 B2* | 11/2020 | Somaiah | G06F 3/1454 |
| 10,838,681 B2* | 11/2020 | Watson | H04W 76/14 |
| 10,841,174 B1* | 11/2020 | Ely | H04W 16/20 |
| 10,999,331 B1 | 5/2021 | Marchand et al. | |
| 2003/0048174 A1 | 3/2003 | Stevens et al. | |
| 2003/0055977 A1 | 3/2003 | Miller | |
| 2006/0092269 A1 | 5/2006 | Baird et al. | |
| 2006/0132473 A1* | 6/2006 | Fuller | G06F 3/1438 |
| | | | 345/204 |
| 2006/0224882 A1 | 10/2006 | Chin | |
| 2007/0112942 A1 | 5/2007 | Moquin et al. | |
| 2007/0150953 A1 | 6/2007 | Hamid et al. | |
| 2007/0300165 A1 | 12/2007 | Haveliwala | |
| 2008/0043986 A1 | 2/2008 | Darby et al. | |
| 2008/0160977 A1 | 7/2008 | Ahmaniemi et al. | |
| 2008/0281971 A1 | 11/2008 | Leppanen et al. | |
| 2010/0009719 A1 | 1/2010 | Oh et al. | |
| 2011/0119389 A1 | 5/2011 | Cavin et al. | |
| 2011/0271207 A1 | 11/2011 | Jones et al. | |
| 2011/0292161 A1 | 12/2011 | Sharon et al. | |
| 2012/0280790 A1 | 11/2012 | Gerhardt et al. | |
| 2012/0284643 A1 | 11/2012 | Sitrick et al. | |
| 2012/0297306 A1* | 11/2012 | Hassan | H04W 76/14 |
| | | | 715/735 |
| 2013/0065526 A1* | 3/2013 | Pottier | H04W 4/80 |
| | | | 455/41.2 |
| 2013/0106976 A1 | 5/2013 | Chu et al. | |
| 2013/0111555 A1 | 5/2013 | Leneel | |
| 2013/0169526 A1* | 7/2013 | Gai | G06F 3/04883 |
| | | | 345/156 |
| 2013/0214995 A1* | 8/2013 | Lewin | G06F 3/1446 |
| | | | 345/1.3 |
| 2013/0219288 A1 | 8/2013 | Rosenberg | |
| 2013/0219303 A1 | 8/2013 | Eriksson et al. | |
| 2013/0295882 A1 | 11/2013 | Zhao | |
| 2014/0006495 A1 | 1/2014 | Adderly et al. | |
| 2014/0026070 A1 | 1/2014 | Tandon et al. | |
| 2014/0028726 A1* | 1/2014 | Dave | G06F 3/1454 |
| | | | 345/600 |
| 2014/0155169 A1 | 6/2014 | Crevin et al. | |
| 2014/0157185 A1 | 6/2014 | Moromisato et al. | |
| 2014/0282967 A1* | 9/2014 | Maguire | H04L 51/32 |
| | | | 726/7 |
| 2014/0313282 A1 | 10/2014 | Ma et al. | |
| 2014/0315489 A1* | 10/2014 | Lee | H04M 1/72414 |
| | | | 455/41.2 |
| 2014/0340468 A1 | 11/2014 | Winterstein | |
| 2014/0344446 A1 | 11/2014 | Freedman et al. | |
| 2014/0368603 A1 | 12/2014 | Kert et al. | |
| 2015/0124950 A1 | 5/2015 | Koenig | |
| 2015/0248468 A1 | 9/2015 | Cheng | |
| 2015/0271273 A1 | 9/2015 | Glass et al. | |
| 2015/0347738 A1 | 12/2015 | Ulrich et al. | |
| 2016/0212181 A1 | 7/2016 | Zhang et al. | |
| 2016/0241605 A1 | 8/2016 | Taboriskiy et al. | |
| 2016/0261658 A1* | 9/2016 | Taylor | H04L 65/4076 |
| 2016/0323290 A1 | 11/2016 | Stead et al. | |
| 2016/0342784 A1 | 11/2016 | Beveridge et al. | |
| 2016/0366713 A1* | 12/2016 | Sonnino | H04W 4/80 |
| 2016/0378417 A1* | 12/2016 | Kenjalkar | H04L 65/4038 |
| | | | 345/2.2 |
| 2017/0097678 A1 | 4/2017 | Mclean | |
| 2017/0104831 A1 | 4/2017 | Fransen | |
| 2017/0171699 A1* | 6/2017 | Jin | H04B 17/318 |
| 2017/0244811 A1 | 8/2017 | Mckenzie et al. | |
| 2017/0311365 A1 | 10/2017 | Molettiere et al. | |
| 2018/0124128 A1 | 5/2018 | Faulkner et al. | |
| 2018/0267774 A1 | 9/2018 | Williams et al. | |
| 2018/0270340 A1 | 9/2018 | Ahmad et al. | |
| 2019/0173745 A1* | 6/2019 | Rjeili | G06Q 10/109 |
| 2019/0321732 A1 | 10/2019 | Zimring et al. | |
| 2019/0332344 A1* | 10/2019 | Somaiah | G06F 3/0486 |
| 2019/0372988 A1 | 12/2019 | Schirdewahn et al. | |
| 2021/0004454 A1 | 1/2021 | Chester et al. | |
| 2021/0045169 A1 | 2/2021 | Pupakdee et al. | |
| 2021/0136130 A1 | 5/2021 | Ponnusamy et al. | |
| 2021/0136846 A1 | 5/2021 | Ponnusamy et al. | |

FOREIGN PATENT DOCUMENTS

| | | |
|---|---|---|
| CN | 105264883 A | 1/2016 |
| CN | 105474653 A | 4/2016 |
| CN | 105704426 A | 6/2016 |
| EP | 1220501 B1 | 7/2008 |
| EP | 2587799 A1 | 5/2013 |
| WO | 0031608 A2 | 6/2000 |
| WO | 2016149294 A1 | 9/2016 |
| WO | 2016195825 A1 | 12/2016 |

OTHER PUBLICATIONS

"Lock Your Windows 10 PC Automatically When You Step Away From It", Retrieved from: https://web.archive.org/web/20190518143337/https://support.microsoft.com/en-in/help/4028111/windows-lock-your-windows-10-pc-automatically-when-you-step-away-from, May 18, 2019, 02 Pages.

"Changing Your Own Video Layout", Retrieved from: https://documentation.avaya.com/bundle/UsingXTSeries_r91/page/xt1000_ug_calls_changeVideoLayout.html, Retrieved Date: Apr. 21, 2020, 3 Pages.

"Using Dual Monitors with the Zoom Desktop Client", Retrieved from: https://support.zoom.us/hc/en-us/articles/201362583-Using-Dual-Monitors-with-the-Zoom-Desktop-Client?mobile_site=true, Retrieved Date: Apr. 21, 2020, 3 Pages.

"ViewSplit-Display Layout Software", Retrieved from: https://web.archive.org/web/20170318042724/https://www.viewsonic.com/us/viewsplit.html, Mar. 18, 2017, 4 Pages.

"Non Final Office Action Issued in U.S. Appl. No. 16/724,116", dated Jun. 11, 2020, 15 Pages.

(56) References Cited

OTHER PUBLICATIONS

"Four Ways Polycom is Redefining Video Collaboration", Retrieved From: http://www.polycom.com/products-services/realpresence-platform/realpresence-web-suite/redefining-video-collaboration.html, Retrieved on: Oct. 21, 2016, 4 Pages.
"GoToMeeting | Global Customer Support", Retrieved From: http://support.citrixonline.com/en_US/meeting/help_files/G2M040004, Oct. 21, 2016, 7 Pages.
"Highfive Sees 300 Percent Growth in Video-Enabled Meeting Rooms", Retrieved From: http://www.marketwired.com/press-release/highfive-sees-300-percent-growth-in-video-enabled-meeting-rooms-2158891.htm, Sep. 15, 2016, 3 Pages.
"How do I Share my Screen in Skype for Windows desktop?", Retrieved From: https://support.skype.com/en/faq/FA10215/how-do-i-share-my-screen-in-skype-for-windows-desktop, Retrieved on: Oct. 21, 2016, 5 Pages.
"Host Instructions", Retrieved from: https://www.freeconferencecall.com/instructions, 2001, 11 Pages.
"Screen share-free. With Web Ex Meetings", Retrieved from: https://www.webex.com/features/screen-share.html, Retrieved on: Oct. 21, 2016, 5 Pages.
"Share your Screen", Retrieved from: https://www.uberconference.com/screensharing, Retrieved on: Oct. 21, 2016, 5 Pages.
"Share your Screen During a Hangout", Retrieved from: https://support.google.com/hangouts/answer/1660627?hl=en, Retrieved on: Oct. 21, 2016, 2 Pages.
"Final Office Action Issued in U.S. Appl. No. 15/480,325", dated Jun. 22, 2020, 5 Pages.
"Non Final Office Action Issued in U.S. Appl. No. 15/480,325", dated Mar. 21, 2019, 13 Pages.
"Non-Final Office Action Issued in U.S. Appl. No. 15/480,325", dated Nov. 6, 2019, 14 Pages.
"Final Office Action Issued in U.S. Appl. No. 15/480,332", dated Jan. 29, 2020, 20 Pages.
"Non Final Office Action Issued in U.S. Appl. No. 15/480,332", dated Jun. 27, 2019, 16 Pages.
"Non Final Office Action Issued in U.S. Appl. No. 15/480,332", dated Aug. 24, 2020, 15 Pages.
"First Office Action and Search Report Issued in Chinese Patent Application No. 201780067116.9", dated May 26, 2020, 15 Pages.
He, et al., "Real-time Whiteboard Capture and Processing using a Video Camera for Teleconferencing", In Proceedings of the IEEE International Conference on Acoustics, Speech, and Signal Processing, Mar. 2005, 4 Pages.
Hornler et al., "Multi-Modal Activity and Dominance Detection in Smart Meeting Rooms", In Proceedings of the IEEE International Conference on Acoustics, Speech, and Signal Processing, Apr. 19, 2009, pp. 1777-1780.
Liu, et al., "Do Handheld Devices Facilitate Face-to-Face Collaboration? Handheld Devices with Large Shared Display Groupware to Facilitate Group Interactions", In Journal of Computer Assisted Learning, vol. 23, Issue 4, May 22, 2007, pp. 285-299.
"International Search Report and Written Opinion Issued in PCT Application No. PCT/US2017/057947", dated Feb. 8, 2018, 14 Pages.
"International Search Report and Written Opinion Issued in PCT Application No. PCT/US2017/057948", dated Feb. 8, 2018, 15 Pages.
Rudnicky, et al., "Intelligently Integrating Information from Speech and Vision Processing to Perform Light-weight Meeting Understanding", In Proceedings of the International Workshop on Multimodal Multiparty Meeting Processing, Oct. 2005, pp. 79-84.
Yang, et al., "New Business Development in Triple-Play", In Journal of Telecommunications Science, vol. 27, Issue 3, Mar. 15, 2011, 6 Pages.
"Non-Final Office Action Issued in U.S. Appl. No. 15/480,325", dated Nov. 17, 2020, 16 Pages.
"Final Office Action Issued in U.S. Appl. No. 16/724,116", dated Oct. 8, 2020, 13 Pages.
"International Search Report and the Written Opinion Issued in PCT Application No. PCT/US20/055451", dated Jan. 15, 2021, 11 Pages.
"Second Office Action and Search Report Issued in Chinese Patent Application No. 201780067116.9", dated Feb. 10, 2021, 14 Pages.
"International Search Report and Written Opinion Issued in PCT Application No. PCT/US20/055444", dated Feb. 2, 2021, 13 Pages.
"International Search Report and Written Opinion Issued in PCT Application No. PCT/US20/055445", dated Jan. 28, 2021, 11 Pages.
"Non-Final Office Action Issued in U.S. Appl. No. 16/724,116", dated Apr. 5, 2021, 15 Pages.
"Final Office Action Issued in U.S. Appl. No. 15/480,332", dated Jun. 4, 2021, 18 Pages.
"Office Action Issued in Indian Patent Application No. 201947013660", dated Jun. 27, 2021, 7 Pages.
"Non-Final Office Action Issued in U.S. Appl. No. 16/714,329", dated Jun. 28, 2021, 21 Pages.
"Final Office Action Issued in U.S. Appl. No. 16/724,116", dated Sep. 3, 2021, 15 Pages.
"Office Action Issued in European Patent Application No. 17794863.5", dated Sep. 30, 2021, 11 Pages.

* cited by examiner

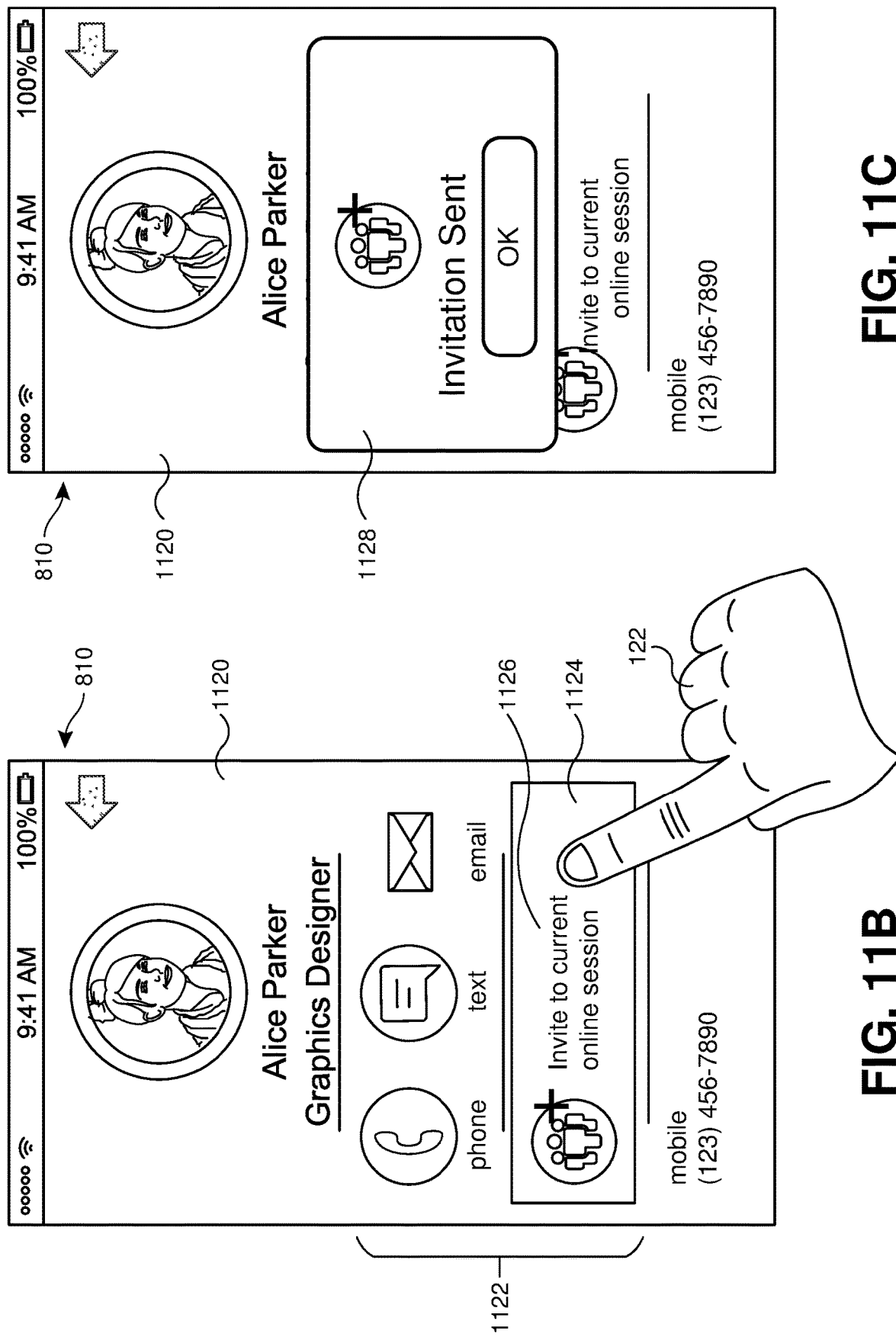

UNIFIED INTERFACES FOR PAIRED USER COMPUTING DEVICES

CROSS-REFERENCE TO RELATED APPLICATION

This application claims the benefit of priority from U.S. Provisional Patent Application Ser. No. 62/929,764, filed on Nov. 1, 2019, and entitled "Unified Interfaces for Paired User Computing Devices," which is incorporated by reference herein in its entirety.

BACKGROUND

Many user computing devices are in portable form factors such as, but not limited to, laptop computers, notebook computers, smartphones, and tablet computers. For many, work can involve use and interaction with multiple different computing devices, including multitasking across devices. Additionally, work environments have become more dynamic. For example, there are increasing amounts of work done across homes, coffee shops, airports, conference rooms, and individual workspaces, and on-demand workspace allocation, where an individual may work at different locations from one day to the next, is increasingly common. New and improved approaches for improving user interactions with, and more fully realizing the capabilities offered by, these varied devices and work environments is desirable.

SUMMARY

A system adapted to provide a unified user interface among actively paired user computing devices, in accord with a first aspect of this disclosure, includes one or more processors and machine-readable media including instructions which, when executed by the one or more processors, may cause the one or more processors to determine that a first user computing device is eligible to be actively paired with a second user computing device. The instructions may also cause the one or more processors to determine that the first user computing device is in physical proximity to the second user computing device at a first time that the first user computing device and the second user computing device are both authenticated for a same user service account. Furthermore, the instructions may cause the one or more processors to determine that the first user computing device and the second user computing device are included together in a first actively paired set at the first time based on the determination that the first user computing device is eligible to be actively paired with the second user computing device and the determination that the first user computing device is in physical proximity to the second user computing device. The instructions also cause the one or more processors to receive, at the first time, a first indication of an actuation of a first user interface control associated with a first user activity and presented by the first user computing device. Also, the instructions cause the one or more processors to cause, in response to the receipt of the first indication and the determination that the first user computing device and the second user computing device are included together in the first actively paired set at the first time, the second user computing device to present a second user interface associated with the first user activity.

A method of providing a unified user interface among actively paired user computing devices, in accord with a second aspect of this disclosure, includes determining that a first user computing device is eligible to be actively paired with a second user computing device. The method may also include determining that the first user computing device is in physical proximity to the second user computing device at a first time that the first user computing device and the second user computing device are both authenticated for a same user service account. The method may further include determining that the first user computing device and the second user computing device are included together in a first actively paired set at the first time based on the determination that the first user computing device is eligible to be actively paired with the second user computing device and the determination that the first user computing device is in physical proximity to the second user computing device. In addition, the method includes receiving, at the first time, a first indication of an actuation of a first user interface control associated with a first user activity and presented by the first user computing device. Also, the method includes causing, in response to the receipt of the first indication and the determination that the first user computing device and the second user computing device are included together in the first actively paired set at the first time, the second user computing device to present a second user interface associated with the first user activity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 11A, 11B, 11C, 11D, and 11E illustrate a ninth example of the system shown in FIGS. 1-2B performing unified UI interactions for user activity across multiple devices included in an actively paired set, in which, while participating in a teleconferencing session, the first user invites an additional participant via the handheld third device;

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles.

Figure 1:
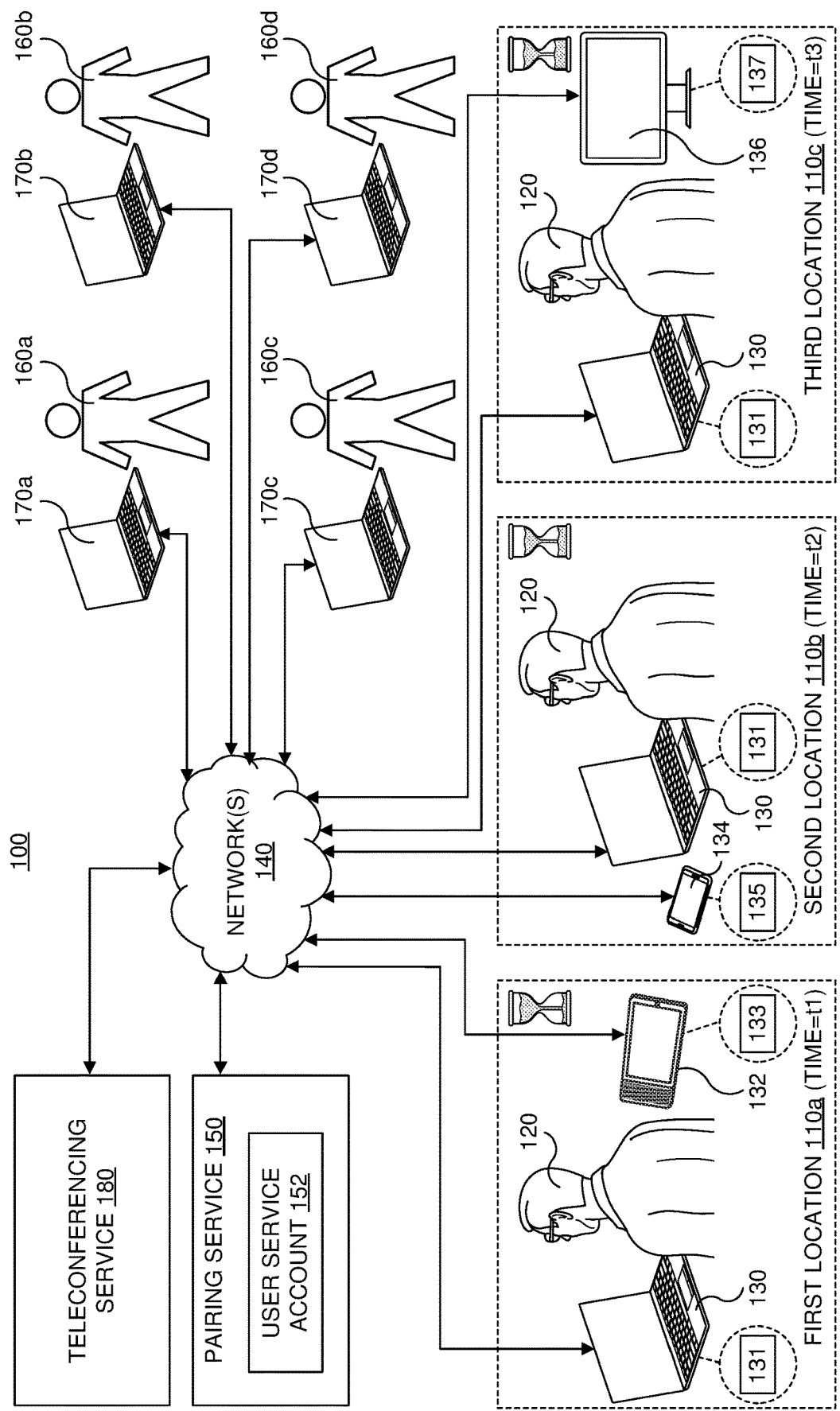
FIG. 1 illustrates an example of a system configured to provide unified user interfaces among paired user computing devices.

FIG. 1 illustrates an example of a system 100 configured to provide unified user interfaces ("UIs") among paired user computing devices. It is noted that the term "user interface" (or "UI") is not limited to graphical user interfaces ("GUIs"), but may also include other user interfaces such as, but not limited to, spoken voice input and rendered output. In this example, a first user 120 is shown making use of a first user computing device 130 (which may be referred to more simply as a "computing device" or a "device") at a first location 110a during a first period of time t1, at a second location 110b during a second period of time t2, and at a third location 110c during a third period of time t3. During the first period of time t1, the first user 120 is also making use of a second user computing device 132 at the first location 110a. During the second period of time t2, a third user computing device 134 associated with the first user 120 is at the second location 110b. During the third period of time t3, the first user 120 is also making use of a fourth user computing device 136 at the third location 110c. In the particular example shown in FIG. 1, the first device 130 is a portable computing device in the form of a notebook or laptop computing device, the second device 132 is a tabletop computing device including a touchscreen, camera, microphone, and loudspeaker, the first device 134 is in the form of a smartphone, and the fourth device 136 is the form of a desktop computing device (represented by a monitor in FIG. 1). However, it is understood that the first device 130, the second device 132, the third device 134, and/or the fourth device 136 may be implemented in other forms. In some examples, a user computing device offers a capability not offered by another user computing device. For example, in FIG. 1 the first device 130 includes a physical keyboard whereas the second device 132 does not include a physical keyboard. As another example, the second device 132 includes a touchscreen whereas the first device 130 does not include a touchscreen.

The term "user computing device" relates to an end user-oriented computing device on which it is generally assumed a single user is making use of the device at a given time. For example, a software program executed by a user computing device may require a password or other credentials be supplied in order to access resources associated with a user account. In some examples, a user computing device may support multiple such user accounts, allowing different users to "log in" to the device at respective times. In some examples, a user computing device may support a single user account; for example, most smartphone devices assume use in connection with a single individual.

A first software program instance 131 (which, in some examples, may be referred to as a "software instance," "application," or an "app") is being executed by the first device 130 during the first period of time t1, the second period of time t2, and the third period of time t3. Among other things, the first software program instance 131 is configured to interact via one or more networks 140 with a pairing service 150 in connection with a first user service account 152 associated with the first user 120. For example, the first software program instance 131 may be configured to provide credentials to the pairing service 150 to authenticate the first software program instance 131 for the first user service account 152. The interactions may include, for example, commands and/or data sent and received between the first software program instance 131 and the pairing service 150 to effect aspects of the techniques described herein. These interactions may be implemented via, for example, persistent connections, asynchronous communications, and/or polling for transferring messages between the first software program instance 131 executed by the first device 130 and the pairing service 150. It is understood that references to a user computing device interacting with, or being configured to interact with, the pairing service 150 occurs via a correspondingly configured software program instance executed by the user computing device.

During the first period of time t1, a second software program instance 133 is being executed by the second device 132. Much as described for the first software program instance 131, the second software program instance 133 is configured to interact via one or more networks 140 with the pairing service 150 in connection with the first user service account 152. Thus, during the first period of time t1, both the first device 130 and the second device 132 are configured to interact with the pairing service 150, and do interact with the pairing service 150, in connection with the first user service account 152. In some examples, the second software program instance 133 may be configured to interact with the pairing service 150 in connection with the first user service account 152 during the second period of time t2 and/or the third period of time t3. In some implementations, use of the same first user service account 152 by different software program instances offers consistent and robust security mechanisms among the software program instances, such as by distribution and management of access tokens via the pairing service 150 for secure data access and exchange.

During the second period of time t2, a third software program instance 135 is being executed by the third device 134. Much as described for the software program instances 131 and 133, the third software program instance 135 is configured to interact via one or more networks 140 with the pairing service 150 in connection with the first user service account 152. Thus, during the second period of time t2, both the first device 130 and the third device 134 are configured to interact with the pairing service 150, and may interact with the pairing service 150, in connection with the first user service account 152. In some examples, the third software program instance 135 may be configured to interact with the pairing service 150 in connection with the first user service account 152 during the first period of time t1 and/or the third period of time t3 while remaining at the first location 110a. In some examples, the third device 134 is with the first user 120 during the first period of time t1 and/or the third period of time t3.

During the third period of time t3, a fourth software program instance 137 is being executed by the fourth device 136. Much as described for the software program instances 131, 133, and 135, the third software program instance 135 is configured to interact via one or more networks 140 with the pairing service 150 in connection with the first user service account 152. Thus, during the third period of time t3, both the first device 130 and the fourth device 136 are configured to interact with the pairing service 150, and do interact with the pairing service 150, in connection with the first user service account 152. In some examples, the fourth software program instance 137 may be configured to interact with the pairing service 150 in connection with the first user service account 152 during the first period of time t1 and/or the second period of time t2 while remaining at the third location 110c.

The system 100 is configured to automatically identify periods of time (such as the first period of time t1) for sets of two or more user computing devices (such as the first device 130 and the second device 132 during the first time period t1) during which each user computing device in each set is configured to interact with the pairing service 150 in connection with a same user service account and the user computing devices in each set are, or likely are, in proximity to, or in the vicinity of, one another and/or a common user. A set of user computing devices identified by the system 100 may be referred to as being "actively paired" and as being included together in an actively paired set during the periods of time identified for the set of devices. It is noted that in some examples three or more devices may be included in an actively paired set. For example, in some circumstances the first device 130, the second device 132, and the third device 134 might be included in an actively paired set while the first user 120 is at the first location 110a.

In some examples, the system 100 is configured to condition including a user computing device in an identified set based on whether a user has identified a user computing device as eligible for pairing (for example, by expressly identifying the device as eligible or ineligible for pairing). In an example in which the system 100 is so configured, the first device 130 and the second device 132 have been identified as eligible for pairing, and the third device 134 has not been identified as eligible for pairing, the system 100 may identify the first device 130 and the second device 132 as being included in an actively paired set during the first period of time t1 (based on the devices both having been identified as eligible for pairing), but not identify the first device 130 and the third device 134 as being included in an actively paired set during the second period of time t2 (due to the third device 134 not being identified as eligible for pairing) despite the close proximity of the two devices at that time.

In some examples, the system 100 is configured to condition including two user computing devices in an identified set based on whether a user has identified the two user computing devices as eligible for pairing with each other (for example, by expressly identifying the devices as eligible or ineligible for pairing with each other). In some implementations, a user may perform a pairing procedure to identify devices as eligible for pairing with each other. In an example in which the system 100 is so configured, the first device 130 and the second device 132 have been identified as eligible for pairing together, the first device 130 and the fourth device 136 have been identified as eligible for pairing together, but the second device 132 and the fourth device 136 have not been identified as eligible for pairing together, in a situation in which the second device 132 and the fourth device 136 were proximate to one another the system 100 would not identify the devices as included together in an actively paired set despite each device being able to be actively paired with other devices.

In the example shown in FIG. 1, the system 100 identifies the first device 131 and the second device 132 as a first actively paired set of user computing devices during the first period of time t1 (during which they are in sufficient proximity to be actively paired), but not during the second period of time t2 or the third period of time t3 (during which they are not in sufficient proximity). Also, the system 100 identifies the first device 131 and the fourth device 136 as a second actively paired set of user computing devices during the third period of time t3 (during which they are in sufficient proximity), but not during the first period of time t1 or the second period of time t2 (during which they are not in sufficient proximity).

The system 100 is further configured to control the presentation of user interfaces by user computing devices for various activities based on whether the involved user computing devices are or are not actively paired during associated periods of time. In some examples, a user interface presented by a user computing device may be modified (including, but not limited to, adding a displayed user interface (UI) element, removing a displayed UI element, and/or changing an appearance of a displayed UI element) in response to the system 100 identifying the user computing device as having transitioned between not being actively paired and being actively paired. The system 100 is further configured to control the behavior of a software program instance based on whether the user computing device executing the software program instance is or is not actively paired during an associated period of time.

Various mechanisms may be employed to identify periods of time when user computing devices are in proximity to each other. By way of example, the first device 130 and the second device 132 may be configured to transmit and/or receive short-range radio signals (such as, but not limited to, according to Bluetooth Low Energy (BLE) and/or Near Field Communication (NFC) communication protocol standards) and/or acoustic signals. By way of another example, the first device 130 and the second device 132 may each be configured to detect the presence of a particular user or device (such as, but not limited to, by RFID tag detection, facial recognition, and/or voice recognition techniques).

FIG. 1 further illustrates a second user 160a and a respective computing device 170a, a third user 160b and a respective computing device 170b, a fourth user 160c and a respective computing device 170c, and a fifth user 160d and a respective computing device 170d. In some examples discussed below, the second user 120 participates in teleconferencing sessions with some or all of the users 160a, 160b, 160c, and 160d via a teleconferencing service 180. In some examples, a teleconferencing session involves the capture and transmission of a video media stream and an audio media stream for distribution to other participants and the receipt and presentation of video media streams and audio media streams for the other participants. The teleconferencing service 180 may offer additional capabilities through teleconferencing sessions such as, but not limited to, casting of display and/or application content to and/or from other participants, live transcription of spoken words, and/or whiteboard media streams and/or services.

Figure 2A:
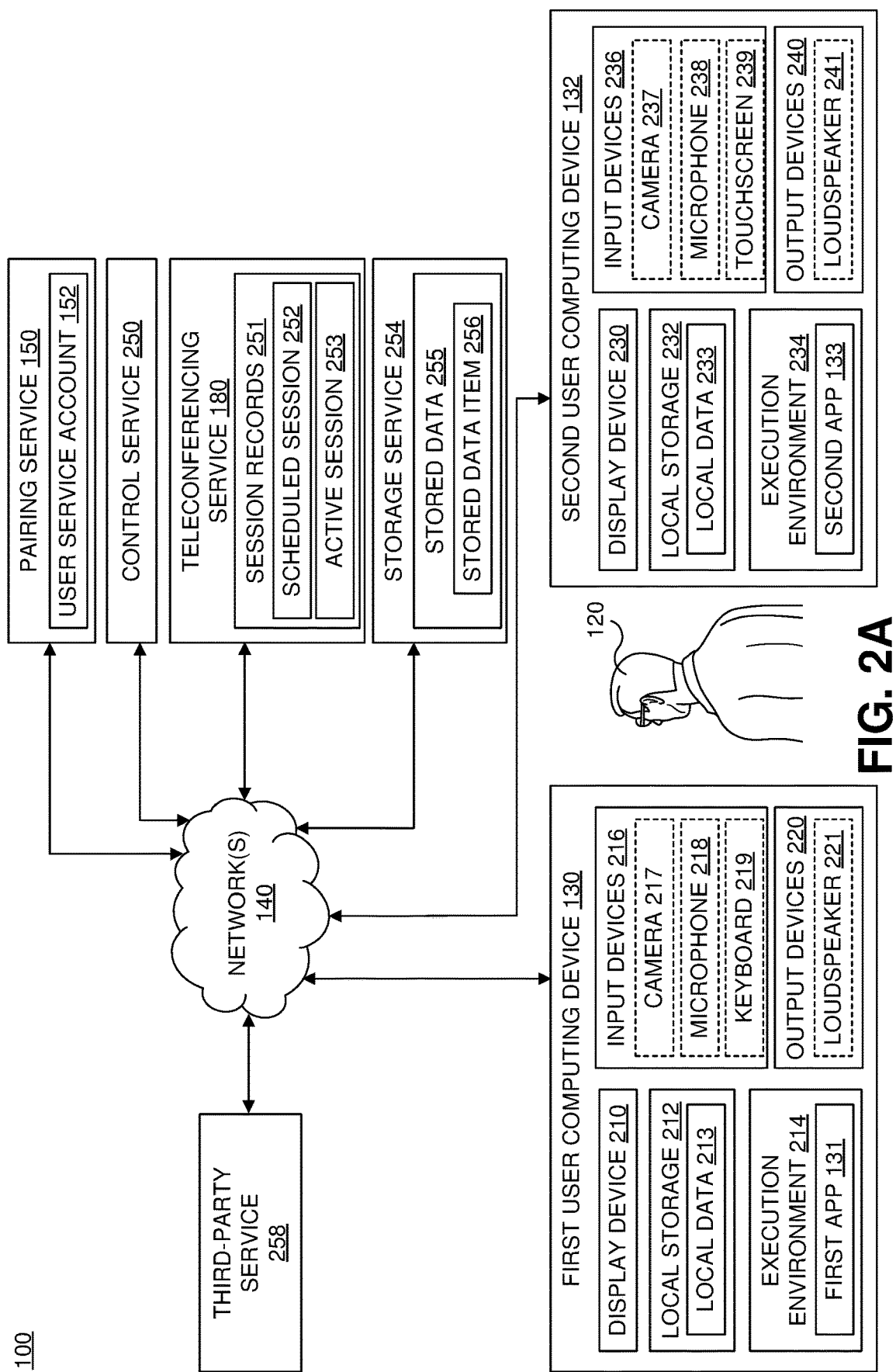
FIG. 2A illustrates example details of aspects of the system shown in FIG. 1 in connection with various examples operating at a first location shown in FIG. 1.

FIG. 2A illustrates example details of aspects of the system 100 shown in FIG. 1 in connection with various examples operating at the first location 110a shown in FIG. 1. However, it is understood that the described details may also be applied in connection with other user computing devices (such as, but not limited to, the third device 134 and the fourth device 136 shown in FIG. 1) and other users. Although this disclosure primarily describes examples involving pairing of user computing devices used by a single first user 120, it should be understood that the system 100 supports providing similar functionality to multiple users in connection with their associated user computing devices.

As noted above, the first user computing device 130 is in a form of a notebook or laptop computer. As shown in FIG. 2A, the first device 130 includes a first display device 210 such as, but not limited to, an LCD-based display panel, which may be used to present various graphical user interfaces ("GUIs"). The first device 130 further includes a first local storage 212, such as volatile and/or nonvolatile storage, shown storing a first local data 213, such as an electronic file. The first device 130 further includes a first execution environment 214 in which the first software program instance 131 is executed by the first device 130. Other software program instances may be executed by the first device 130 within the first execution environment 214 and/or other execution environments provided by the first device 130. The first device 130 further includes various input devices 216 such as, but not limited to, a first camera 217, a first microphone 218, and/or a keyboard 219. The first device 130 further includes various output devices 220 such as, but not limited to a first loudspeaker 221. Further examples of input devices and output devices are discussed in connection with FIG. 20.

As noted above, the second user computing device 132 is in a form of a tabletop computing device configured to receive touch-based input and service as a voice-driven interface for a digital assistant (for example, Microsoft Cortana™). As shown in FIG. 2A, the second device 132 includes a second display device 230, which may be used to present various GUIs. The second device 132 further includes a second local storage 232 shown storing a second local data 233. The second device 132 further includes a second execution environment 234 in which the second software program instance 133 is executed by the second device 132. Other software program instances may be executed by the second device 132 within the second execution environment 234 and/or other execution environments provided by the second device 132. The second device 132 further includes various input devices 236 such as, but not limited to, a second camera 237, a second microphone 238, and/or a touchscreen 239. The second device 132 further includes various output devices 240 such as, but not limited to a second loudspeaker 241.

FIG. 2A includes the teleconferencing service 180 shown in FIG. 1. In some examples, as shown in FIG. 2A, the teleconferencing service 180 may maintain session records 251 for teleconferencing sessions. In some examples, the session records 251 may include a scheduled session 252 for a teleconferencing session that has been scheduled but not yet started. In some examples, the session records 251 may include an active session 252 for a teleconferencing session with one or more active participants. An active session 252 might arise from a previously scheduled session or an ad hoc session. In the example shown in FIG. 2A, the system 100 may include a storage service 254 configured to receive, store, and make accessible stored data 255, including a stored data item 256. For example, the stored data item 256 may be an electronic document generated by a content creation application such as, but not limited to, a word processor application.

In the example shown in FIG. 2A, the system 100 may include a control service 250 that is configured to interact with the pairing service 150 as a client service of the pairing service, allowing it to receive notifications from the pairing service 150 of changes in an actively paired set, send or exchange messages with devices, and/or obtain device information. Additionally, the control service 250 is configured to interact with the teleconferencing service 180 to obtain information from, and issue commands to, the teleconferencing service 180. The control service 250, via interactions with the pairing service 150, the teleconferencing service 180, and user computing devices, is configured to enable pairing-aware features to be provided for teleconferencing sessions without necessarily having to modify the teleconferencing service 180 itself. In some examples, the control service 250 is configured to interact with the storage service 254 to obtain information regarding stored data 255 (for example, file metadata) and/or access or make accessible items included in the stored data 255. In some examples, the functionality described for the control service may be incorporated, in part or in whole, into the pairing service 150 and/or the teleconferencing service 180. In the example shown in FIG. 2A, the system 100 may include a third-party client service 258 configured to interact with the pairing service 150 as a client service to enable pairing-aware features to be incorporated into a third-party service and/or application. In some implementations, instead of interacting directly with the pairing service 150 as client services, the control service 250 and/or the third-party service 258 may obtain pairing-related information via devices. It is noted that in some implementations, program software instances 130, 134, 136, 138, and/or other pairing-aware program software instances described herein may be configured to interact, at least in part, with the pairing service 150 via a client service such as the control service 250 or the third-party client service 258.

Figure 2B:
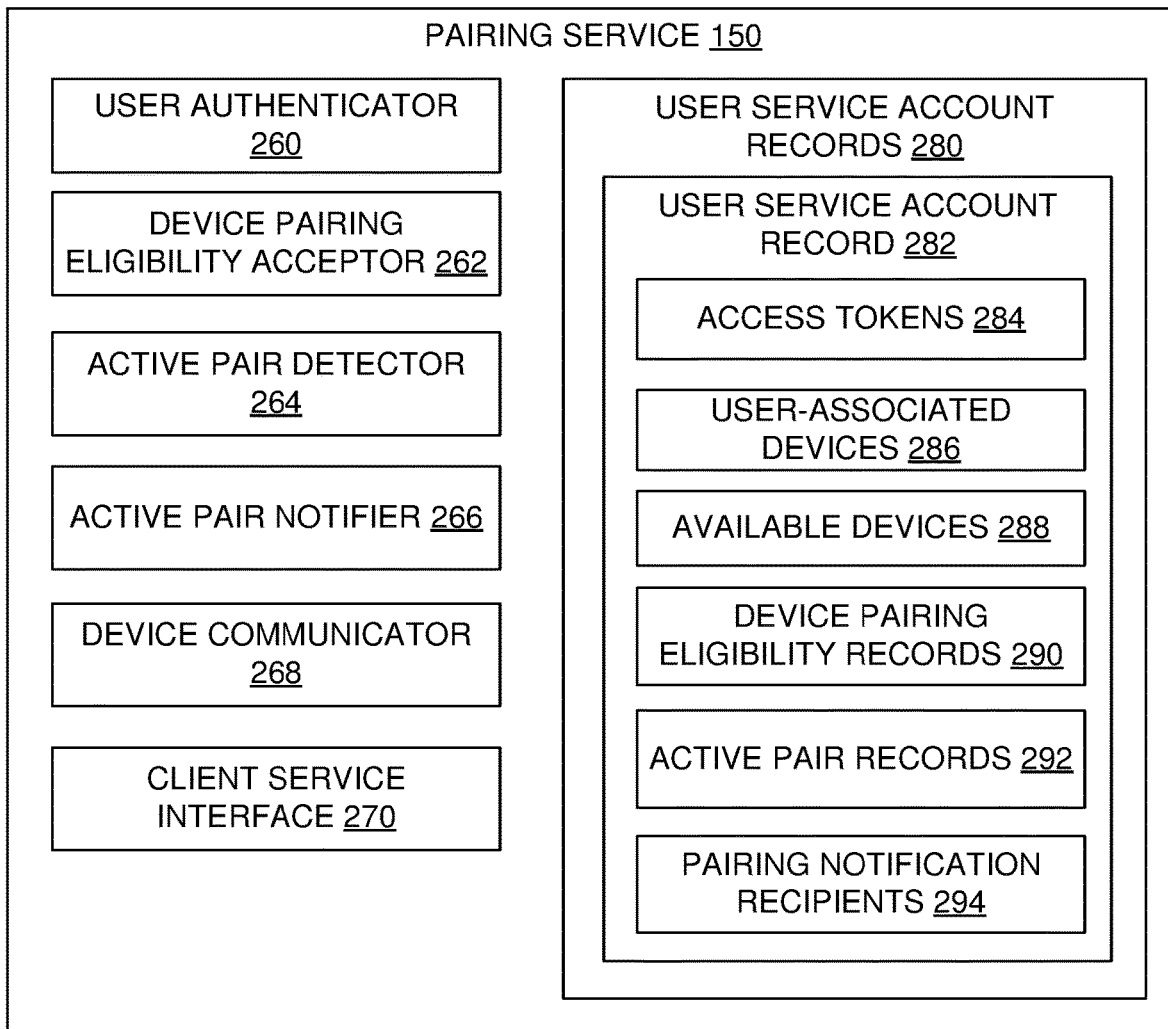
FIG. 2B illustrates example details of aspects of a pairing service shown in FIGS. 1 and 2A.

FIG. 2B illustrates example details of aspects of the pairing service 150 shown in FIGS. 1 and 2A. The pairing service 150 includes a user authenticator 260 configured to identify and authenticate a user service account associated with a communication session between a user computing device and the pairing service 150. For example, the user authenticator 260 may be configured to receive and process credentials in the form of a username and password hash. In some implementations, the user authenticator 260 supports the use of credentials obtained from external authentication services (for example, tokens issued by a single sign on (SSO) service), and may associate user account identifiers provided by such services with their respective user service accounts. In some implementations, the user authenticator 260 is configured to issue an access token to a device that has successfully authenticated, and the pairing service 150 is configured to receive and process the access token in later communications with the device for authentication and authorization operations.

In some implementations, the pairing service 150 includes a client service interface 270 used for interaction between the pairing service 150 and a "client" service configured to receive, for one or more selected user service accounts, information about actively paired set and interact with devices based on their status as paired or unpaired devices and/or which devices they are actively paired with. Example client services include the control service 250 and the third-party client service 258 shown in FIG. 2A. In some examples, the client service interface 270 is configured to perform authentication and/or authorization of a client service in connection with selected user service accounts, which may include use of authentication techniques much as described for the user authenticator 260 and accepting tokens issued by the user authenticator 260 to devices. In some implementations, a client service may, via the client service interface 270, obtain information regarding user-associated devices 286, available devices 288, and/or active pair records 292 discussed below. In some examples, a service may, instead of interacting with the pairing server 150 as a client service, be designed to obtain pairing-related information via devices.

In some implementations, the pairing service 150 maintains user service account records 280 for user service accounts established with the pairing service 150, including a user service account record 282 for the user service account 152 for the first user 120. In some examples, the user service account record 282 is stored in multiple separate records. For example, access tokens 284 associated with user service accounts may be maintained by the user authenticator 260. In some implementations, the user service account record 282 includes access tokens 284 issued for the user service account 152.

In some implementations, the user service account record 282 includes user-associated devices 286 information for devices that have been authenticated with the pairing service 150 for the user service account 152. In some implementations, the pairing service 150 is configured to add a device to the user-associated devices 286 in response to a successful user authentication (or "sign in") by the device with the pairing service 150. In some implementations, the pairing service 150 is configured to remove a device from the user-associated devices 286 in response to a "sign out" by the device with the pairing service 150. In some examples, a device supporting use by multiple different users is configured to "sign out" from the pairing service when a user concludes their use of the device.

In some implementations, the user service account record 282 includes available devices 288 information identifying devices that are currently authenticated with the pairing service 150 for the user service account 152 that are currently available to potentially be included in actively paired sets of devices. In some examples, a device may be added and removed from the available devices 288 in response to the establishment and termination of a persistent network connection, although other approaches may be used to identify the available devices 288. In some examples, a device is configured to transmit a registration message to the pairing service 150 to indicate its availability for pairing with other devices and to transmit an deregistration message to the pairing service 150 to indicate its unavailability for pairing, and the pairing service 150 is configured to respectively add and remove the device from the available devices 288. In some examples, a device is configured to, via a software program instance executed by the device, transmit a registration messages to the pairing service 150 in response to events such as, but not limited to, user login to the device, startup of the software program instance, and/or reestablishing network connectivity. In some implementations, the pairing service 150 is configured to, based on the receipt of periodic keepalive messages from a device and/or expiration of a timeout from the receipt of a most recently received keepalive message from a device to respectively add/maintain and remove the device from the from the available devices 288.

In some implementations, the user service account record 282 includes device pairing eligibility records 290 recording the eligibility of devices for pairing with other devices and the pairing service 150 is configured to identify devices eligible for being included in an actively paired set based on the device pairing eligibility records 290. In such implementations, the pairing service 150 includes a device pairing eligibility acceptor 262 configured to receive device pairing eligibility messages (for example, from user computing devices) indicating changes to device pairing eligibility and modify the device pairing eligibility records 290 accordingly. In some implementations, some or all devices may default to being eligible, and a user may "opt out" devices from pairing, with the "opt out" recorded in the device pairing eligibility records 290. In some implementations, some or all devices may default to being not eligible, and a user may "opt in" devices for pairing with other eligible devices, with the "opt in" recorded in the device pairing eligibility records 290. In some implementations, for a given device a user can identify specific other devices with which it affirmatively can be paired and/or negatively cannot be paired, with this information recorded in the device pairing eligibility records 290. For example, the system 100 may implement a device pairing procedure in which a user must affirmatively identify a device as being permitted to pair with another device, resulting in the device pairing eligibility records 290 indicating the two devices may be included together in an actively paired set. In some implementations, sets of three or more devices may be identified as pairing groups for which all of the devices must be in physical proximity to each other for an actively paired set to be established, with the pairing groups recorded in the device pairing eligibility records 290.

The pairing service 150 includes an active pair detector 264 configured to, based on information received from devices associated with a user service account, instantiate an actively paired set, add a device to a currently instantiated actively paired set, remove a device from a currently instantiated actively paired set (for example, in response to the actively paired set including two or more devices after the removal), and/or uninstantiate an actively paired set (for example, in response to less than two devices remaining an actively paired set). In some implementations, in response to detecting an event indicating a device has become available to be included in an actively paired set (such as the various events described above for adding a device to the available devices 288) and/or an event that may reflect a change in physical proximity of the device with another device (for example, a detected change in device location may remove it from the physical proximity of another device), the active pair detector 264 is configured to determine whether the device will be included in an actively paired set. The active pair detector 264 is configured to perform proximity-based pairing of devices, in which it is configured to determine whether a device is (or likely is) in physical proximity to one or more other devices, include the device in an actively paired set with the other devices based on a positive determination that the device is in physical proximity to the one or more other devices, and not include device the device in, or remove the device from, an actively paired set based on a negative determination that the device is not in physical proximity to the other devices. In some examples, to determine whether a device is in physical proximity to one or more other devices, the active pair detector 264 is configured to issue a proximity detection command to a device, the device is configured to perform a proximity detection action (for example, in response to the proximity detection command), the device is configured to transmit device proximity information to the active pair detector 264 based on the proximity detection action, and/or the active pair detector 264 is configured to make the proximity determination based on at least the received device proximity information. In an implementation utilizing device pairing eligibility records 290, active pair detector 264 is configured to identify actively paired set that conform to the device pairing eligibility records 290. In some implementations, a single device may be concurrently included in two different actively paired set. For example, in such an implementation if device A is eligible to actively pair with device B, device A is eligible to actively pair with device C, device B is not eligible to actively pair with device C, and devices A, B, and C are in physical proximity to each other, a first actively paired set would include devices A and B and a different second actively paired set would include devices A and C. In some implementations, the pairing service 150 is configured to use the active pairing detector 264 and/or the device pairing eligibility acceptor 262 to implement an initial pairing procedure between devices (which may, for example, modify the device pairing eligibility records 290 to indicate the devices are eligible to be actively paired with each other).

The user service account record 282 includes active pair records 292 recording currently instantiated actively paired set and the devices included in each actively paired set. The active pair detector 264 is configured to update the active pair records 292 in accordance with instantiating an actively paired set, uninstantiating an actively paired set, including a device in an actively paired set, and removing a device from an actively paired set.

The pairing service 150 includes a device communicator 268 configured to deliver (or attempt to deliver) messages (such as, but not limited to, command or request messages) to devices and, in some implementations, also receive and route messages (such as, but not limited to, response messages) from devices. In some implementations, this allows the pairing service 150 to encapsulate the use of different message delivery techniques for different devices. For example, for some devices it may be preferable to utilize a platform-specific notification framework instead of maintaining a persistent network connection. In some implementations, the pairing service 150 is configured to receive a message from a device or client service for delivery by the device communicator 268 to a selected device, each of devices included in a selected actively paired set, and/or each actively paired device.

The pairing service 150 includes an active pair notifier 266 configured to notify devices and/or client services about changes to actively paired set. The active pair notifier 266 is configured to, via the device communicator 268, notify a device about changes to actively paired sets including the device such as, but not limited to, the device being added to or removed from an actively paired set and another device being added to or removed from an actively paired set. In some examples, devices are configured to modify UIs and behavior based on whether they are included in actively paired sets and/or the other devices included in actively paired sets. In some implementations, the active pair notifier 266 may notify client services about changes to actively paired sets. In some examples, a client service is configured to modify commands issued to devices and client service behavior based on notifications provided by the active pair notifier 266.

Figure 3A:
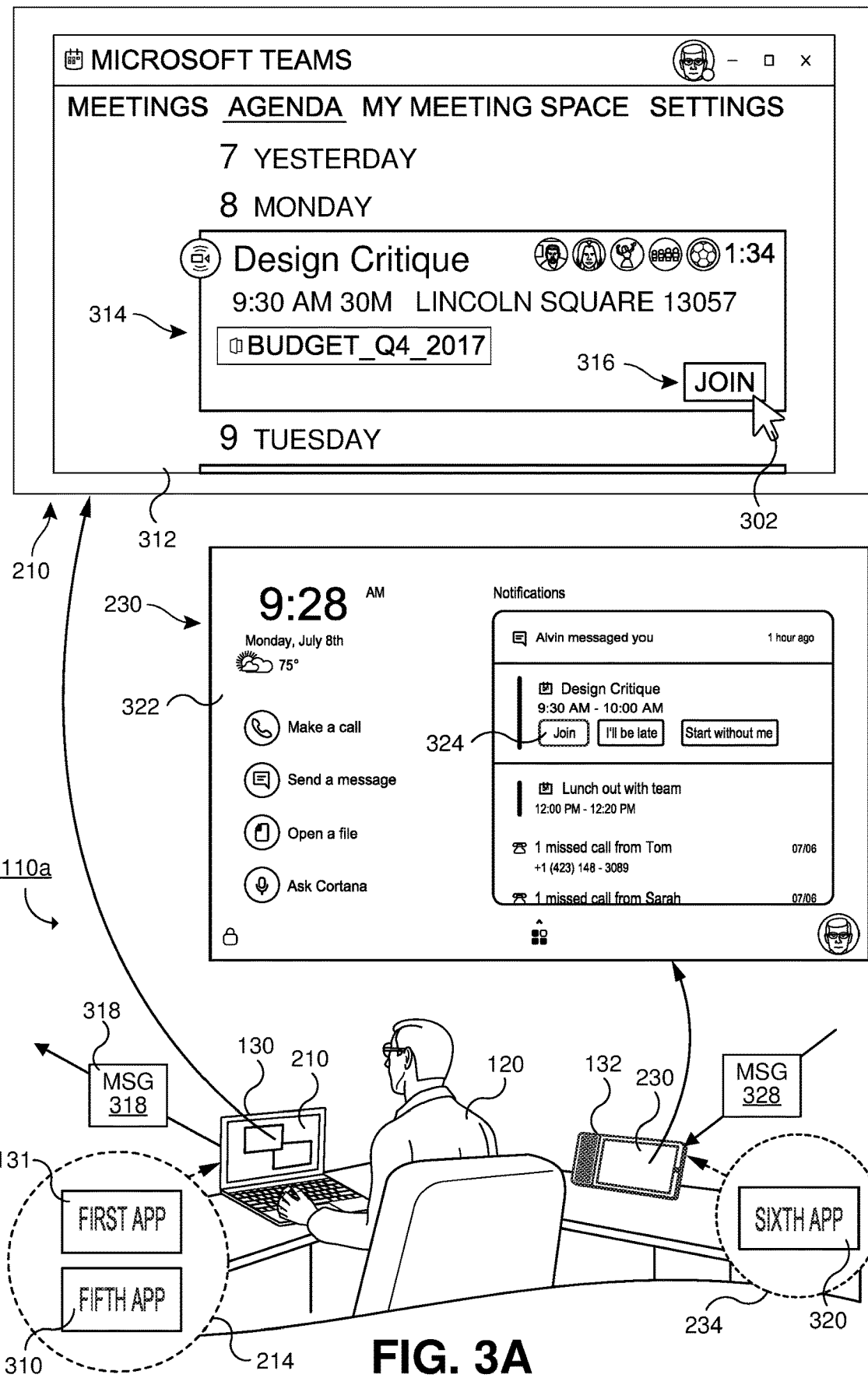
FIGS. 3A, 3B, and 3C illustrate a first example of the system shown in FIGS. 1-2B performing unified user interface (UI) interactions for user activity across multiple devices included in an actively paired set, in which use of a UI control presented by a first device results in a second device joining as an endpoint of a teleconferencing session.
Figure 3B:
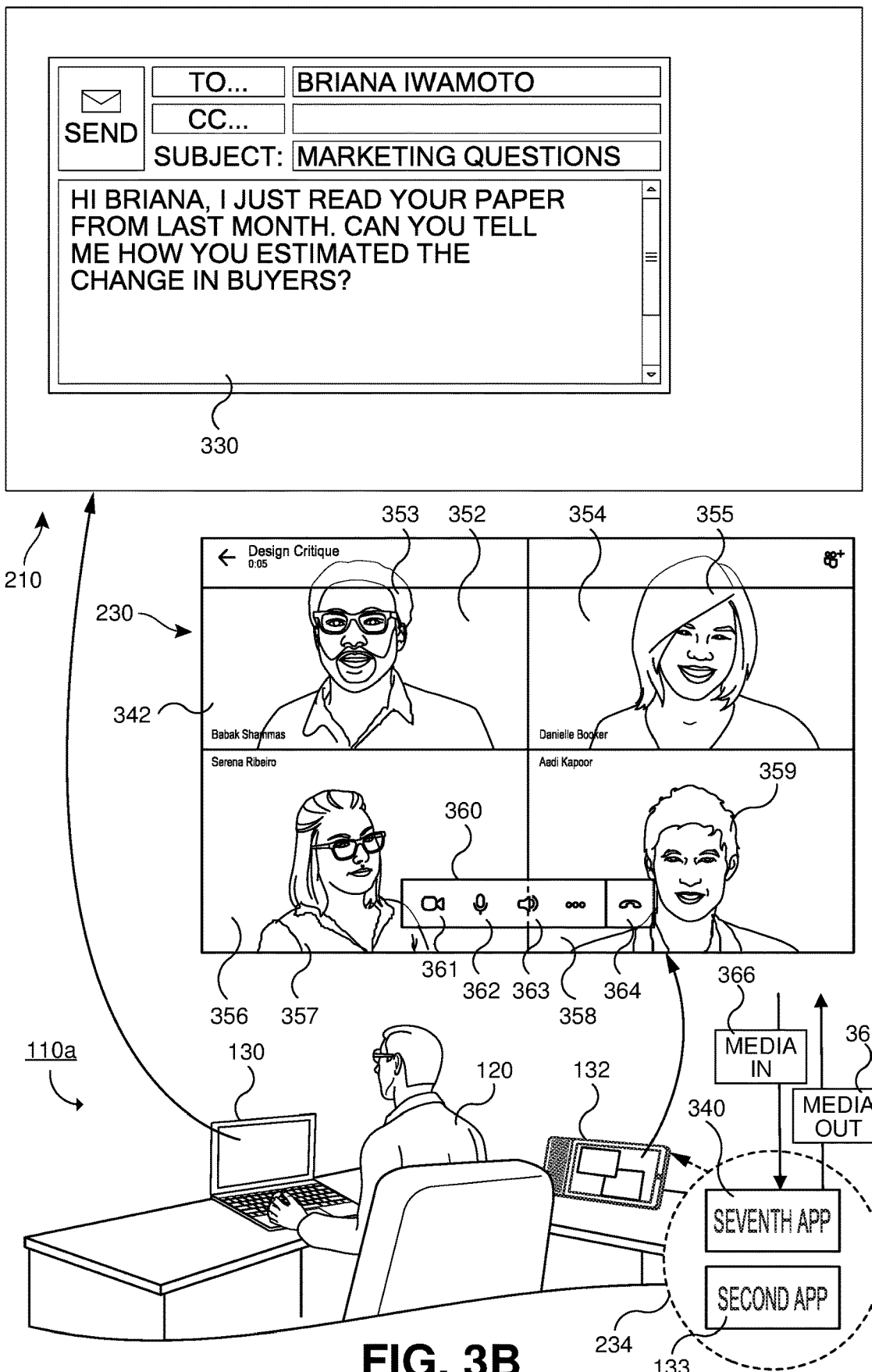
Figure 3C:
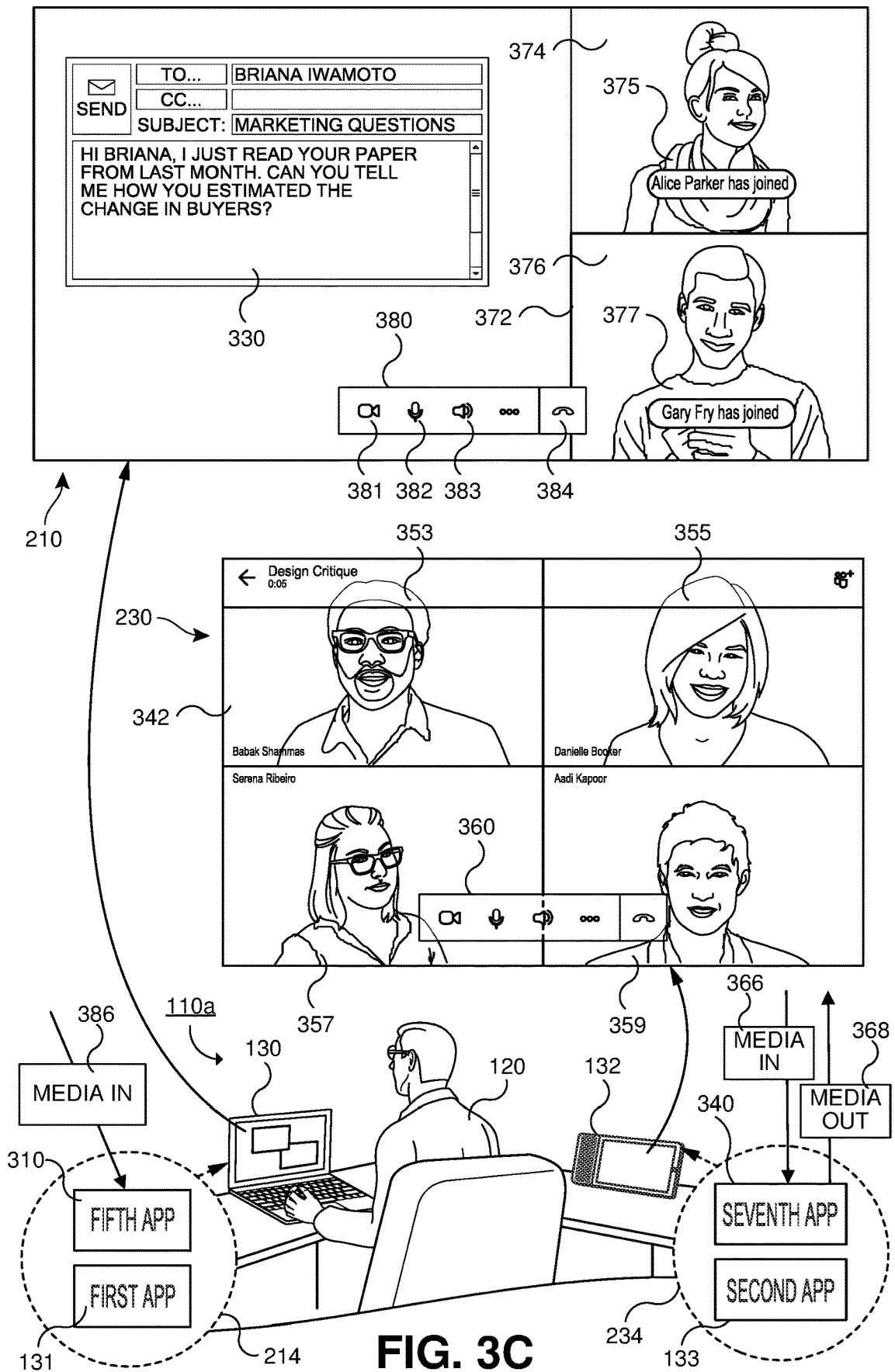

FIGS. 3A, 3B, and 3C illustrate a first example of the system 100 shown in FIGS. 1, 2A, and 2B performing unified UI interactions for user activity across multiple devices included in an actively paired set, in which use of a UI control presented by the first device 130 results in the second device 132 joining as an endpoint of a teleconferencing session. The first example in FIGS. 3A-3C may be combined with any of the examples in FIGS. 4-16C. As shown in FIG. 3A, this first example occurs during the first period of time t1 described in FIG. 1, during which the first user 120, the first device 130, and the second device 132 are at the first location 110*a*. At the time shown in FIG. 3A and via interactions with the pairing service 150, the first device 130 and the second device 132 are actively paired (meaning they included in a same actively paired set).

At this time, the first software program instance 131 (labeled "FIRST APP"), which is configured to interact with the pairing service 150 and/or the control service 250, is executed by the first device 130 in the first execution environment 214. Additionally, a fifth software program instance 310 (labeled "FIFTH APP") is also executed by the first device 130 in the first execution environment 214. In some implementations some or all of the features described for the fifth software program instance 310 may be instead be incorporated into the first software program instance 131. In some implementations, the fifth software program instance 310 is configured to interact with the first software program instance 131 for all or some interactions with the pairing service 150 and/or the control service 250. In some implementations, the fifth software program instance 310 is configured to communicate directly with the pairing service 150 for all or some interactions with the pairing service 150 and/or the control service 250. The fifth software program instance 310 is configured to interact with the teleconferencing service 180, such as to access session records 251 and participate in teleconferencing sessions. For example, the fifth software program instance 310 may incorporate various features of the Microsoft Teams™ software for the Microsoft Windows™ 10 operating system.

Also at this time, the second software program instance 133 (labeled "SECOND APP"), which is configured to interact with the pairing service 150 and/or the control service 250, is executed by the second device 132 in the second execution environment 234. Additionally, a sixth software program instance 320 (labeled "SIXTH APP") is also executed by the second device 132 in the second execution environment 234. In some implementations some or all of the features described for the sixth software program instance 320 may be instead be incorporated into the second software program instance 133. In some implementations, the sixth software program instance 320 is configured to interact with the second software program instance 133 for all or some interactions with the pairing service 150 and/or the control service 250. In some implementations, the sixth software program instance 320 is configured to communicate directly with the pairing service 150 for all or some interactions with the pairing service 150 and/or the control service 250. The sixth software program instance 320 is configured to interact with the teleconferencing service 180. In this example, the sixth software program instance 320 is configured to provide a "home screen" interface for the second device 132.

In FIG. 3A, a first UI 312 is rendered on the first display 210 for the fifth software program instance 310 and is displaying an agenda of scheduled teleconferencing sessions for the first user 120. The first UI 312 includes a scheduled teleconferencing session UI element 314 corresponding to the active session 253 in FIG. 2A. The UI element 314 includes a first session join UI control 316 (labeled "JOIN") which may be used to join the first user 120 as a participant in the active session 253, in which the users 170*a*, 170*b*, 170*c*, and 170*d* are already participating. Additionally, a second UI 322 is rendered on the second display 230 for the sixth software program instance 320 to provide the "home screen" interface. In this particular example, the second UI 322 includes a second session join UI control 324 (labeled "Join") which may also be used to join the first user 120 as a participant in the active session 253.

FIG. 3B illustrates a result of the first user 120 having actuated the first session join UI control 316 by use of a pointer 302 shown in FIG. 3A. The system 100 is configured to process the actuation of the first session join UI control 316 based on at least whether the first device 130 is included in an actively paired set. In response to the first device 130 being included in an actively paired set, the system 100 has, for example via the second software program instance 133, caused a seventh software program instance 340 executing in the second execution environment 234 to operate as an audiovisual endpoint for the first user 120 to participate in the active session 253. The seventh software program instance 340 is configured to transmit outgoing session media 368 (labeled "MEDIA OUT") for the active session 253 via network(s) 140 for rendering by devices used by session participants, such as the computing devices 170*a*, 170*b*, 170*c*, and 170*d* in FIG. 1. For example, the outgoing session media 368 may include real-time video of the first user 120 captured via the second camera 237 and/or real-time audio of the first user 120 captured via the second microphone 238.

The seventh software program instance 340 is also configured to receive and render incoming session media 366 for the active session 253. The seventh software program instance 340 is configured to render real-time video included in the incoming real-time media 366 in respective regions of a third UI 342 on the second display 230. In this example, the third UI 342 includes a first region 352 rendering a first video stream 353 of the user 160*a*, a second region 354 rendering a second video stream 355 of the user 160*b*, a third region 356 rendering a third video stream 357 of the user 160*c*, and a fourth region 358 rendering a fourth video stream 358 of the user 160*d*. The seventh software program instance 340 is also configured to render real-time audio included in the incoming real-time media 366 via the second loudspeaker 241. Thus, although the first session join UI control 316 presented by the first device 130 was used to initiate joining the active session 253, visual and audio rendering of remote participants and video and audio capture of the first user 120 are performed by the second device 312 based on it being actively paired with the first device 130. Additionally, the third UI 342 includes first session UI controls 360 that include, for example, a first camera enable/disable UI control 361 (toggling transmission of video of the first user 120), a first microphone mute UI control 362 (toggling transmission of audio of the first user 120), a first volume UI control 363 (adjusting the volume for audio rendering to the first user 120), and/or a first session termination UI control 364 (for ending participation of the first user 120 in the active session 253). Thus, the second device 132 operates as a center of focus for the active session 253 while leaving the first device 130 free for other activities, such as the third UI interface for an email program executing on the first device 130.

In various implementations, the first device 130, the second device 132, and/or the control service 250 may make a positive determination that the first device 130 and the second device 132 are included in an actively paired set. The first device 130, the second device 132, and/or the control service 250 may, based on at least that positive determination, select the second device 132 to operate as the audiovisual endpoint from the devices included in the actively paired set and cause the selected device to operate as the audiovisual endpoint (for example, via a second message 326 transmitted by the system 100 to the second device 132). As an example, in response to the actuation of the first session join UI control 316, the fifth software program 310 may transmit a first message 318 to the control service 250 indicating the actuation of the first session join UI control 316. Then, in response to obtaining information that the first device 130 and the second device 132 are actively paired (for example, by a notification from the pairing service 150) and receiving the first message 318, the control service 250 may select the second device 132 and transmit the second message 326 as a request to the second device 132 to operate as the audiovisual endpoint. As another example, in response to receiving information that the first device 130 is included in an actively paired set, the fifth software program 310 may operate in a paired mode and in response to being in the paired mode transmit the first message 318 via the pairing service 150 to the second device 132 (and received by the second device 132 as the second message 326), with the first message 318 requesting the second device 132 operate as the audiovisual endpoint. In some examples, the second device 132 may, in response to receiving the second message 326, reject the request (for example, due to the second device 132 being already engaged for another purpose), in response to which the system 100 would cause the first device 130 to serve as the audiovisual endpoint. It is understood that other approaches involving messages exchanged between and determinations by the first device 130, second device 132, and the control service 250 may be applied to the same effect.

In some examples, the system 100 is configured to obtain capability and/or configuration information for the devices included in an actively paired set and select a device based on the obtained capability information and/or configuration information. For example, capability and/or configuration information for the second device 132 may indicate it is a preferred audio visual endpoint when available, and the system 100 may select the second device 132 based on that indication. Configuration information may include, for example, a user setting, group setting, or a system setting.

It is noted that the first device 130 and the second device 132 are each configured to operate as an audiovisual endpoint when unpaired. Accordingly, based on a determination by the first device 130 and/or the control service 250 that the first device 130 is unpaired, the actuation of the first session join UI control 316 would instead result in the first device 130 operating as the audiovisual endpoint for the active session 253, much as shown for the second device 132 in FIG. 3B. Likewise, based on a determination by the second device 132 and/or the control service 250 that the second device 132 is unpaired, the actuation of the second session join UI control 316 would result in the second device 132 operating as the audiovisual endpoint for the active session 253.

As shown in FIG. 3C, in some implementations more than one device included in an actively paired set may be used concurrently to render video of other participants in the active session 253. In the example shown in FIG. 3C, the first user 120 joined the active session 253 with four other participants, with audio and video capture and rendering performed as described in FIG. 3B, after which two additional participants, with respective real-time video streams 375 and 377, have joined the active session 253. The system 100 continues to use the second device 132 to render the audio for the active session 253, render the real-time video streams 353, 355, 357, and 359, and capture real-time video and audio of the first user 120, with the seventh software program instance 340 receiving inbound media 366 and transmitting outbound media 368 as described in FIG. 3B.

However, rather than rendering all six video streams 353, 355, 357, 359, 375, and 377 together on the second device 132, the system 100 is configured to have multiple devices included in an actively paired set (and, in some examples, determined to be video rendering capable based on capability and/or configuration information obtained for the devices) each rendering a portion of the video streams for the active session 253. This allows rendered sizes to be larger than would be achieved with a single device. In some implementations, the system 100 is configured to select a primary video rendering device and, based on information about the video streams and the devices included in an actively paired set, select and use one or more additional video rendering devices for rendering respective portions of the video streams. In some examples, use of a device as an additional video rendering device is based on a type of activity and/or level of activity; for example, if the first device 130 not been actively used recently it may be more likely that the system 100 will select and use the first device 130 as an additional video rendering device. In some examples, use of an additional rendering device may be based on the number of video streams to be rendered; for example, the system 100 may be configured to limit the second device 100 to rendering four video streams unless there are more than six video streams (in which case a different rendering approach might be used).

In FIG. 3C, based on the number of video streams and the first device 130 and the second device 132 being in an actively paired set, the system 100 is rendering the real-time video streams 375 and 377 on the first device 130. As a result, the fifth software program instance 310 is configured to receive and render incoming session media 386 (labeled "MEDIA IN") for the active session 253. The fifth software program instance 310 is configured to render real-time video included in the incoming session media 386 in respective regions of a fourth UI 376 on the first display 210. In this example, the fourth UI 376 includes a fifth region 374 rendering the video stream 375, and a sixth region 376 rendering the video stream 377. In this example, the second device 132 is still used to capture video and audio of the first user 120 and transmit outgoing session media 368, and render audio for the active session 253, as described in FIG. 3B. In some implementations, the system 100 is configured to render audio for a participant on the same device used to render the video stream for the participant.

Additionally, in some implementations the fifth software program instance 310 is configured to also present second session UI controls 380 on the first display 210 similar to, and at the same time as, the first UI controls 360. In this example, the second session UI controls include UI controls 381, 382, 383, and 384 with the same functions as the respective UI controls 361, 362, 363, and 364 shown on the second display 230. It is noted that actuation of the UI controls 381, 382, and 383 result in transmission of respective messages by the first device 130 (for example, to the control service 250 and/or the second device 132) that cause the system 100 to cause the seventh software program instance 340 to, respectively, toggle video transmission, toggle audio transmission, and adjust the volume for audio rendering. Both UI control 384 on the first device 130 and the UI control 364 on the second device 132 can be used to end participation in the active session 253. Thus, the first user 120 can readily submit commands for the active session 253 whether their attention at that time is directed to the first device 130 or the second device 132. In some examples, the fifth software program instance 310 may be configured to present the second session UI controls 380 on the first display 210 even when not presenting the fourth UI 376.

With regard to the examples of FIGS. 3B and 3C, devices used by the system 100 to render and capture audio and video for a teleconferencing session may change dynamically in response to devices being added to or removed from actively paired sets. For example, if the second device 132 were to be turned off or lose network connectivity, the system 100 may be configured to instead use the first device 130 to render and capture all of the audio and video for the active session 253.

Figure 4:
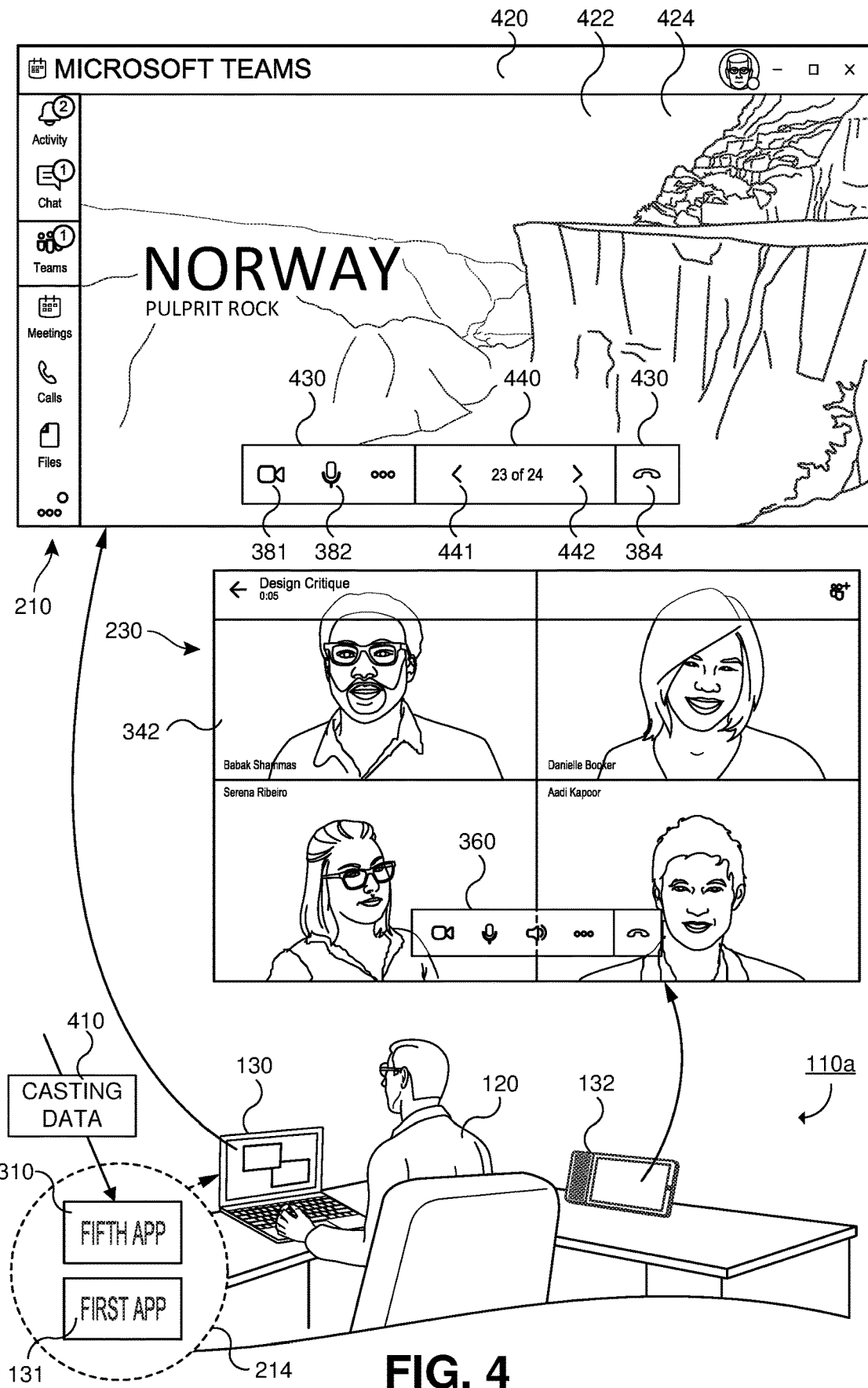
FIG. 4 illustrates a second example of the system shown in FIGS. 1-2B performing unified UI interactions for user activity across multiple devices included in an actively paired set, in which, while maintaining the second device as a primary audiovisual endpoint for an active session, a casting portion of the active session initiated by a remote participant is presented via the first device.

FIG. 4 illustrates a second example of the system 100 shown in FIGS. 1, 2A, and 2B performing unified UI interactions for user activity across multiple devices included in an actively paired set, in which, while maintaining the second device 132 as a primary audiovisual endpoint for the active session 253, a casting portion of the active session 253 initiated by a remote participant is presented via the first device 130. FIG. 4 continues from the state shown in FIG. 3B, and may be combined with any of the examples described in FIGS. 3A-3C and 5A-16C.

In FIG. 4, one of the remote participants of the active session 253 has initiated a casting portion of the active session 253. The casting portion may include, for example, "screencasting" a portion of a remote participant's display, although other casting techniques may be used. The system 100 is configured to, in response to a determination that the first device 130 and the second device 132 are included in an actively paired set and a notification of the casting portion, continue to use the second device 132 as an audiovisual endpoint as described in FIG. 3B and at the same time cause the first device 130 to operate as a casting endpoint where casting content is rendered on the first display 210. Various approaches involving messages exchanged between and determinations by the first device 130, second device 132, and the control service 250 may be used. For example, the control service 250 may be configured to identify these conditions through interactions with the pairing service 150 and the teleconferencing service 180 and transmit a message to the first device 130 requesting it begin operating as a casting endpoint for the casting portion.

In this example, the fifth software program instance 310 is configured to receive and respond to (for example, by rendering visual casting content 424 on the first display 210) casting data 410 for the casting portion of the active session 253. The fifth software program instance 310 (although a different software program instance may be used) is configured to present a fifth UI 420 including a content display region 422 in which visual casting content 424 included in the casting data 410 is rendered. Additionally, in some implementations the fifth software program instance 310 is configured to also present third session UI controls 430 on the first display 210 much as previously described for the second session UI controls 380 in FIG. 3C. In this example, the third session UI controls 430 include the UI controls 381, 382, and 384 described above. In some examples, the third session UI controls 430 also include casting view UI controls 440 that control rendering of the casting data 410 by the fifth software program instance 310. In this example, the casting view UI controls 440 include a back navigation UI control 441 and a forward navigation UI control 442 that allow the first user 120 to asynchronously move backward or forward through the document being casted in FIG. 4. Thus, the first user 120 can readily submit commands for the active session 253 whether their attention at that time is directed to the first device 130 or the second device 132.

It is noted that the system 100 is configured to, in response to the second device 132 not being in an actively paired set and used to join the active session 253 including the casting portion, use the second device 132 to receive the casting data 410 and render the visual casting content 424 on the second display 230. The system 100 is configured to use the first device 130 is a similar standalone manner in response to the first device 130 not being in an actively paired set. However, as shown in FIG. 4, the system 100 offers the first user 120 an improved experience when both the first device 130 and the second device 132 are in an actively paired set during the active session 253.

Figure 5A:
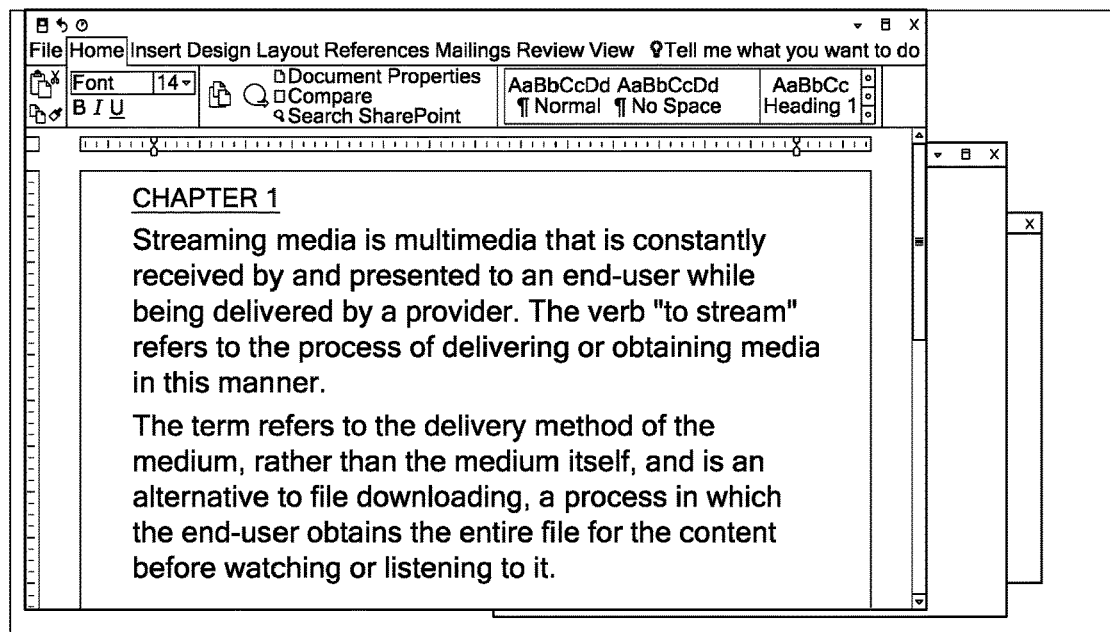
FIGS. 5A, 5B, and 5C illustrate a third example of the system shown in FIGS. 1-2B performing unified UI interactions for user activity across multiple devices included in an actively paired set, in which a first user initiates a casting portion of the active session from the first device using a UI control on the second device.
Figure 5A:
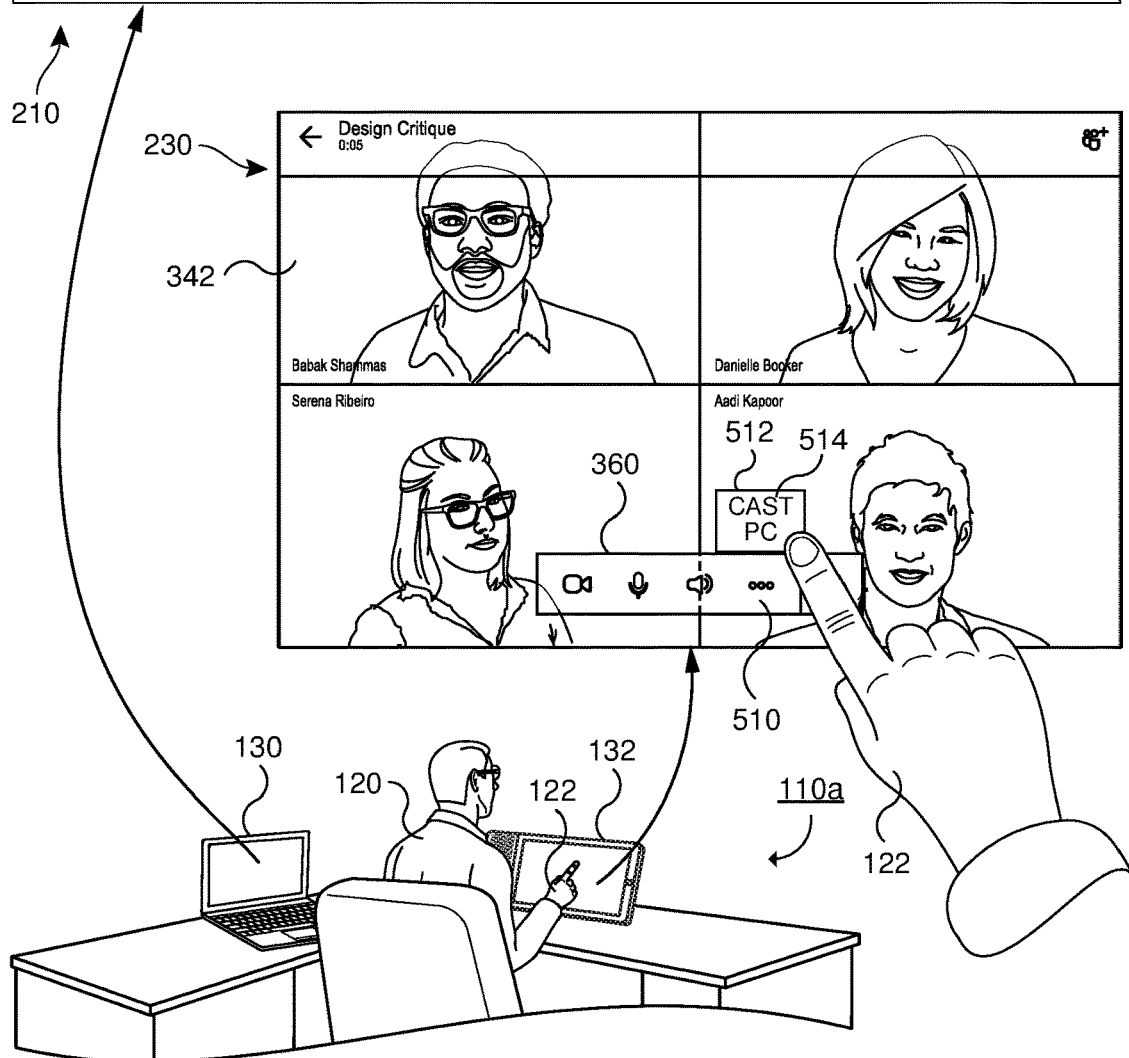
Figure 5B:
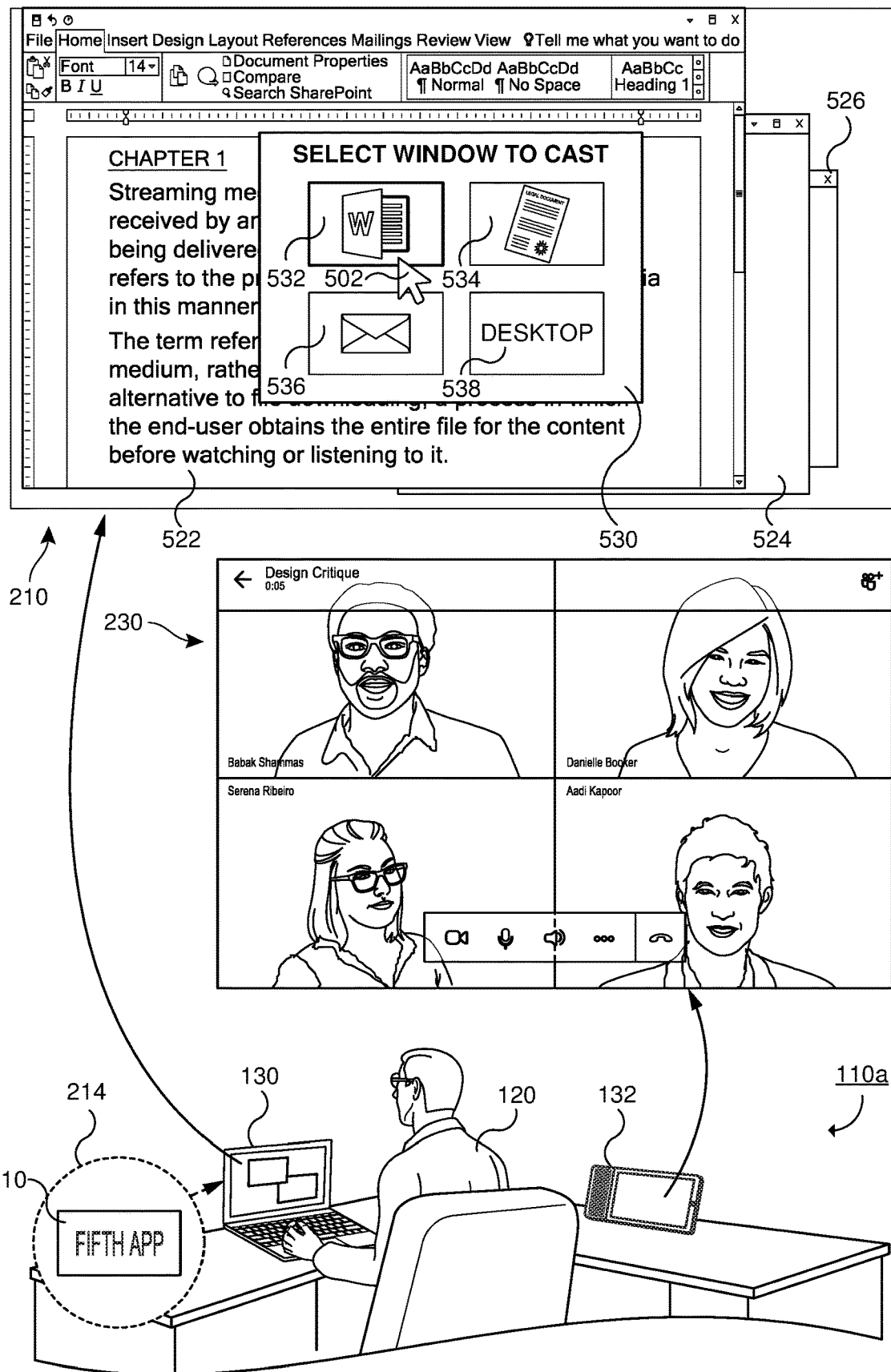
Figure 5C:
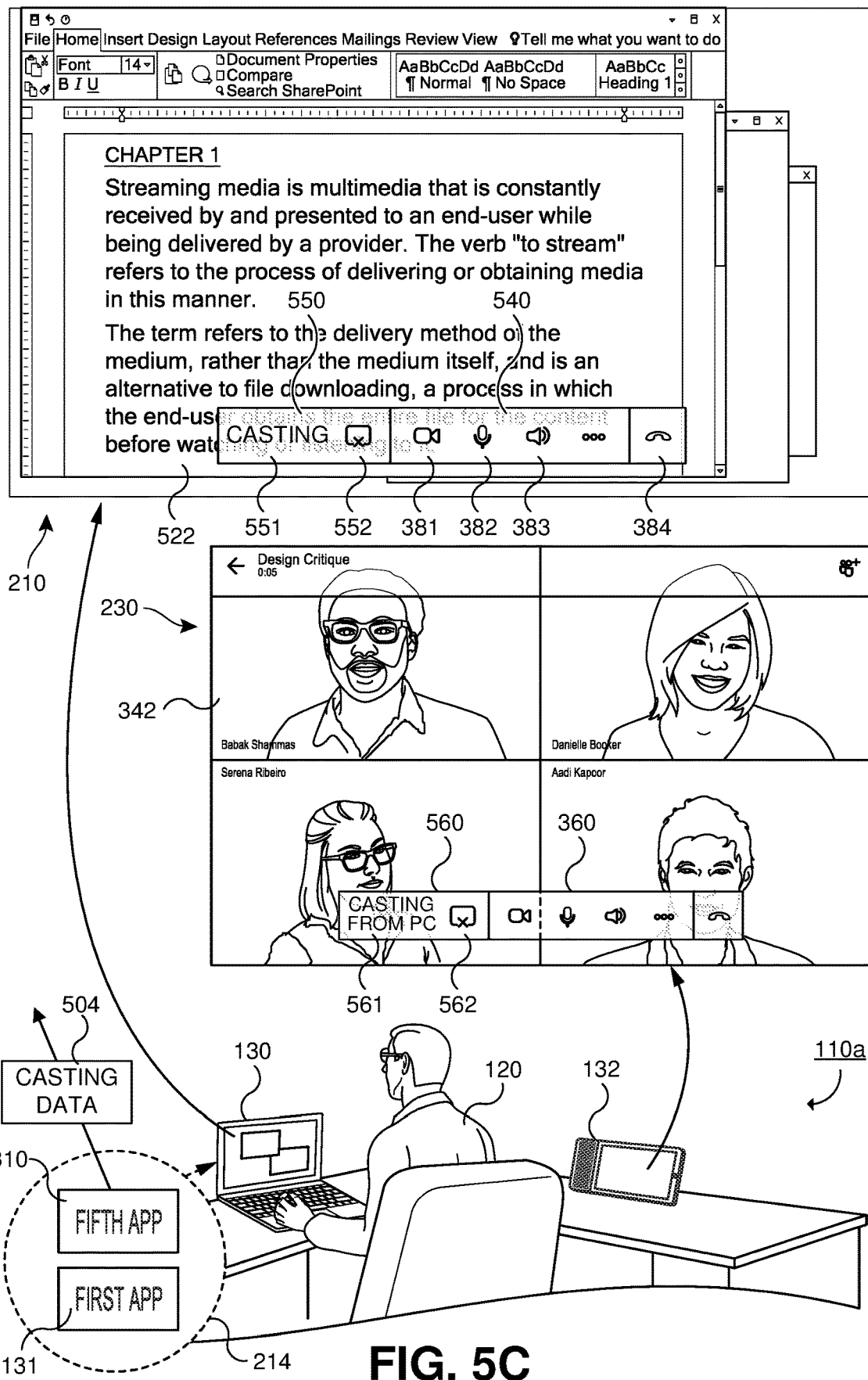

FIGS. 5A, 5B, and 5C illustrate a third example of the system 100 shown in FIGS. 1, 2A, and 2B performing unified UI interactions for user activity across multiple devices included in an actively paired set, in which the first user 120 initiates a casting portion of the active session 253 from the first device 130 using a UI control on the second device 132. The third example in FIGS. 5A-5C continues from the state shown in FIG. 3B, and may be combined with any of the examples described in FIGS. 3A-4 and 6A-16C. In FIG. 5A, the first user 120 is initiating a casting portion of the active session 253 via the second device 132. Since the second device 132 may have been the area of user attention for the active session 253, it can be more efficient to initiate casting from the second device 132. To do this, using a hand 122 to provide input via the touchscreen 239, the first user 120 actuates a UI control 510 to present a casting device list 512. The system 100 is configured to identify the devices included in the actively paired set with the second device 132 that are capable of casting content (for example, based on capability and/or configuration information obtained for the devices) and present the identified devices as available casting devices with respective casting device selector UI controls 514. In this example, the first device 130 (which has been given the human-readable identifier "PC") is the only identified casting device, and as a result only one casting device selector UI control 514 (with the text "CAST PC") is included in the casting source list 512. Here, the first user 120 actuates the casting device selector UI control 514, selecting the first device 130.

FIG. 5B illustrates a casting source selection operation that may be performed by the system 100 in response to determining that the selected device offers multiple casting sources (which, in some examples, may be identified by the selected device in response to the actuation of the device selector UI control 514). In this example, the fifth software program instance 310 is configured to identify the casting sources available from the first device 130. However, if the selected device does not offer multiple casting sources, the system 100 may skip this casting source selection operation.

In FIG. 5B, in response to a determination that the selected first device 130 offers multiple casting sources, the system 100 displays a casting source selection UI 530 to the first user 120. In this example, the system 100 is configured to present the casting source selection UI 530 via the selected first device 130 (in this example, on the first display 210 via the fifth software program instance 310), but in some examples the system 100 may instead display the casting source selection UI 530 via the second device 132 on which the device selector UI control 514 was actuated. The casting source selection UI 530 includes a casting source selector UI control for each casting source available on the selected device. As illustrated in FIG. 5B, the first device 130 can provide window-specific casting sources, and accordingly the casting source selection UI 530 includes casting source selector UI controls 532, 534, and 536 for respective windows 522, 524, and 526. Many devices can provide a full display area as a casting source, as indicated for the first device 130 by a casting source selector UI control 538 included in the casting source selection UI 530. In the example shown in FIG. 5B, the first user 120 uses a pointer 502 to actuate the casting source selector UI control 532 for the window 522.

FIG. 5C continues the initiation of the casting portion. The system 100 is configured to, in response to the actuation of the casting device selector UI control 514 and/or casting source selector UI control 532, configure the selected first device 130 to begin transmitting casting data 540 for rendering to remote participants. In this example, the system 100 causes the fifth software program instance 310 to generate and transmit the casting data 504. Additionally, in some implementations the fifth software program instance 310 is configured to present fourth session UI controls 540 on the first display 210 much as previously described for the second session UI controls 380 in FIG. 3C. In this example, the fourth session UI controls 540 include the UI controls 381, 382, 383, and 384 described above. In some examples, the fourth session UI controls 540 also include casting source UI controls 550 that control the casting portion of the active session 253. In this example, the casting source UI controls 550 include a casting indicator 551 (indicating that the first device 130 is casting) and a casting termination UI control 552 that causes the system 100 to terminate the casting portion. In some implementations, the sixth program software instance 540 in configured to include similar casting source UI controls 560 in the first session UI controls 360. In this example, the casting source UI controls 560 include a casting indicator 561 (indicating that the first device 130 is casting) and a casting termination UI control 562 that causes the system 100 to terminate the casting portion.

Figure 6A:
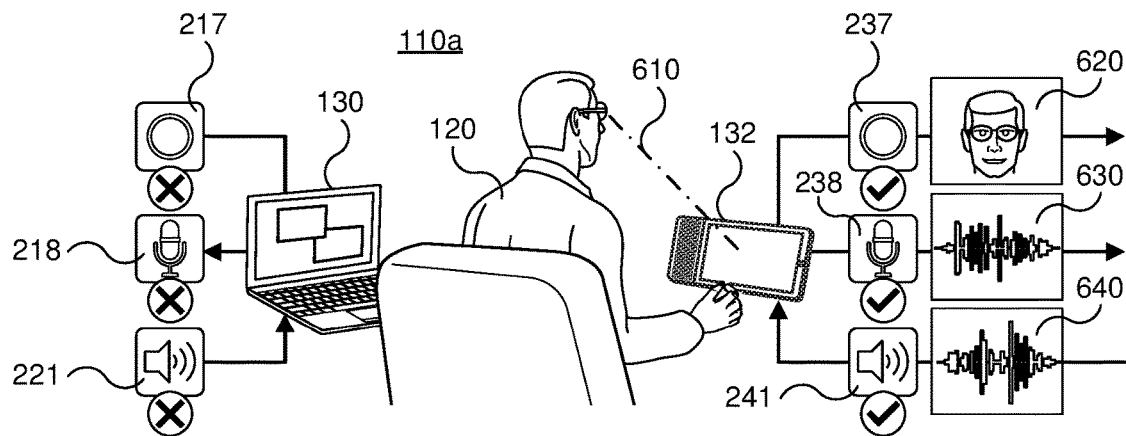
FIGS. 6A, 6B, and 6C illustrate a fourth example of the system shown in FIGS. 1-2B performing unified UI interactions for user activity across multiple devices included in an actively paired set, in which capture of real-time media streams is selectively performed by the first and second devices based on detection of attention of the first user.
Figure 6B:
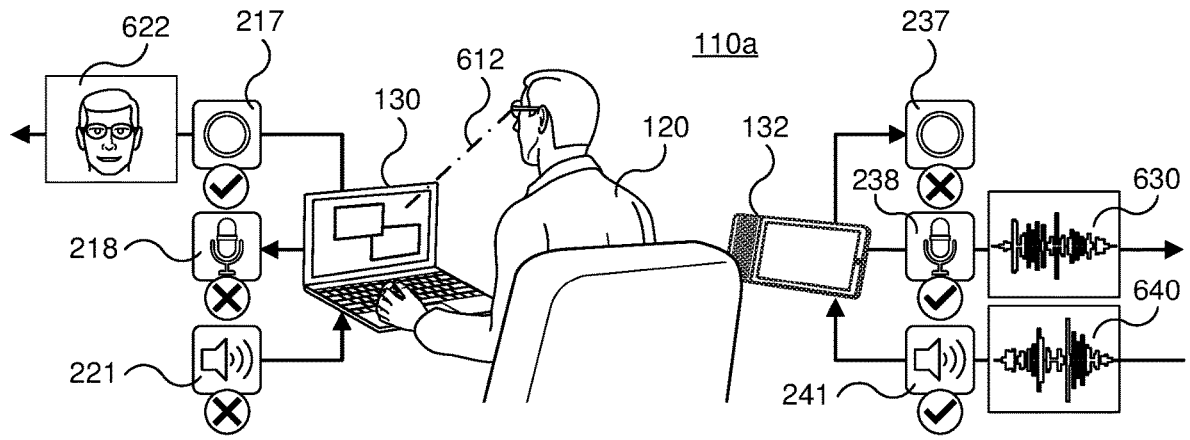
Figure 6C:
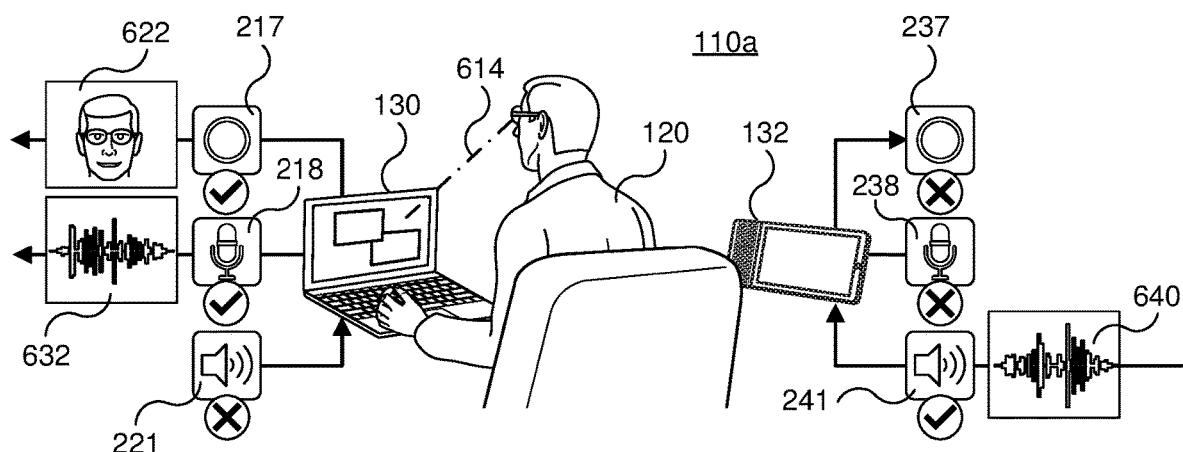

FIGS. 6A, 6B, and 6C illustrate a fourth example of the system 100 shown in FIGS. 1, 2A, and 2B performing unified UI interactions for user activity across multiple devices included in an actively paired set, in which capture of real-time media streams is selectively performed by the first and second devices 130 and 132 based on detection of attention of the first user 120. The fourth example in FIGS. 6A-6C continues from the example shown in FIG. 5A, and may be combined with any of the examples described in FIGS. 3A-5C and 7A-16C.

In FIG. 6A, the system 100 is configured to, in response to the second device 132 being in an actively paired set with the first device 130, identify which of the devices included in the actively paired set and capable of real-time video capture has the attention of the first user 120, and configure the identified device to capture and transmit a video stream of the first user 120 for the active session 253. In some implementations, the system is configured to identify devices capable of real-time video capture based on capability and/or configuration information obtained for the devices (which may reflect a temporary user-initiated disabling of a camera). In some implementations, the system 100 is configured to evaluate user attention based on, for example, detected head and/or eye direction (for example, via images captured by cameras 217 and/or camera 237), detected user proximity (for example, via images captured by cameras 217 and/or camera 237), and/or user input activity (for example, via keyboard, pointer, or touchscreen). In the particular example shown in FIG. 6A, both the first device 130 and the second device 132 are capable of video capture via respective cameras 217 and 237, and based on a detected gaze direction 610 toward the second device 132, the system 100 has determined that the attention of the first user 120 is directed at the second device 132. Based on this determination, the system 100 configures the second device 132 to capture and transmit an outbound real-time video stream 620 using the second camera 237, capture and transmit an outbound real-time audio stream 630 using the second microphone 238, and render an inbound real-time audio stream 640 using the second loudspeaker 241. Also based on this determination, system 100 configures the first device 130 not to use the first camera 217, the first microphone 218, or the first loudspeaker 221 for generating or rendering media for the active session 253.

In FIG. 6B, continuing the example in FIG. 6A, based on a detected gaze direction 612 toward the first device 130, the system 100 has determined that the attention of the first user 120 is newly directed at the first device 130. Based on this determination, the system 100 configures the second device 132 to stop transmitting the outbound real-time video stream 620, and configures the first device 130 to capture and transmit an outbound real-time video stream 622 using the first camera 217 to replace the outbound real-time video stream 620. As a result, the real-time video provided by the actively paired set to remote participants better captures the first user 120.

As shown in FIG. 6C, the system 100 may be further configured to identify which of the devices included in the actively paired set and capable of real-time audio capture has the attention of the first user 120, and configure the identified device to capture and transmit an audio stream of the first user 120 for the active session. In some implementations, the system is configured to identify devices capable of real-time audio capture based on capability and/or configuration information obtained for the devices. In FIG. 6C, based on a detected gaze direction 614 toward the first device 130, the system 100 has determined that the attention of the first user 120 is directed at the first device 130. Based on this determination, the system 100 configures the second device 132 to not transmit the outbound real-time video stream 620 or the outbound audio stream 630, and configures the first device 130 to capture and transmit the outbound real-time video stream 622 and capture and transmit a real-time audio stream 632 using the first microphone 218 to replace the outbound real-time audio stream 630. As a result, the real-time audio provided by the actively paired set to remote participants better captures the first user 120. In some examples, based on capability and/or configuration information obtained for the devices the system 100 may identify the second device 100 as a primary audio capture device and accordingly not switch from using the second microphone 238 (resulting in the configuration shown in FIG. 6B). This may allow a superior microphone 238 or audio processing pipeline in the second device 132 to continue to be used to maintain audio quality. In FIGS. 6A-6C, the system 100 has identified the second device 132 as a primary audio rendering device (for example, based on capability and/or configuration information obtained for the devices), and as a result configures the second device 132 to render the real-time audio stream 640. This may allow a superior loudspeaker 241 to continue to be used to maintain audio quality.

FIGS. 7A, 7B, 7C, and 7D illustrate a fifth example of the system 100 shown in FIGS. 1, 2A, and 2B performing unified UI interactions for user activity across multiple devices included in an actively paired set, in which media rendering is selectively performed via the first and second devices 130 and 132 based on detection of attention of the first user 120. The fifth example in FIGS. 7A-7D continues from the state shown in FIG. 6A, and may be combined with any of the examples described in FIGS. 3A-6C and 8A-16C. In FIGS. 7A-7D, the system 100 is configured to, in response to the second device 132 being in an actively paired set with the first device 130, identify which of the devices included in the actively paired set and capable of video rendering has the attention of the first user 120, and configure the identified device to render selected video content for the active session 253. In some implementations, the system is configured to identify devices capable of video rendering based on capability and/or configuration information obtained for the devices (which may reflect a device being in a locked state in which it is unable to render video on a display).

Figure 7A:
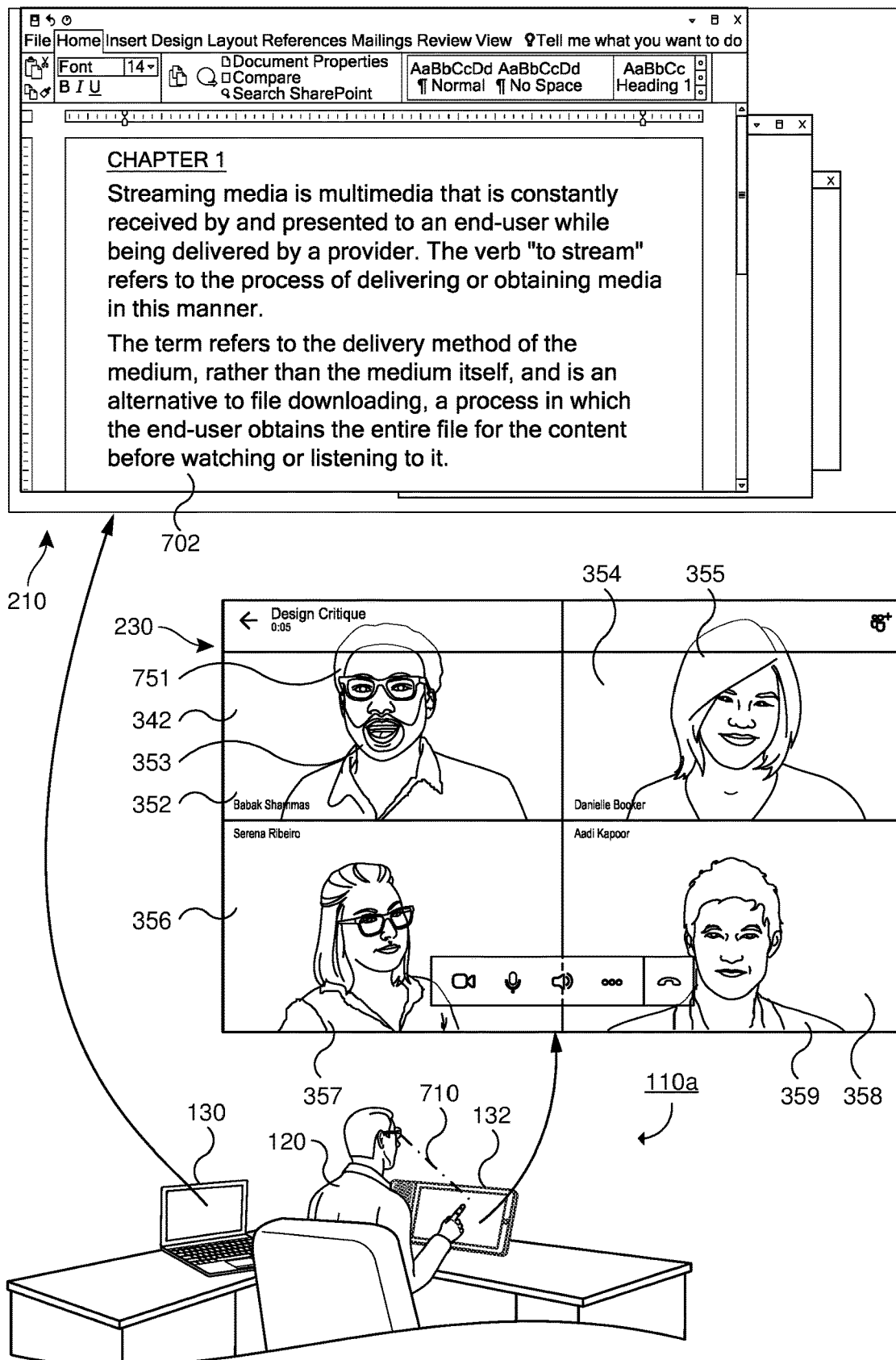
FIGS. 7A, 7B, 7C, and 7D illustrate a fifth example of the system shown in FIGS. 1-2B performing unified UI interactions for user activity across multiple devices included in an actively paired set, in which media rendering is selectively performed via the first and second devices based on detection of attention of the first user.
Figure 7B:
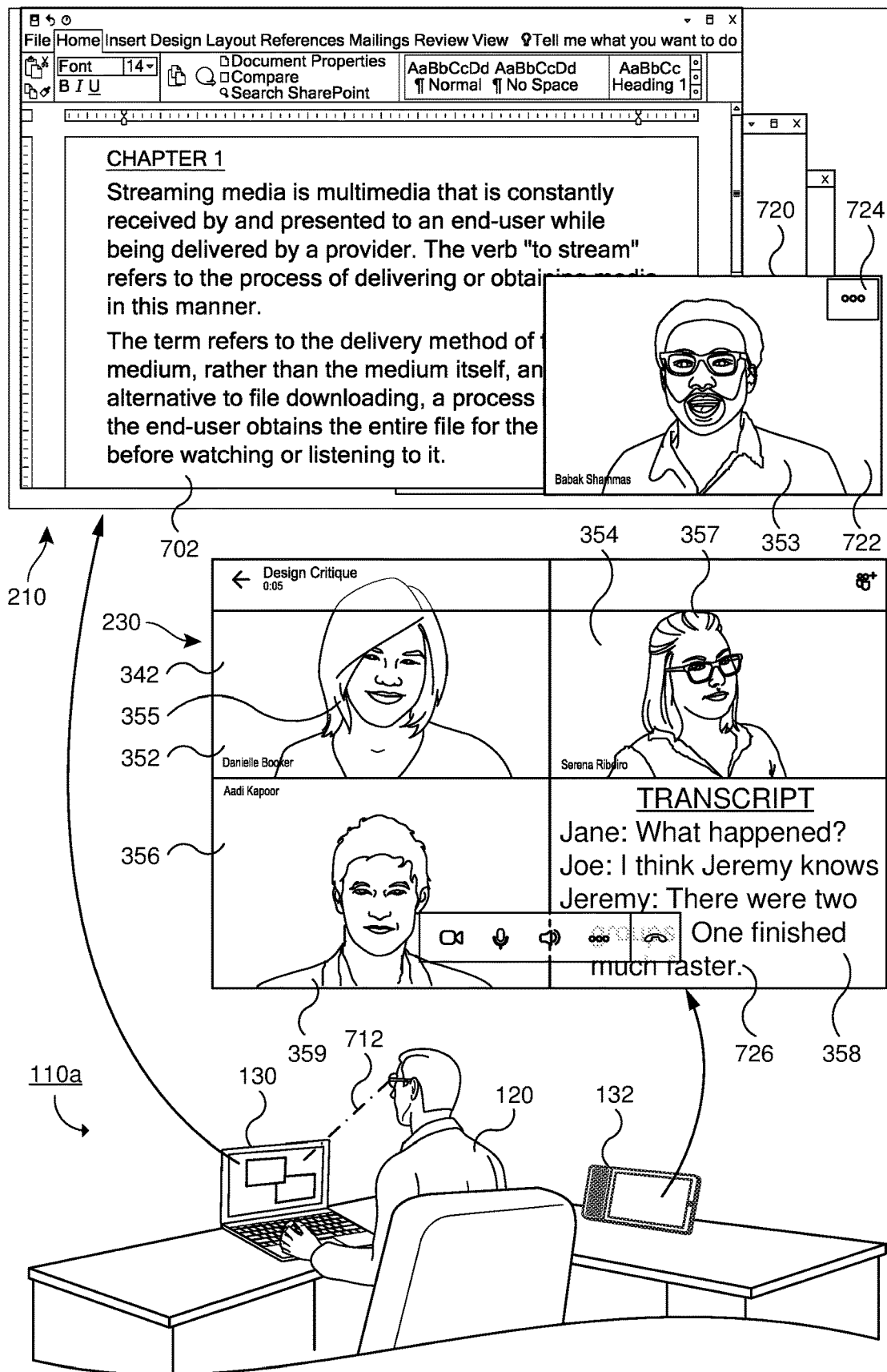
Figure 7C:
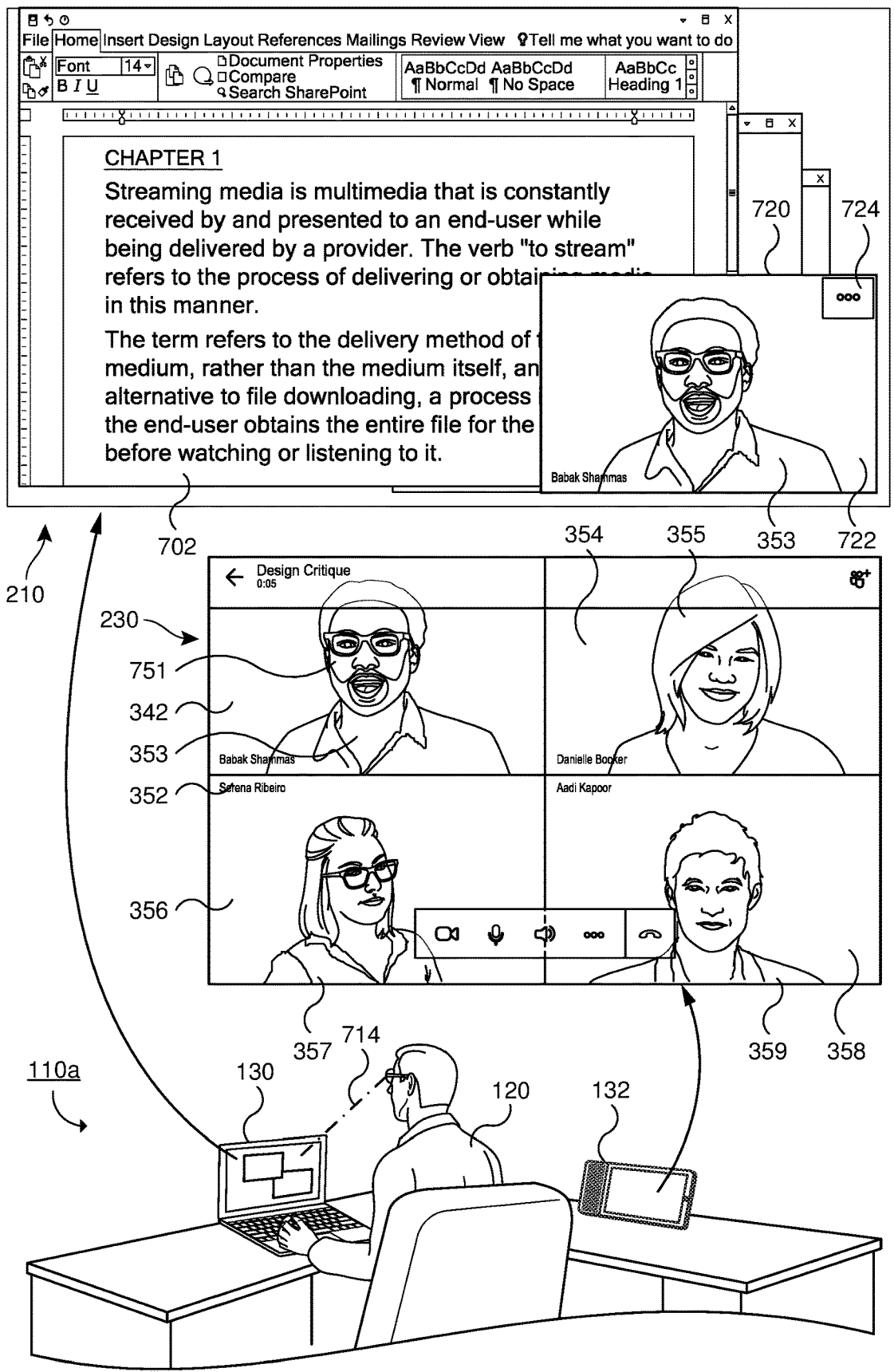

In FIGS. 7A-7C, the system 100 is configured to identify a most recently active speaker 751 from the remote participants of the active session 253, and configure the identified device to render a real-time video stream corresponding to the most recently active speaker 751. In the particular examples shown in FIGS. 7A-7C, the most recently active speaker 751 is the user 160a corresponding to the real-time video stream 353. In FIG. 7A, as in FIG. 6A, based on a detected gaze direction 710 toward the second device 132, the system 100 has determined that the attention of the first user 120 is directed at the second device 132. Based on this determination, the system 100 configures the second device 132 to render the real-time video stream 353 corresponding to the most recently active speaker 751 in the first region 352 (much as shown in FIG. 3B), and configures the other devices in the actively paired set (in this example, the first device 130) not to render the real-time video stream 353. In FIG. 7A, the real-time video streams 353, 355, 357, and 359 are rendered by the second device 132 in respective regions 352, 354, 356, and 358 of the third UI 342.

In FIG. 7B, the system 100 is configured to render the real-time video stream corresponding to the most recently active speaker 751 on only one of the devices included in the actively paired set at a time. Continuing the example in FIG. 7A, based on a detected gaze direction 712 toward the first device 130, the system 100 has determined that the attention of the first user 120 is newly directed at the first device 130, as in FIG. 6B. Based on this determination, the system 100 configures the second device 132 to stop rendering the real-time video stream 353 (and the system 100 may stop transmitting the real-time video stream 353 to the second device 132), and configures the fifth software program instance 310 executing on the first device 130 to receive and render the real-time video stream 353 on the first display 210 in a region 722 of a sixth UI 720. As a result, the first user 120 is more engaged with the active session 253 while engaging in an activity on the first device 130. In some implementations, the sixth UI 720 includes a compact fifth session UI control 724 that may be actuated to expose controls similar to the second session UI controls 380 in FIG. 3C. In some implementations, the third UI 342 is also rearranged, and new content may be included in the third UI 342 to make more effective use of space previously used to render video of the most recently active speaker 751. In the particular example shown in FIG. 7B, the real-time video streams 355, 357, and 359 are moved to respective regions 352, 354, and 356, and the region 358 is used to display content 726 (in this example, showing a live transcript of the active session 253). It is noted that in response to the most recently active speaker 751 changing to a different remote participant, the system 100 will accordingly modify the video streams rendered by the first device 130 and the second device 132.

FIG. 7C shows an alternative to FIG. 7B, in which the system 100 is configured to render the real-time video stream corresponding to the most recently active speaker 751 on both the second device 132 (for example, based on identifying the second device 132 as a primary audiovisual device) and, if different from the second device 132, the device included in the actively paired set and capable of video rendering determined as having the attention of the first user 120. As in FIG. 7B, based on a detected gaze direction 714 toward the first device 130, the system 100 has determined that the attention of the first user 120 is directed at the first device 130. The real-time video streams 353, 355, 357, and 359 continue to be rendered in the regions 352, 354, 356, and 358 of the third UI 342, as in FIG. 7A. As in FIG. 7B, based on the determination, the system 100 configures the fifth software program instance 310 executing on the first device 130 to receive and render the real-time video stream 353 on the first display 210 in the region 722 of the sixth UI 720 described in FIG. 7B. The sixth UI 720 may also include the compact fifth session UI control 724 described in FIG. 7B. It is noted that in response to the most recently active speaker 751 changing to a different remote participant, the system 100 will accordingly modify the video streams rendered by the first device 130 in the sixth UI 720. Although FIGS. 7B and 7C show examples in which the rendering of one real-time video stream follows the attention of the first user 120, in some examples multiple real-time video streams may follow the attention of the first user 120; for example, in FIG. 7B, all four of the real-time video streams may be rendered by the first device 130 in a manner that allows the first user 130 to make use of other areas of the first display 210.

Figure 7D:
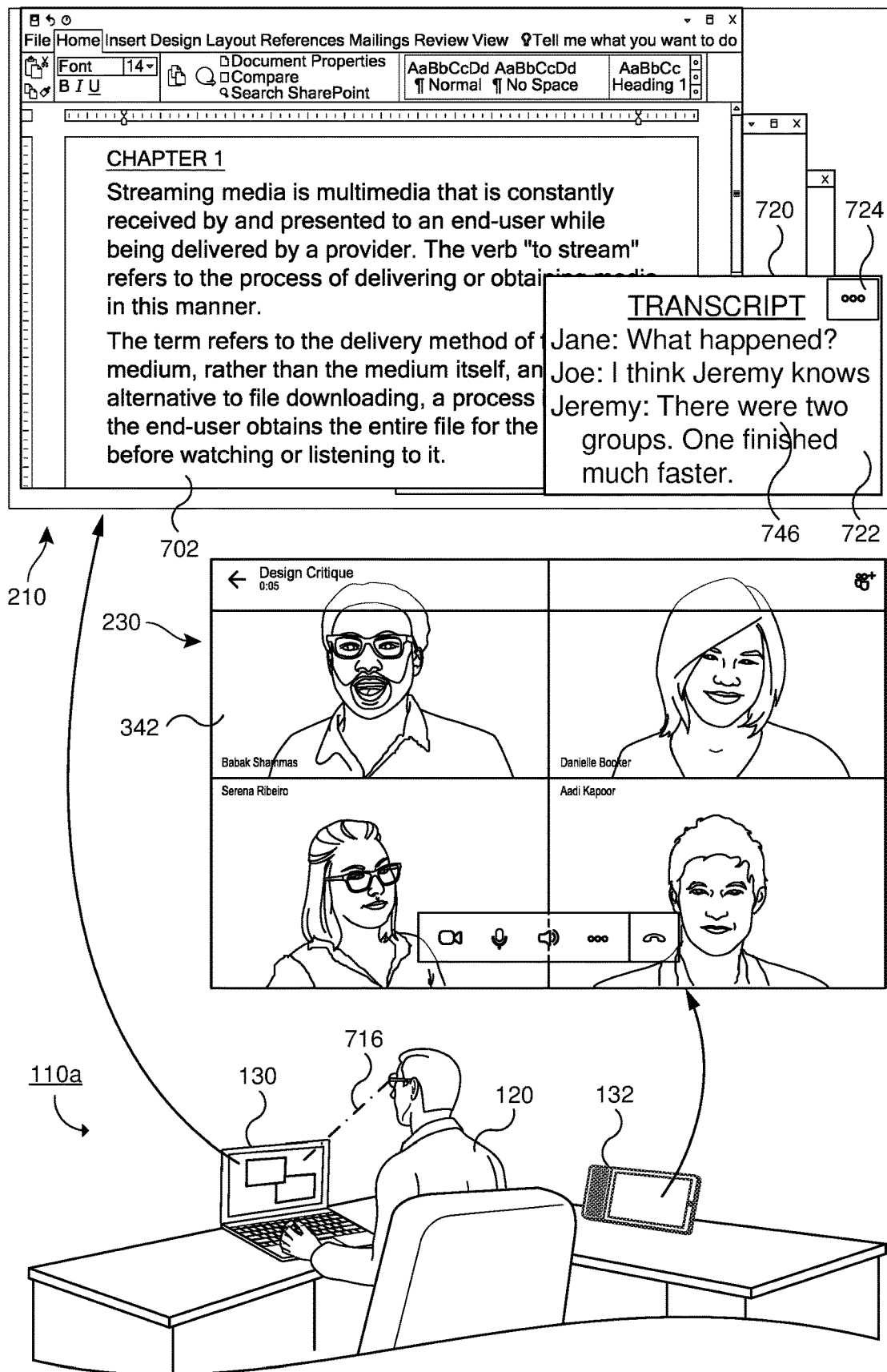

FIG. 7D continues the example of FIG. 7C. In the particular example shown in FIG. 7D, the compact fifth session UI control 724 includes one or more UI controls (not shown) allowing the first user 120 select one of multiple video content items for the active session 253 for rendering via the sixth UI 720 (or otherwise by the device identified as having attention). Example video content items include, but are not limited to, a real-time video stream associated with the most recently active speaker 751 (as shown in FIG. 7C), a live transcript of the active session 253 (as shown in region 358 in FIG. 7B), a casting portion (as shown in region 422 in FIG. 4), and a whiteboard (virtual or actual). In FIG. 7D, the local user 120 has selected the live transcript as the selected video content 746 shown in the region 722 of the sixth UI 720. In some implementations, the selected video content item is stored and used in later teleconferencing sessions involving an actively paired set. In some implementations, the example of FIG. 7C may be modified to show a live transcript, a casting portion, or a whiteboard instead of the most recently active speaker 751.

Figure 8A:
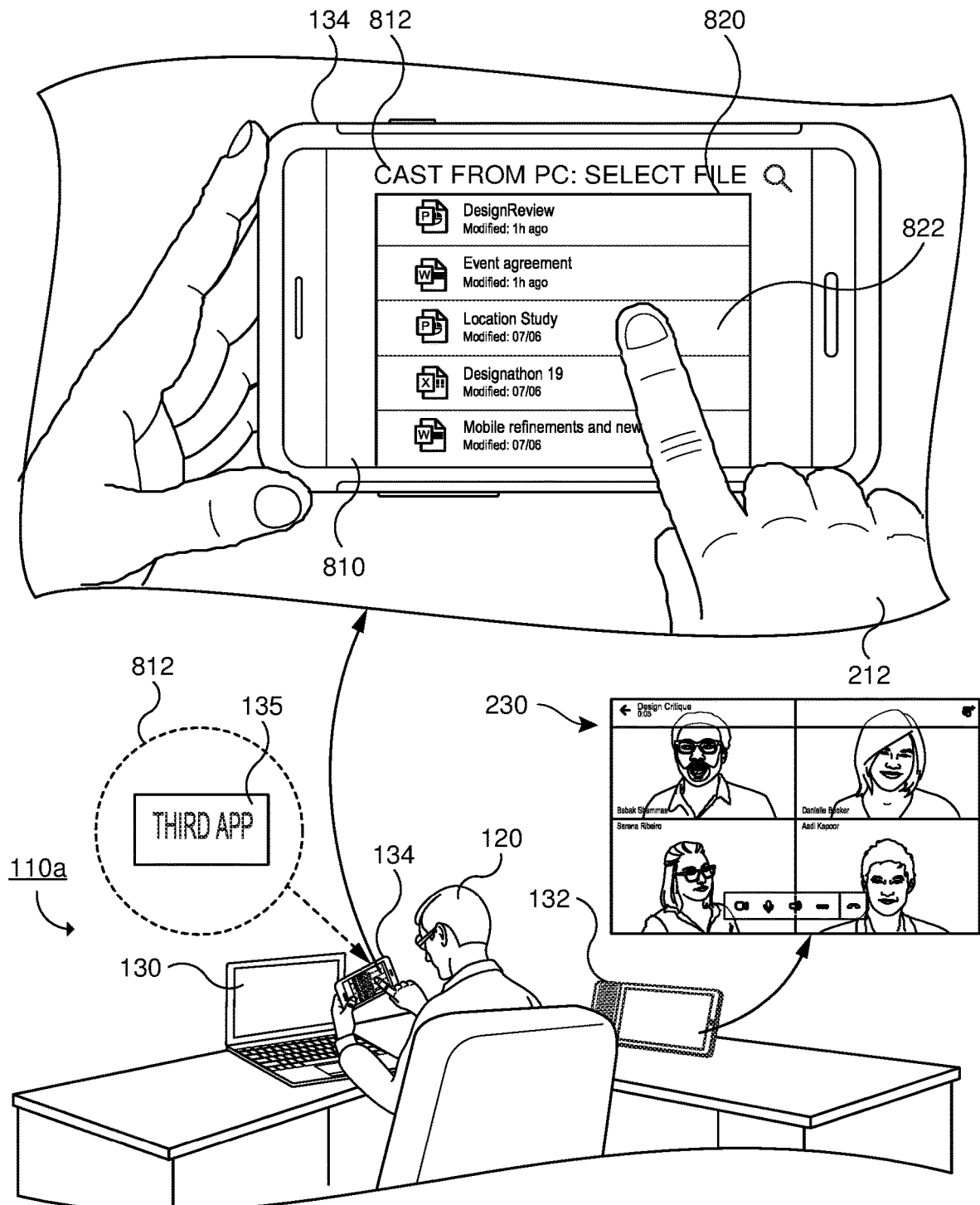
FIGS. 8A and 8B illustrate a sixth example of the system shown in FIGS. 1-2B performing unified UI interactions for user activity across multiple devices included in an actively paired set, in which, while participating in a teleconferencing session, the first user selects a file for casting and initiates a casting portion of the session with the selected file via a handheld third device.
Figure 8B:
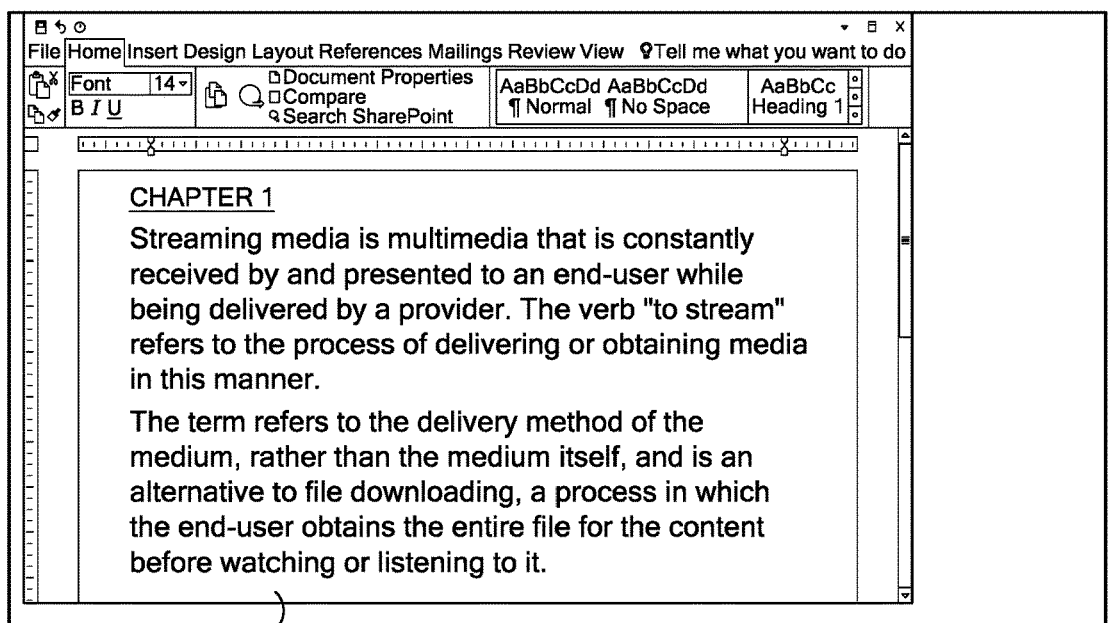
Figure 8B:
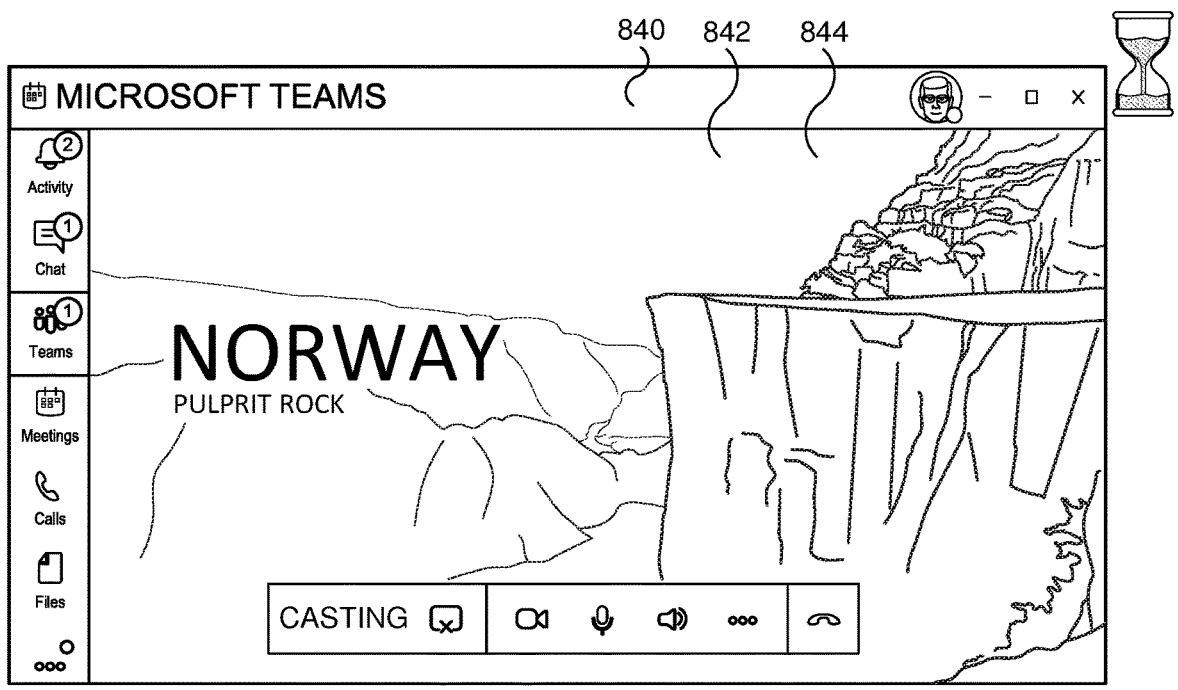

FIGS. 8A and 8B illustrate a sixth example of the system 100 shown in FIGS. 1, 2A, and 2B performing unified UI interactions for user activity across multiple devices included in an actively paired set, in which, while participating in a teleconferencing session, the first user 120 selects a file for casting and initiates a casting portion of the session with the selected file via a handheld third device 134. The sixth example in FIGS. 8A and 8B continues from the state shown in FIG. 3B, and further includes the third device 134 in the actively paired set including the first device 130 and the second device 132. The sixth example in FIGS. 8A and 8B may be combined with any of the examples described in FIGS. 3A-7D and 9A-16C.

In FIG. 8A, the third software program instance 135, executed by the third device 134 in an execution environment 812, is configured to present a seventh UI 812 on a display 810 of the third device 134. The system 100 is configured to identify files recently opened by the first user 120 and present some or all of the identified files in a file listing 820 included in the seventh UI 812. In some implementations, the system 100 is configured to identify and include first files maintained by the storage service 254 that were recently opened by the first user 120; for example, the control service 250 may be configured to interact with the storage service 254 to identify the first files and report the identified first files to the third software program instance 135. In some implementations, the system 100 is configured to identify and include second files stored locally in the third device 134 used to select a file for casting. In some implementations, the system 100 is configured to identify and include third files stored locally in devices included in the actively paired set; for example, a file stored locally on the first device 130 and recently edited by the first user 120 may be reported by the first device 130 to the third software program instance 135 via the system 100. In FIG. 8A, the hand 212 of the first user 120 is used to select a file 822 from the file listing 820 for casting.

In some implementations, the system 100 is configured to identify the devices included in the actively paired set with the second device 132 that are capable of casting content (for example, based on capability and/or configuration information obtained for the devices) as candidate casting devices, and identify a casting device from the candidate devices. In some examples, where multiple candidate casting devices are identified, the system 100 is configured to select a default casting device from the candidate casting devices. The default casting device may be selected based on capability and/or configuration information obtained for the candidate casting devices; for example, the system 100 may select the default casting device based on factors such as, but not limited to, display resolution, display size, network connection type, network bandwidth, an ability to render a selected file (for example, having a spreadsheet application installed to open to spreadsheet file), and/or input interfaces (for example, a device with a keyboard and/or mouse may be preferred over a touchscreen device). In the particular example shown in FIG. 8A, the first device 130, second device 132, and the third device 134 are candidate casting devices, with the first device 130 selected as the default casting device. In some examples, where multiple candidate casting devices are identified, the system 100 is configured to provide, via the third software program instance 135, a UI control (not shown in FIG. 8A) allowing the first user 120 to select one of the identified candidate casting devices as the casting device.

As noted above, in this example the first device 130 is selected to cast the file 822. As shown in FIG. 8B, in response the system 100 causes the first device 130 to initiate a casting portion of the active session 253 for the file 822. For example, the third device 134 and/or the control system 250 may send a message to the first device 130, causing the first device 130 to open the selected file in a corresponding application and transmit corresponding casting data for rendering to remote participants. In the example shown in FIG. 8B, the first display 210 initially displays an eighth UI 832 and then for the casting portion the fifth software program instance 310 opens the selected file for display of casting content 844 from the file in a region 842 of a ninth UI 840 for the fifth software program instance 310, much as described in FIG. 5C.

Figure 9A:
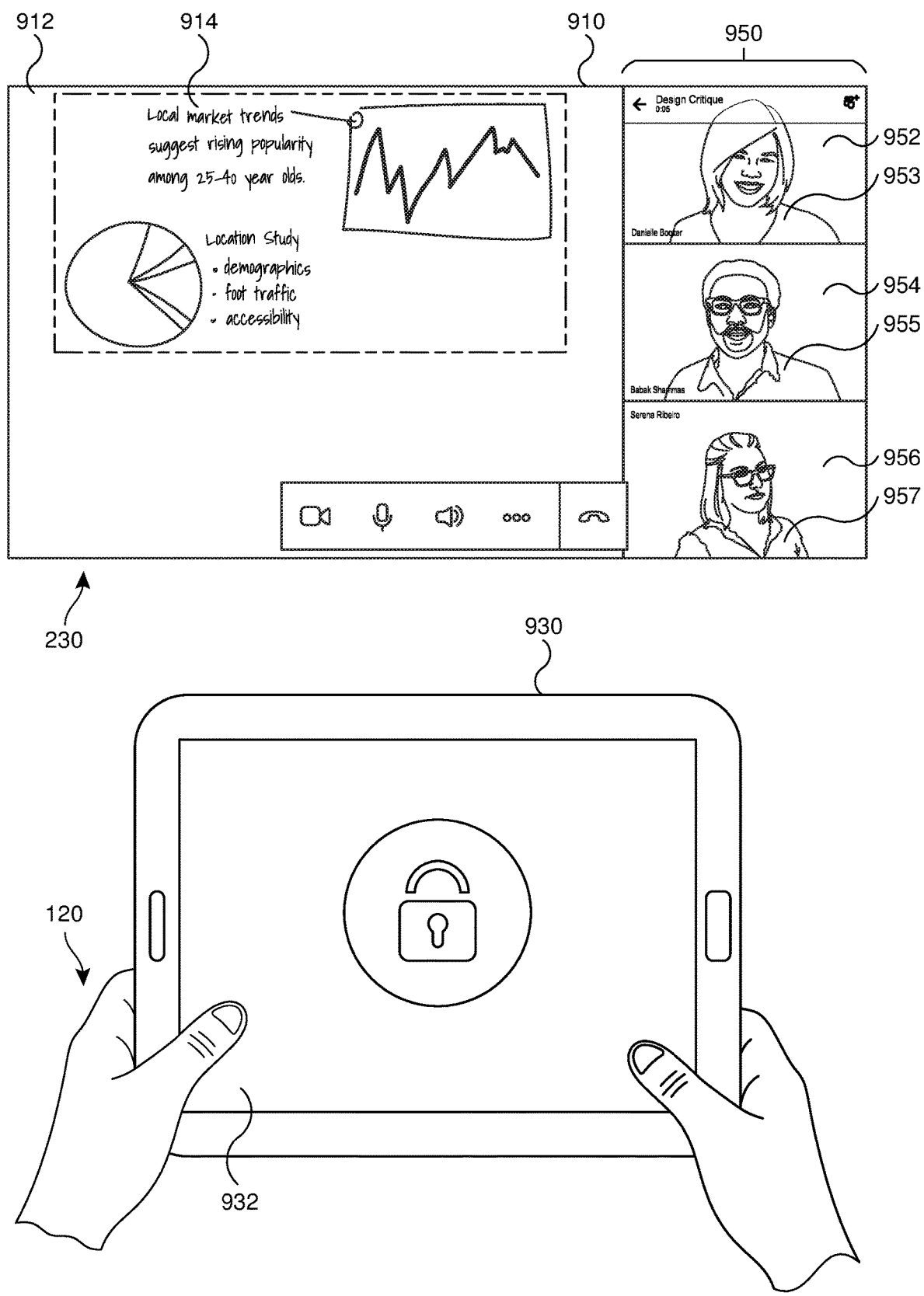
FIGS. 9A, 9B, and 9C illustrate a seventh example of the system shown in FIGS. 1-2B performing unified UI interactions for user activity across multiple devices included in an actively paired set, in which presentation of a whiteboard interface for a teleconferencing session is automatically transferred between devices based on device status.
Figure 9B:
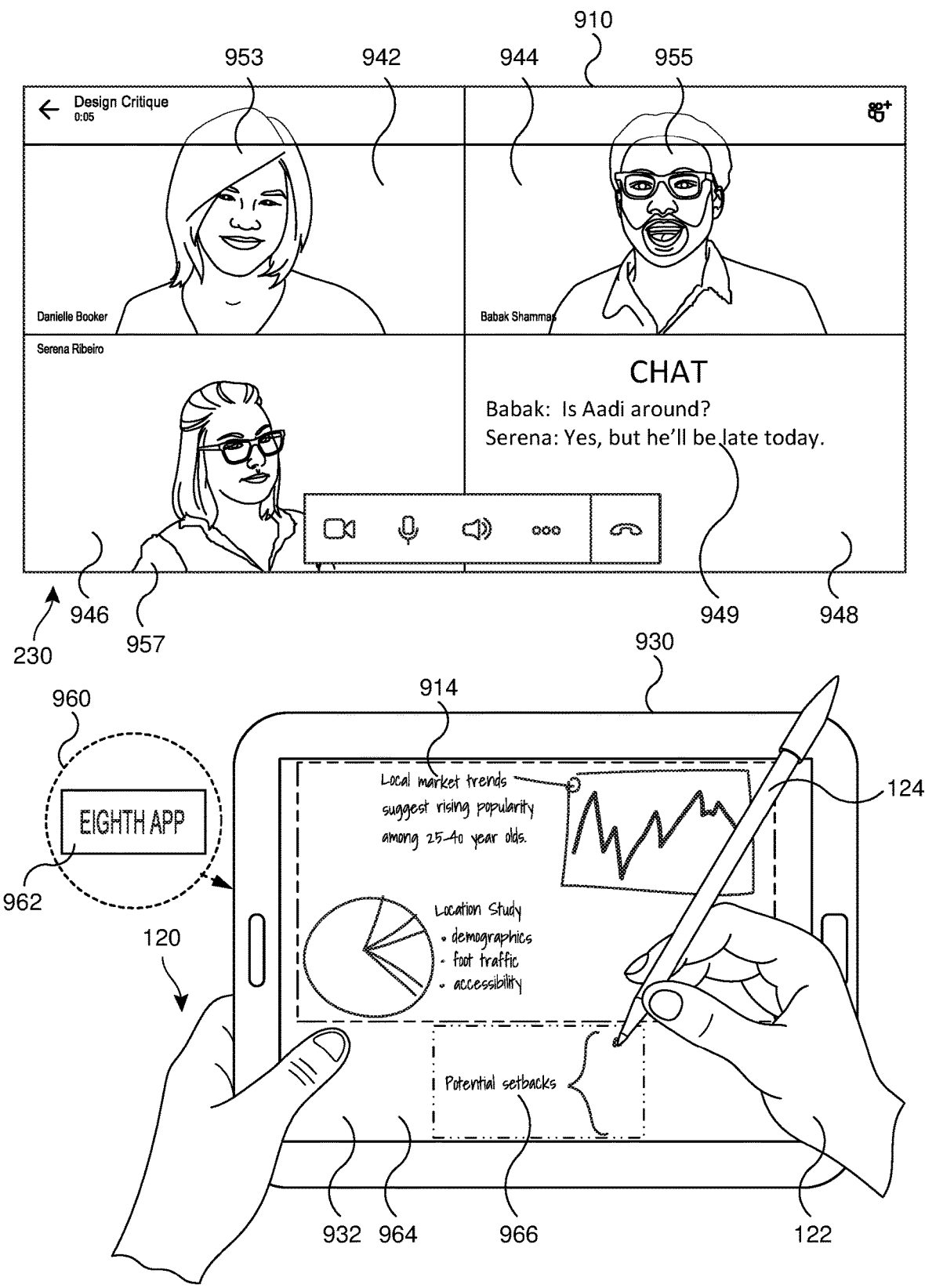
Figure 9C:
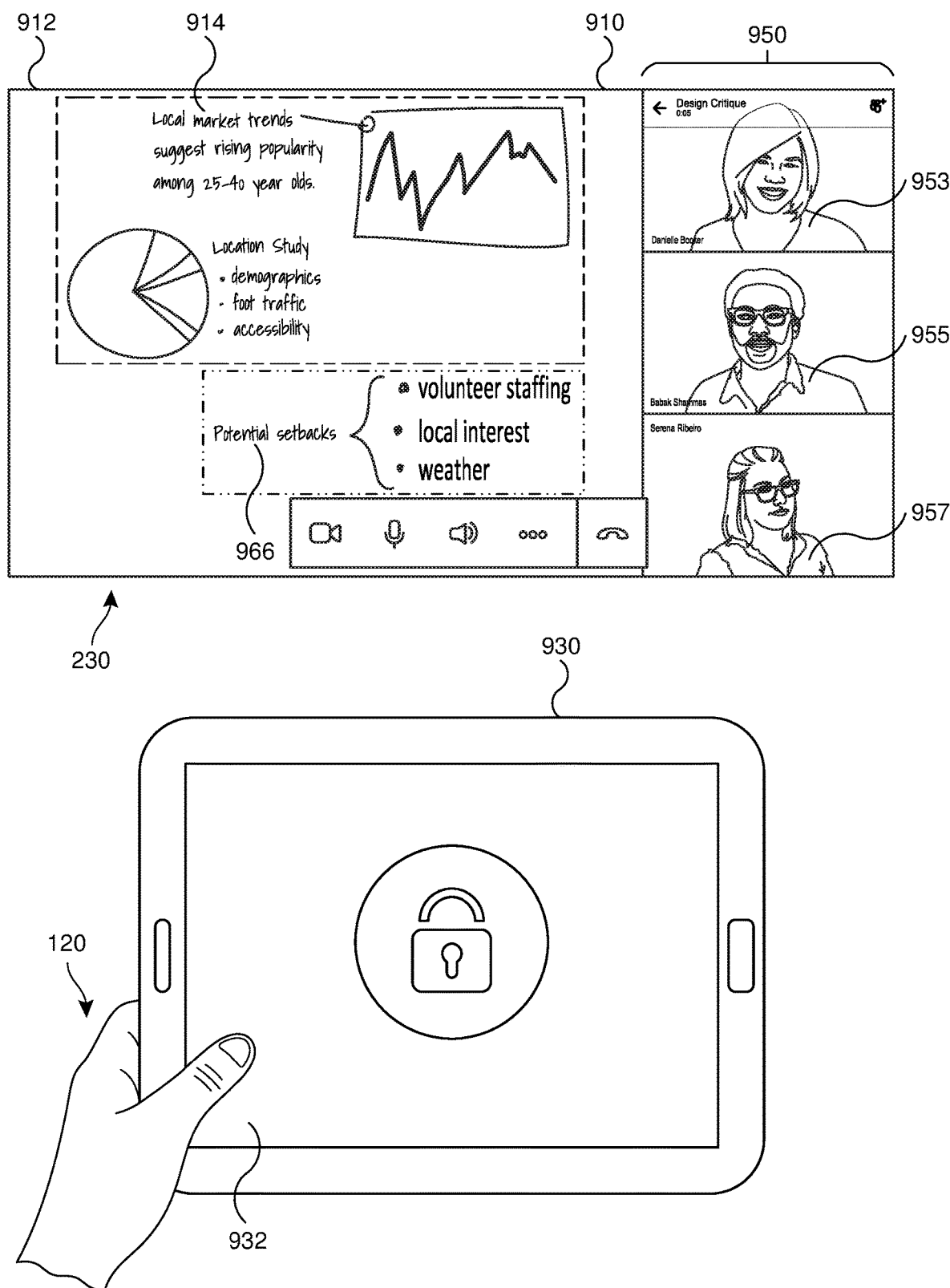

FIGS. 9A, 9B, and 9C illustrate a seventh example of the system 100 shown in FIGS. 1, 2A, and 2B performing unified UI interactions for user activity across multiple devices included in an actively paired set, in which presentation of a whiteboard interface for a teleconferencing session is automatically transferred between devices based on device status. The seventh example in FIGS. 9A-9C may be combined with any of the examples described in FIGS. 3A-8B and 10A-16C.

In FIG. 9A, the first device 130 is not included in an actively paired set with the second device 132, and the second device 132 is operating as a primary audiovisual endpoint for the active session 253, much as described in previous examples. As shown in FIG. 9A, the second device 132 is presenting a tenth UI 910 for the active session 253, with the tenth UI 910 including a remote participant display area 950 including vertically arranged portions 952, 954, and 956 in which respective real-time video streams 953, 955, and 957 are rendered. Also, in response to a whiteboard (in thus example, a virtual whiteboard that can be collaboratively edited) being enabled in the active session 253, the tenth UI 910 includes a whiteboard interface 912 showing a first whiteboard content 914. For purposes of this example, the second device 132 has limited or no capability for editing via the whiteboard interface 912.

Interested in having an improved interface for interacting with the whiteboard, the first user 120 has picked up a fifth user computing device 930 (in this example, embodied as a tablet computing device) which, as indicated on a fourth display 932 of the fifth device 930, is in a locked state at the time shown in FIG. 9A. In some examples, a device in a locked state may be included in an actively paired set, but offer different capabilities based on whether it is locked or unlocked. For example, in a locked state a device might be available for audio rendering or notifications but unavailable for video rendering, whereas in an unlocked state the device may be used for video rendering. In some examples, a device will not be included in an actively paired set when locked. In some examples, a particular application configured to interact with the pairing service 150 and/or the control service 250 must be executing on the device to be included in an actively paired set.

In FIG. 9B, the fifth device 930 has been unlocked by the first user 120, is executing an eighth software program instance 960 in an execution environment 962 on the fifth device 930, and is included in an actively paired set with the second device 132. In response to at least the fifth device 930 having been unlocked, the system 100 automatically determines that the fifth device 930 currently offers a better whiteboard interface than the second device 132, and in response to that determination stops using the second device 132 for the whiteboard in favor of the fifth device 930. Accordingly, the eighth software program instance 962 presents an eleventh UI 964 in which the first user 120 may view the first whiteboard content 914 and add second whiteboard content 966 using a stylus 124. In response to the whiteboard not being presented on the second device 132, the tenth UI 910 is rearranged to provide larger views of the remote participants according to the four panel format shown in, for example, FIG. 7B, with the real-time video streams 953, 955, and 957 rendered in respective portions 942, 944, and 946 of the tenth UI 910 and additional teleconferencing session content 949 (in FIG. 9B, a chat session for the active session 253) presented in a portion 948 of the tenth UI 910.

In FIG. 9C, the first user 120 has completed use of the fifth device 930 for adding the second whiteboard content 966 to the virtual whiteboard, and has returned the fifth device 930 to the locked state, as shown in the display 932. The system 100 is configured to, in response to the fifth device 930 being locked and/or removed from an actively paired set with the second device 132, cause the tenth UI 910 to return to the arrangement shown in FIG. 9A, including the remote participant display area 950 in which respective real-time video streams 953, 955, and 957 are rendered and the whiteboard interface 912, which now includes both the first whiteboard content 914 as shown in FIG. 9A and the second whiteboard content 966 added by the first user 120 using the fifth device 930. Thus, as shown in FIGS. 9A-9C, the first user 120 is able to quickly and dynamically add and remove the fifth device 930 for performing particular activities for the active session 253.

Figure 10A:
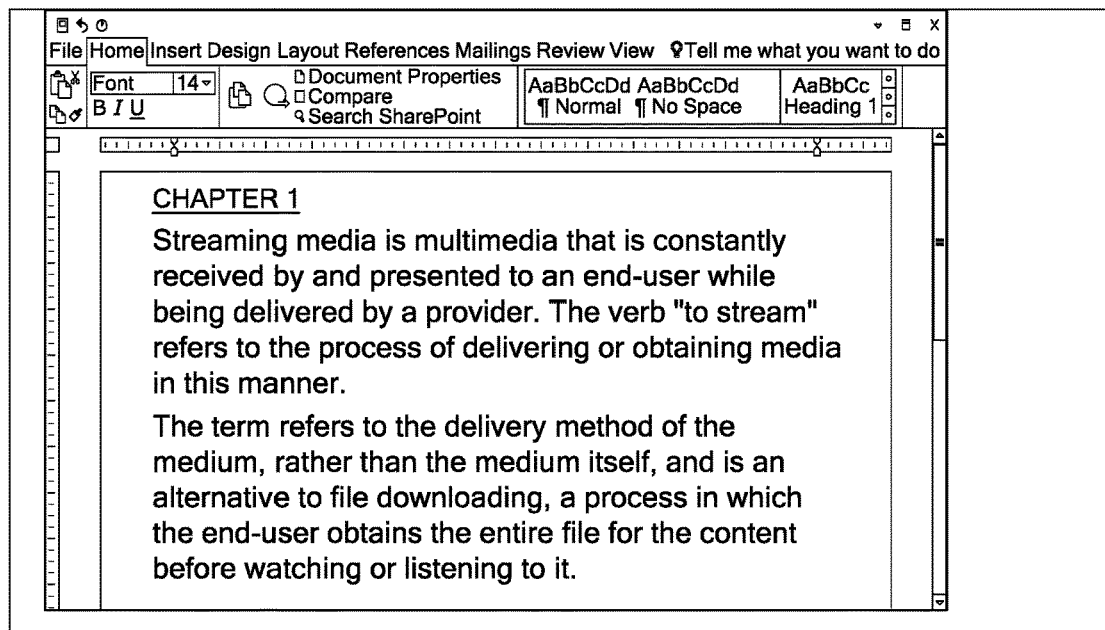
FIGS. 10A and 10B illustrate an eighth example of the system shown in FIGS. 1-2B performing unified UI interactions for user activity across multiple devices included in an actively paired set, in which the first user uses the second device to initiate a transmission of content generated in a teleconferencing session to other participants via a UI on the first device.
Figure 10A:
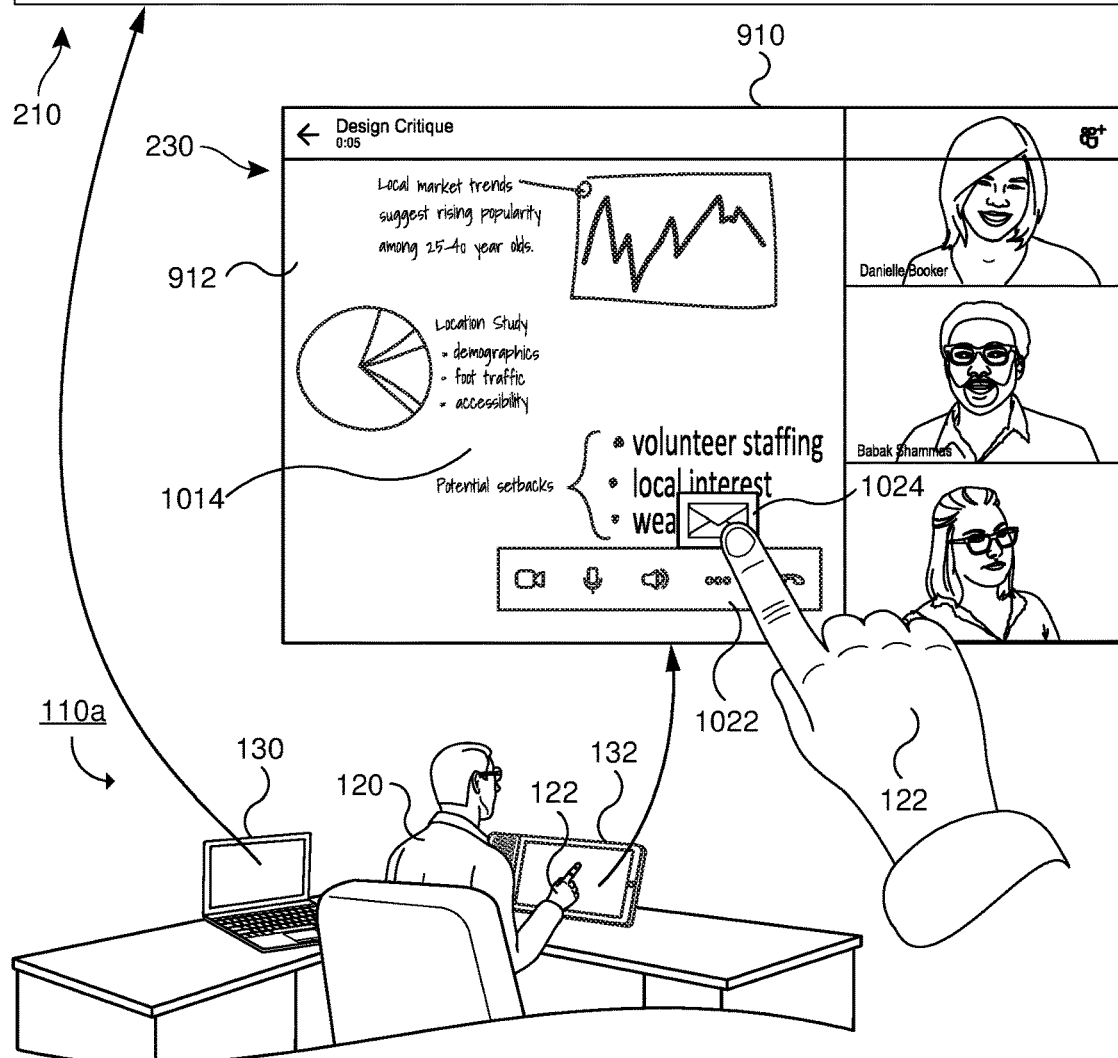
Figure 10B:
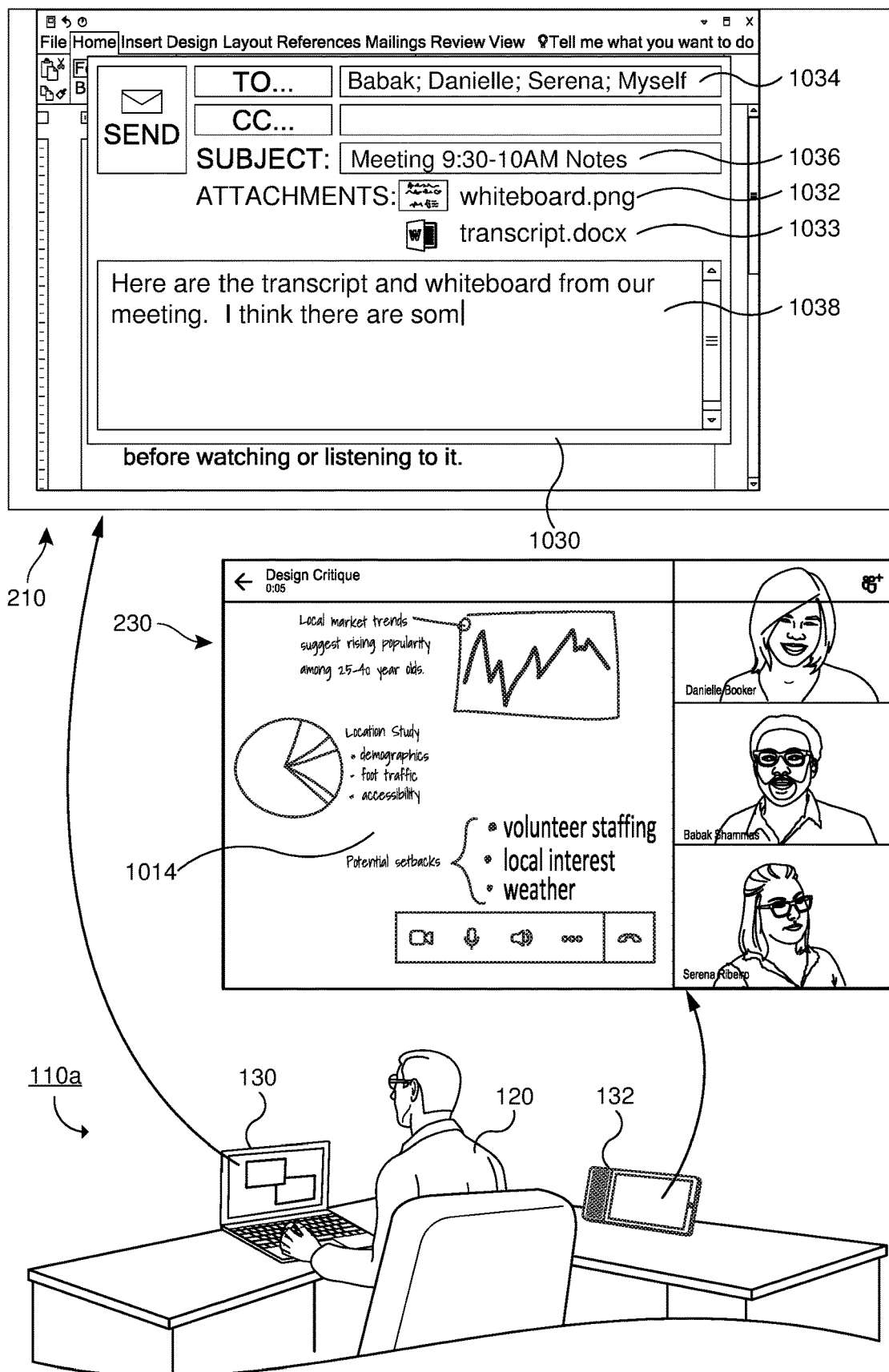

FIGS. 10A and 10B illustrate an eighth example of the system 100 shown in FIGS. 1, 2A, and 2B performing unified UI interactions for user activity across multiple devices included in an actively paired set, in which the first user 120 uses the second device 132 to initiate a transmission of content generated in a teleconferencing session to other participants via a UI on the first device 130. The eighth example in FIGS. 10A and 10B continues from the example shown in FIG. 9C, and may be combined with any of the examples described in FIGS. 3A-9C and 11A-16C.

In FIG. 10A, the first user 120 wishes to provide copies of content created in the active session 253 (in this example, a third whiteboard content 1014, seen in the whiteboard interface 912 of the tenth UI 910) to the participants and/or invitees of the active session 253. To do this, using a hand 122 to provide input via the touchscreen 239, the first user 120 actuates a UI control 1022 to expose and then actuate a content sharing UI control 1024.

As shown in FIG. 10B, the system 100 is configured to, in response to the actuation of the content sharing UI control 1024 and the second device 132 being included in an actively paired set with the first device 130, automatically generate a draft email opened in a twelfth UI 1030 presented on the first display 910 by an email application executing on the first device 130 (for example, Microsoft Outlook™). In some implementations, the system 100 may be configured to respond similarly to a termination of the active session 253. The draft email includes a first attachment 1032 containing the whiteboard content 1014. In some examples, the draft email may include a second attachment 1033 containing a machine-generated transcript of the active session 253. Additionally, as shown in FIG. 10B, recipients 1034 for the email have been automatically populated with the participants of the active session 253 and a subject 1036 for the email has been automatically generated. In some examples, an initial text may be generated for a body 1038 of the email. By processing this draft email on the first device 130, the first user 120 has the benefit of features such as, but not limited to, the keyboard 219 for more easily entering text for the body 1038, spell checking, access to contacts, automatically suggested additional contacts for the email, autocompletion of contacts, and a file browser for identifying additional attachments which may be added through "drag and drop" interactions.

It is noted that the system 100 is configured to, in response to the second device 132 not being in an actively paired set, respond to actuation of the UI control 1024 in a "standalone mode" by generating and sending a similar email to the participants of the active session 253, which may include use of an associated UI on the second device 132. However, a more efficient, fully featured, and familiar experience may be provided to the first user 120 by completing the drafting and sending of the email via the first device 130, allowing the first device 130 to automatically be brought into an aspect of the activity where it can offer the first user 120 an improved experience.

Figure 11A:
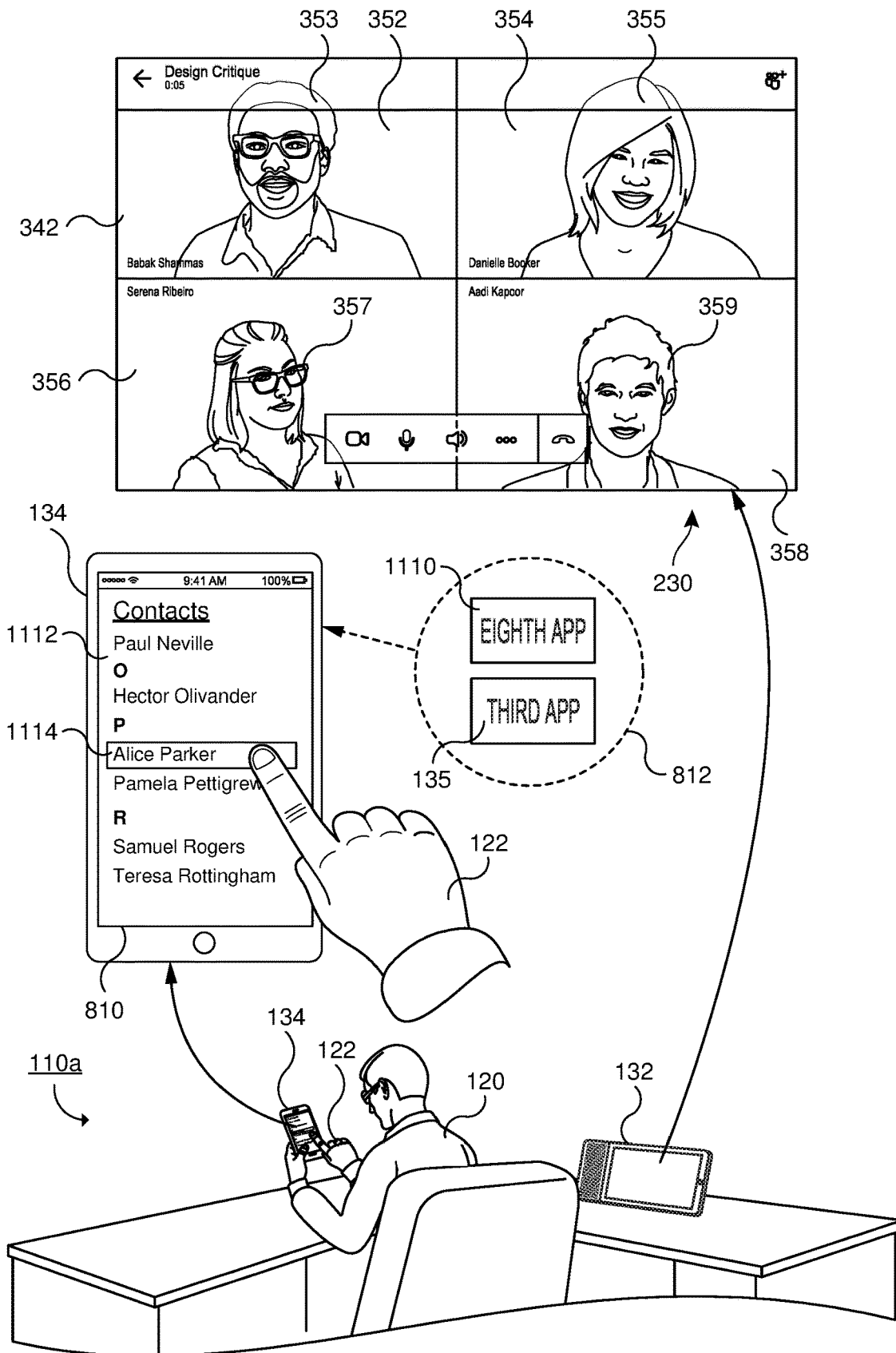

FIGS. 11A, 11B, 11C, 11D, and 11E illustrate a ninth example of the system 100 shown in FIGS. 1, 2A, and 2B performing unified UI interactions for user activity across multiple devices included in an actively paired set, in which, while participating in a teleconferencing session, the first user 120 invites an additional participant via the handheld third device 134. The ninth example in FIGS. 11A-11E may be combined with any of the examples described in FIGS. 3A-10B and 12A-16C. FIG. 11A continues from the example shown in FIG. 8A, but without the first device 130 being active nor included in an actively paired set including the second device 132 and the third device 134.

In FIG. 11A, the second device 132 is operating as an audiovisual endpoint for the first user 120 to participate in the active session 253, as described in FIG. 3B. As in FIG. 3B, the sixth software program instance 340 is presenting the third UI 342 on the second display 230, in which the real-time video streams 353, 355, 357, and 359 are rendered in respective portions 342, 344, 346, and 348. Additionally, the third UI 342 includes a invite UI control 1102 which may be actuated by the first user 120 to present a invitee selection UI (not shown) on the second display 230 for selecting and requesting a participant to join the current active session 253.

However, in this example the first user 120 would prefer to use the third device 134 to select and request a participant join the current active session 253. For example, the first user 120 may wish not to have the invitee selection UI obstruct the current contents of the second display 230, more discreetly issue the request to the participant, or may find UIs offered by the third device 134 to be more efficient or familiar than the invitee selection UI. At the time shown in FIG. 9A, the third device 134 is included in an actively paired set with the second device 132. An eighth software program instance 1110 (labeled "EIGHTH APP") is a contacts list application executing in the execution environment 812 on the third device 134, and is presenting on the display 810 a thirteenth UI 1112 with a list of contacts, including a first contact 1114 selected by the first user 120 in FIG. 11A.

In FIG. 11B, in response to the selection of the first contact 1114, the eighth software program instance 1110 presents on the display 810 a fourteenth UI 1120 displaying details of the first contact 1114. Additionally, the fourteenth UI 1120 includes an contact action portion 1122 including multiple UI controls for initiating actions by the third device 134 and/or the system 100 in connection with the first contact 1114 such as, but not limited to, making a phone call, sending a message, and/or sending an email. The third software program instance 135, which is configured to interact with the control service 250, is configured to interact with elements of the service 100 such as the control service 250, the pairing service 150, and/or the second device 132. Additionally, the third software program instance 135 is configured to interact with the eighth software program instance 1110; for example, as a plugin component invoked by the eighth software program instance 1110 and/or callbacks registered with the eighth software program instance 1110 and/or the execution environment 812. In response to the third software program instance 135 obtaining information from the service 100 that the third device 134 is included in an actively paired set and that the first user 120 is currently participating in the active session 253, the action portion 1122 of the fourteenth UI 1120 includes a contact invite UI control 1124 indicating to the first user 120 that, via the fourteenth UI 1120, a request may be issued to the first contact 1114 to join the currently active session 253. In FIG. 11C, in response to the first user 120 having actuated the contact invite UI control 1124, the third device 134 transmits a message (not shown) to the service 100, in response to which the service 100 will issue a request to the first contact 1114 to join the active session 253. For example, the control service 250 may be configured to request the teleconferencing service 180 to issue an invitation. Additionally, a confirmation 1128 is presented on the display 810.

Figure 11D:
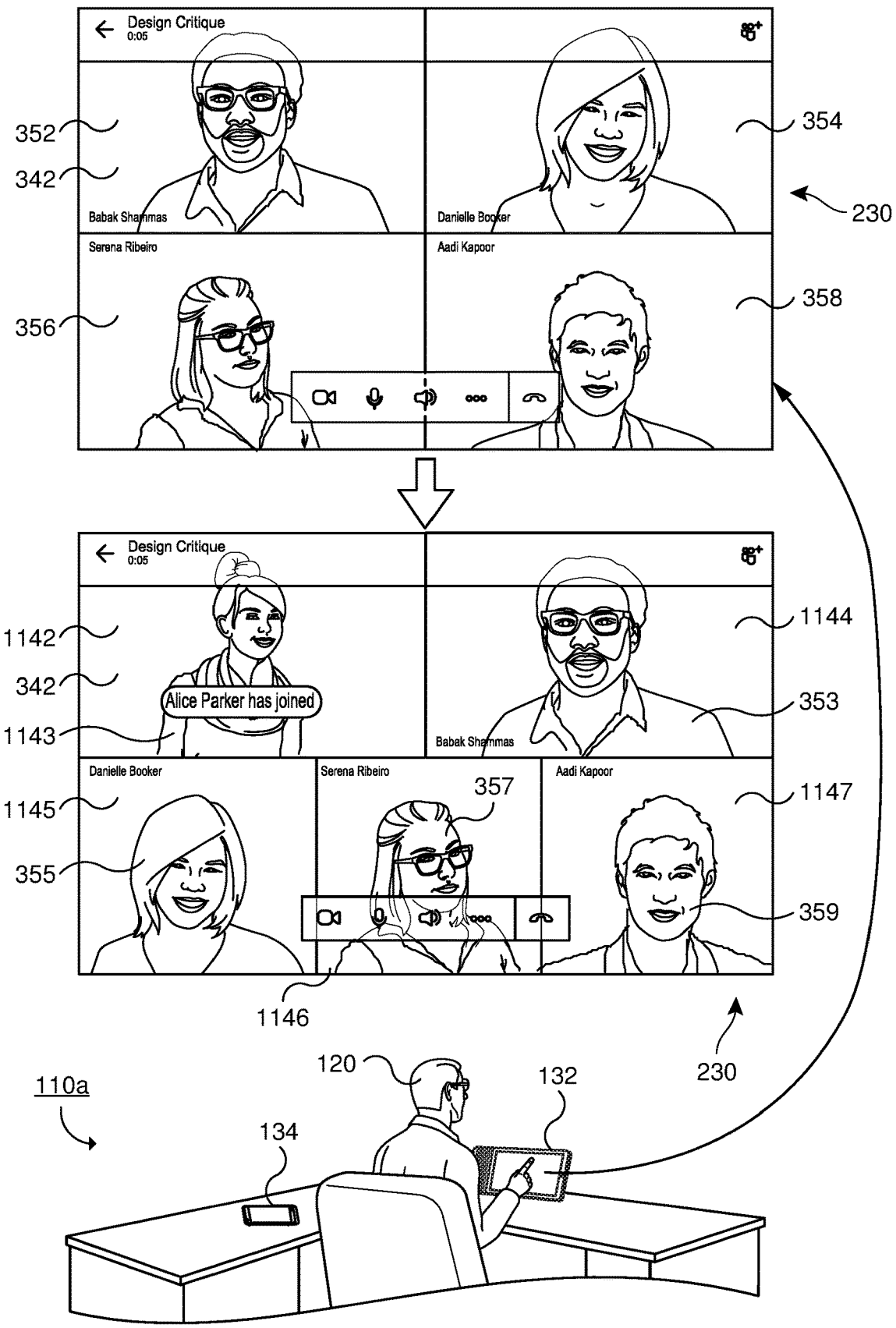
Figure 11E:
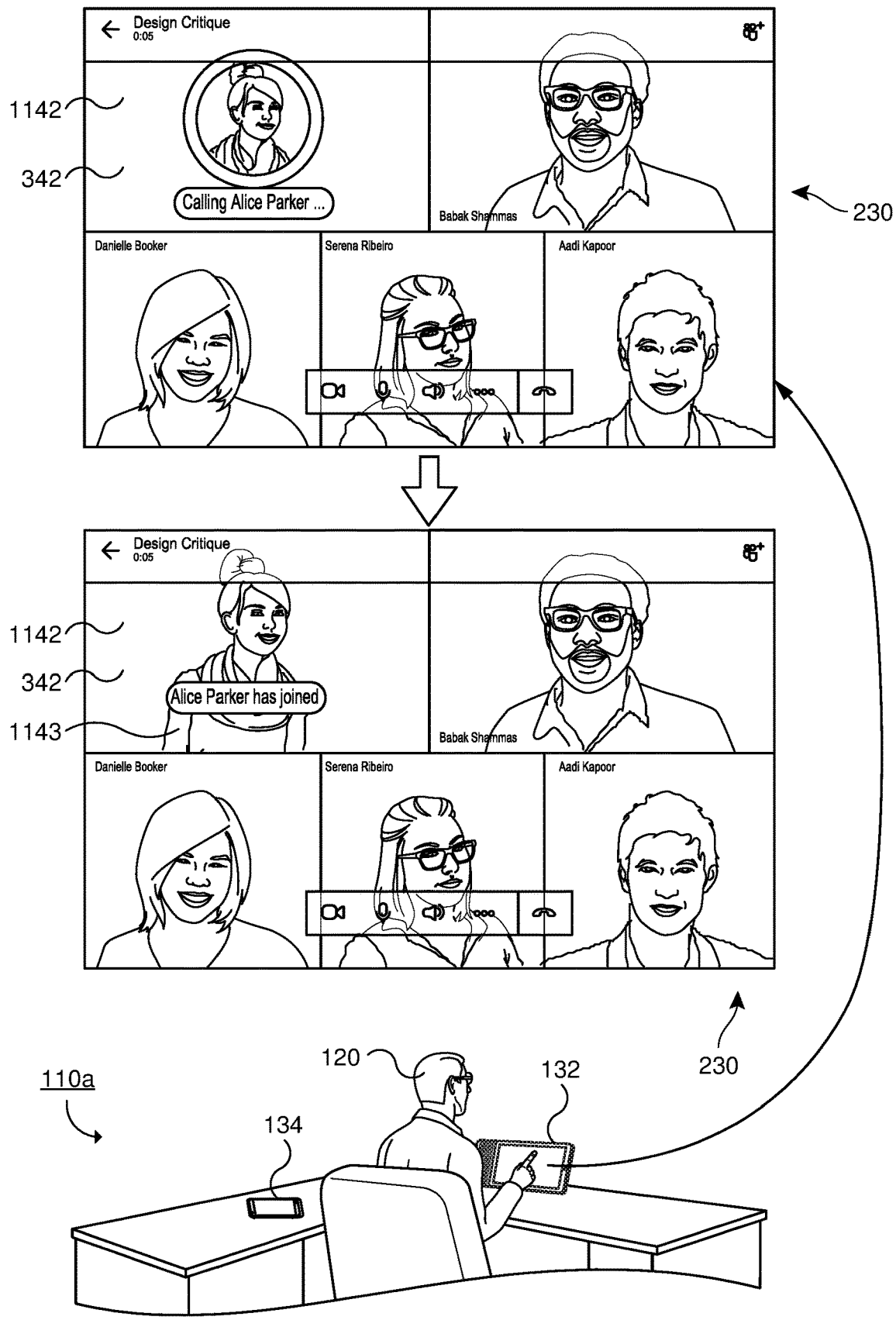

In FIG. 11D, the first contact 1114 has received the request to join the active session 253 from the system 100 and has accepted the request (such as, but not limited to, by clicking on a link in an invitation email), resulting in the first contact 1114 being added as a participant to the active session 253. In response, the third UI 342 is rearranged from the arrangement shown in FIG. 11A with four portions 352, 354, 356, and 357 to the new arrangement shown in FIG. 11D with a portion 1142 for rendering a live video stream 1143 of the first contact 1144 and portions 1144, 1145, 1146, and 1147 for rendering respectively real-time video streams 353, 355, 357, and 359. FIG. 11E shows an alternative to FIG. 11D in which issuing the request to the first contact 1114 to join the active session 253 is performed by initiating a real-time call through the teleconferencing system 180. Much as shown in FIG. 11D, the third UI 342 is arranged to a five panel layout. Initially, the portion 1142 indicates that the call to the first contact 1114 is pending. Once the first contact 1114 accepts the call, the portion 1142 renders the real-time video stream 1143 for the first contact 1114, as in FIG. 11D.

Figure 12B:
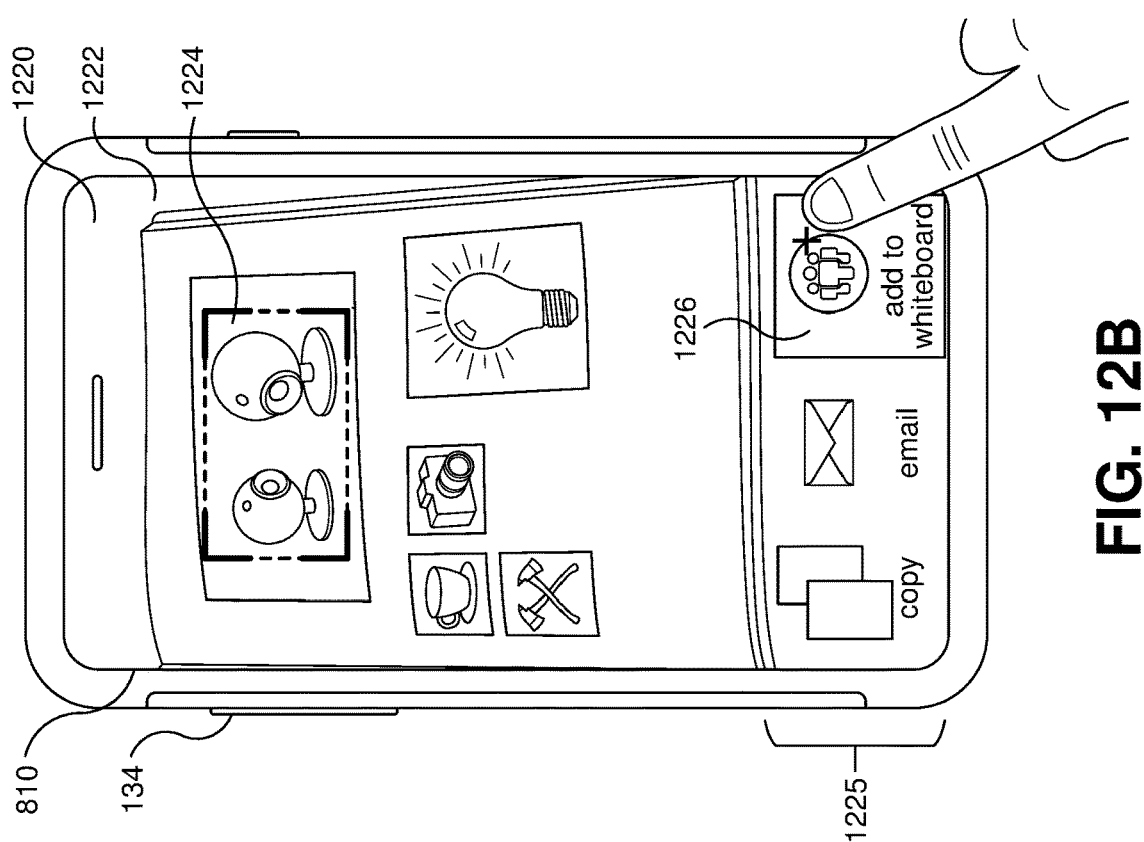
FIGS. 12A, 12B, and 12C illustrate a tenth example of the system shown in FIGS. 1-2B performing unified UI interactions for user activity across multiple devices included in an actively paired set, in which the handheld third device is temporarily recruited as a media input device for a virtual whiteboard rendered by the second device.
Figure 12A:
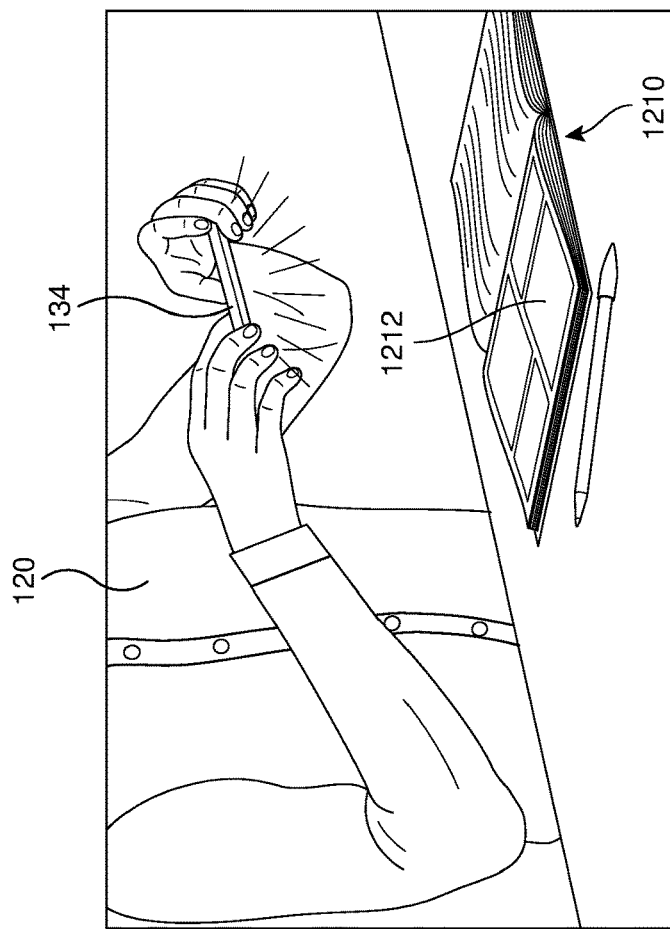
Figure 12C:
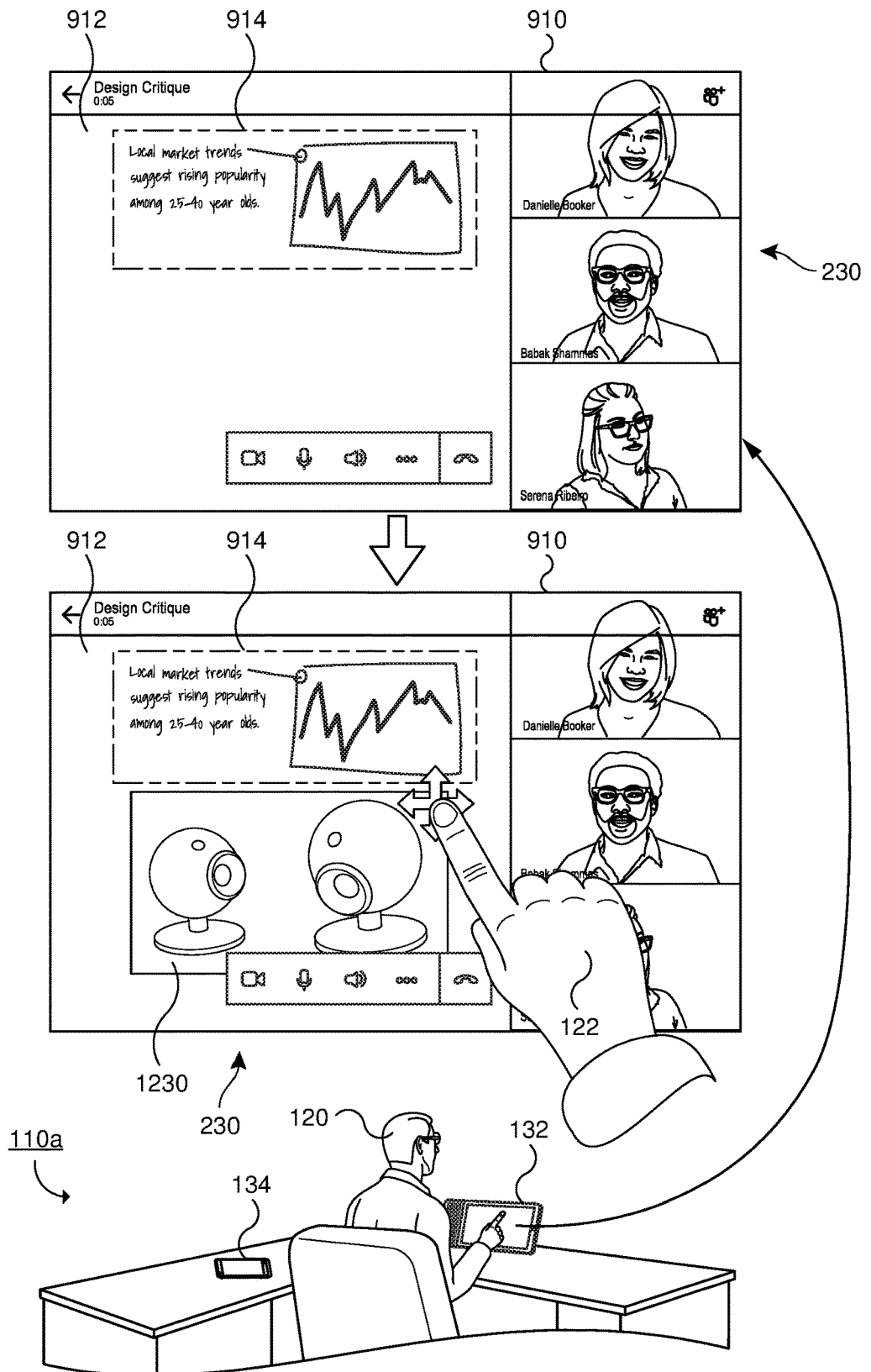

FIGS. 12A, 12B, and 12C illustrate a tenth example of the system 100 shown in FIGS. 1, 2A, and 2B performing unified UI interactions for user activity across multiple devices included in an actively paired set, in which the handheld third device 134 is temporarily recruited as a media input device for a virtual whiteboard rendered by the second device 132. The tenth example in FIGS. 12A-12C continues from the example shown in FIG. 11A, and may be combined with any of the examples described in FIGS. 3A-11E and 13A-16C.

In FIG. 12A, the first user 120 is using the third device 134 to capture a photograph of a portion 1212 of a physical object 1210 (in this example, a portion of a page of a notebook). In some examples, use of the third device 134 in this manner may be initiated by a user interface control (not shown) presented by the second device 132 in response to the system 100 determining that the third device 134 is actively paired with the second device 132. The second device 132 may present an indication of the third device 134 being available for this purpose to facilitate discovery of this functionality by the first user 120.

FIG. 12B shows a fifteenth UI 1220 presented on the display 810 and which allows the first user 120 to select the captured photograph 1222 and, in this example, identify a cropped image 1224 from the photograph 1222. Also, the fifteenth UI 1220 includes a image action portion 1225 including multiple UI controls for initiating actions by the third device 134 and/or the system 100 in connection with the image 1224, such as, but not limited to, copying the image 1224 into a clipboard and/or emailing the image 1224. Additionally, in response to the third software program instance 135 obtaining information from the service 100 that the third device 134 is included in an actively paired set, that the first user 120 is currently participating in the active session 253, and, in some examples, that a virtual whiteboard is active in the active session 253, the image action portion 1224 of the fourteenth UI 1120 includes a whiteboard upload UI control 1226 for adding the image 1224 to the virtual whiteboard. Presentation of the whiteboard upload UI control 1226 may be implemented through interactions with the third software program instance 135 much as described in FIGS. 11B and 11C.

In FIG. 12C, the second display 230 is displaying the tenth UI 910 as shown in FIG. 9A, including the first whiteboard content 914 in the whiteboard interface 912. The system 100 is configured to, in response to actuation of the whiteboard upload UI control 1226, obtain the image 1224 from the third device 134 and add a new whiteboard image 1230 generated based on the image 1224 to the virtual whiteboard. In various implementations, the control service 250 and/or the second device 132 may be configured to obtain the image 1224 and add the whiteboard image 1230 (for example, via interaction with the teleconferencing service 180). In some implementations, as shown in FIG. 12C, the first user 120 may use the hand 122 to move, rotate, resize, or otherwise adjust the whiteboard image 1230 via the whiteboard interface 912 on the second device 132.

Thus, as shown in FIGS. 12A-12C, the first user 120 is able to quickly and dynamically add and remove the third device 134 to be able to take advantage of its unique characteristics (in this example, a small form factor convenient for casually capturing photographs). It is understood that the system 100 may similarly be configured to use the third device 134 for capturing images for other devices included in an actively paired set with the third device 134 and/or pairing-aware applications executing on such devices. For example, the technique might be performed, via the third-party service 258, for copying such images into a clipboard provided by the execution environment 214 of the first device 130, allowing the images to be pasted into various applications.

Figure 13A:
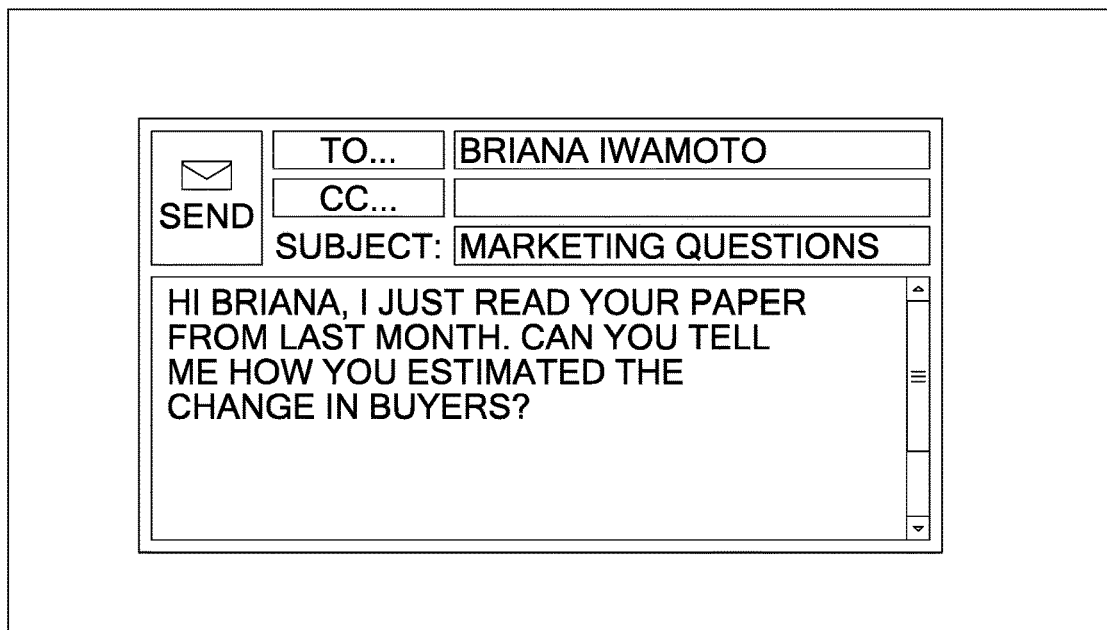
FIGS. 13A, 13B, and 13C illustrate an eleventh example of the system shown in FIGS. 1-2B performing unified UI interactions for user activity across multiple devices included in an actively paired set, in which a file opened for viewing on the second device is, by actuating a UI control on the second device, opened on the first device.
Figure 13A:
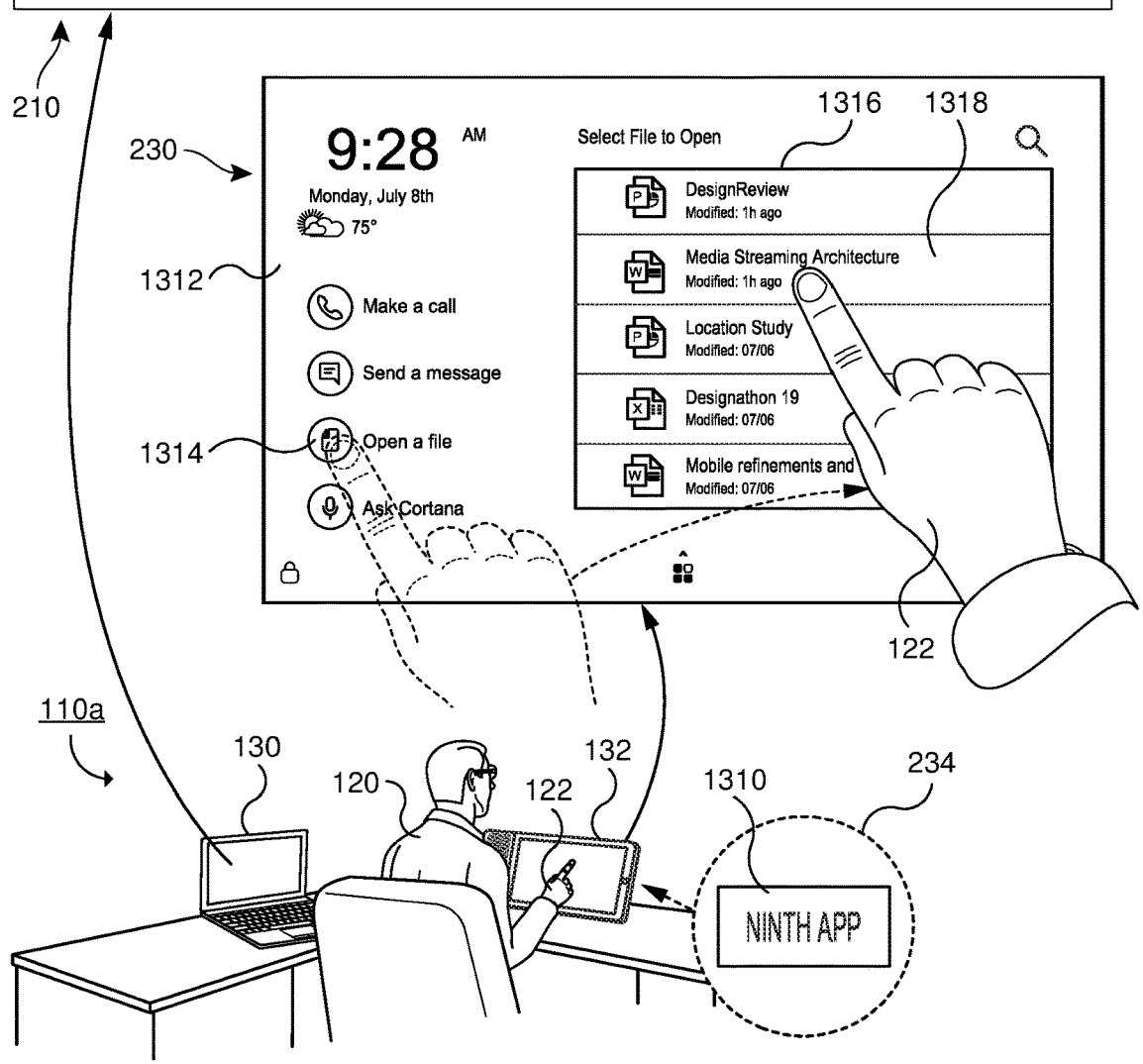
Figure 13B:
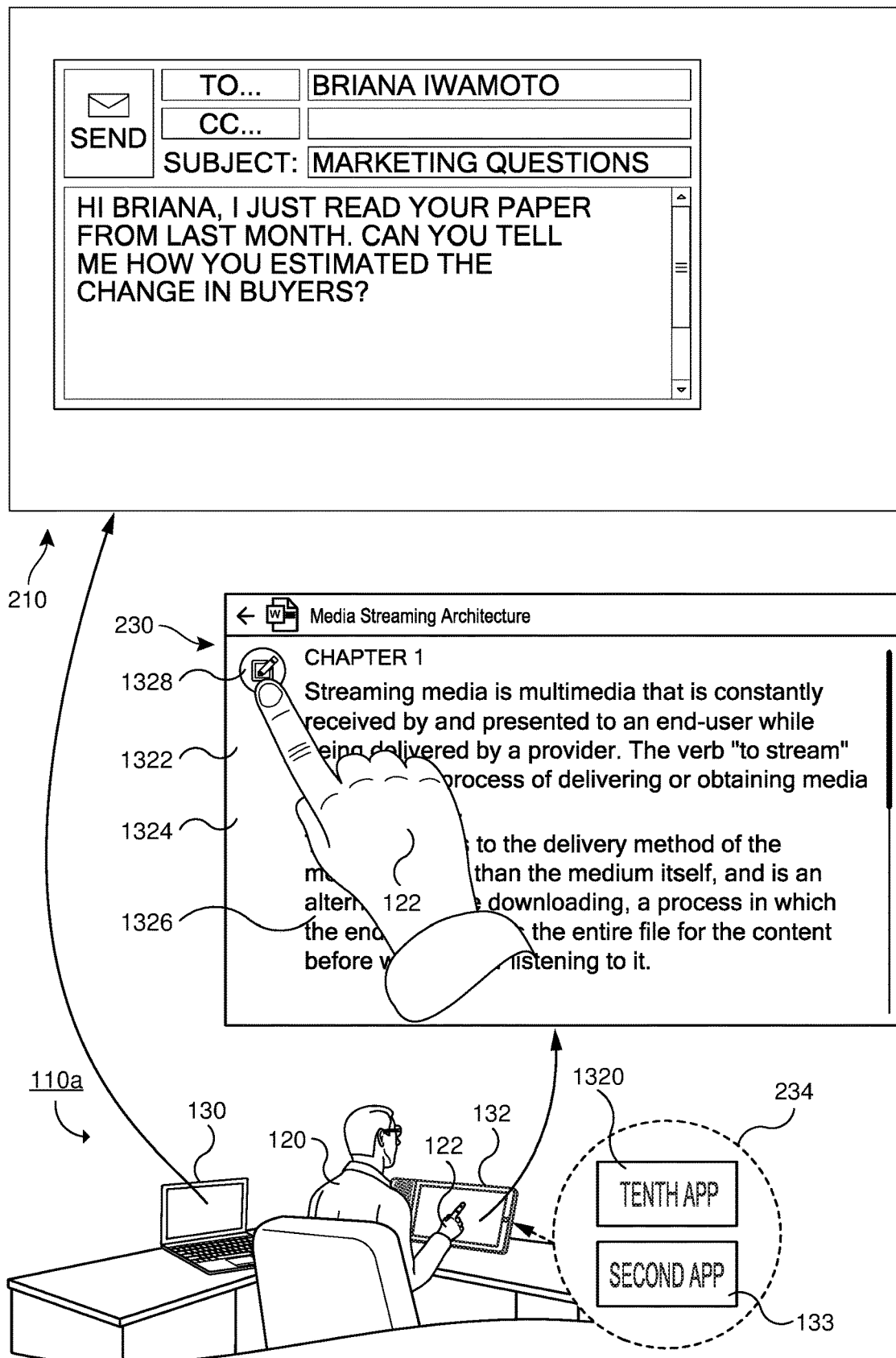
Figure 13C:
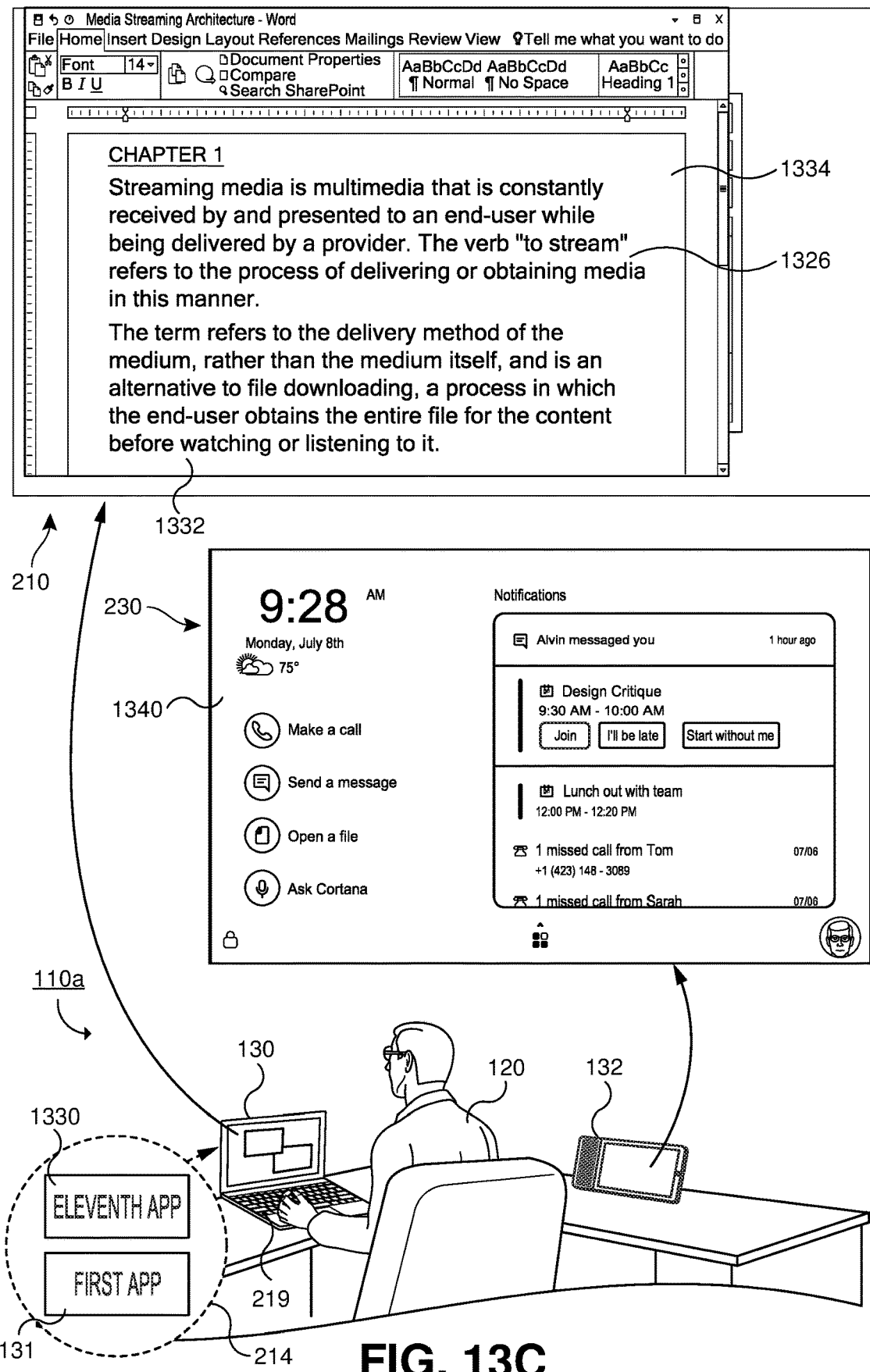

FIGS. 13A, 13B, and 13C illustrate an eleventh example of the system 100 shown in FIGS. 1, 2A, and 2B performing unified UI interactions for user activity across multiple devices included in an actively paired set, in which a file opened for viewing on the second device 132 is, by actuating a UI control on the second device 132, opened on the first device 130. The eleventh example in FIGS. 13A-13C may be combined with any of the examples described in FIGS. 3A-12C and 14A-16C.

In FIG. 13A, the first device 130 and the second device 132 are included in an actively paired set. A ninth software program instance 1310 (labeled "NINTH APP") is executing on the second device 132 in the execution environment 234 and is configured to display a sixteenth UI 1312 on the second display 230 that is similar to the second UI 322 shown in FIG. 3A. In contrast to the examples shown in FIGS. 3A-12C, in this particular example, the first user 120 is not participating in a teleconferencing session. The first user 120 is interested in opening a file to be viewed on the second device 132. Using the hand 122, the first user 120 first actuates a file open UI control 1314, in response to which the system 100 identifies files recently opened by the first user 120 and presents some or all of the identified files in a file listing 1316, much as described for the file listing 820 in FIG. 8A. In FIG. 13A, the hand 212 of the first user 120 is used to select a file 1318 from the file listing 1316 for opening by the second device 132. In another example, the file 1318 may be sent by another user as an attachment to a message and selected using a respective UI control included in a UI displaying the message.

In FIG. 13B, in response to the selection of the file 1318, the second device 132 is configured to open the selected file 1318 using an associated tenth software program instance 1320 (in this example, the tenth software program instance 1320 is capable of opening word processing files such as the file 1318). The tenth software program instance 1320 is a pairing-aware application configured to interact with the second software program instance 133 for interaction with the pairing service 150 (which may occur via a client service such as the third-party service 258). As shown in FIG. 13B, the tenth software program instance 1320 presents on the second display 230 a seventeenth UI 1322 that includes a file content portion 1324 for displaying file content 1326 stored in the file 1318.

The system 100 is configured to determine if the actively paired set including the second device 132 includes one or more editing-capable devices other than the second device 132 that can be used to edit the file 1318 (for example, using a content creation application suitable for the file 1318). The determination may be based on capability and/or configuration information obtained for the devices included in the actively paired set. In this example, the first device 130 is identified as an editing-capable device. As shown in FIG. 13B, in response to identifying an editing-capable device, the system 100 is configured to present in the seventeenth UI 1322 a file editing UI control 1328 to allow the first user 120 to edit the file 1318 on an editing-capable device. In some implementations, if no editing-capable device is included in the actively paired set but a paired (and not currently actively paired) editing-capable device is identified, the system 100 is configured to indicate (for example, by displaying an indication in the seventeenth UI 1322) the paired device as effective for editing the file 1318 to make the first user 120 aware of this possibility. In FIG. 13B, the hand 212 of the first user 120 is used to actuate the file editing UI control 1328.

In FIG. 13C, in response to the actuation of the file editing UI control 1328, the system 100 is configured to issue a message to the first device 130 (identified as an editing-capable device) requesting that the first device 130 open the file 1318 for editing. In response to receiving this message (for example, by the first software program instance 131), the first device 130 is configured to open the file 1318 for editing using an associated eleventh software program instance 1330 (in this example, a word processing application such as Microsoft Word™). As shown in FIG. 13C, the eleventh software program instance 1330 presents on the first display 210 an eighteenth UI 1332 that includes a file content portion 1334 for displaying and editing the file content 1326 stored in the file 1318. Thus, as shown in FIGS. 13A-13C, the first user 120 is able to have the convenience and efficiency of opening a file directly on the second device 132 with confidence that the first user 120 is able to quickly and dynamically open the file on an actively paired device offering a more capable application or convenient user input device (such as the keyboard 219 of the first device 130).

Figure 14A:
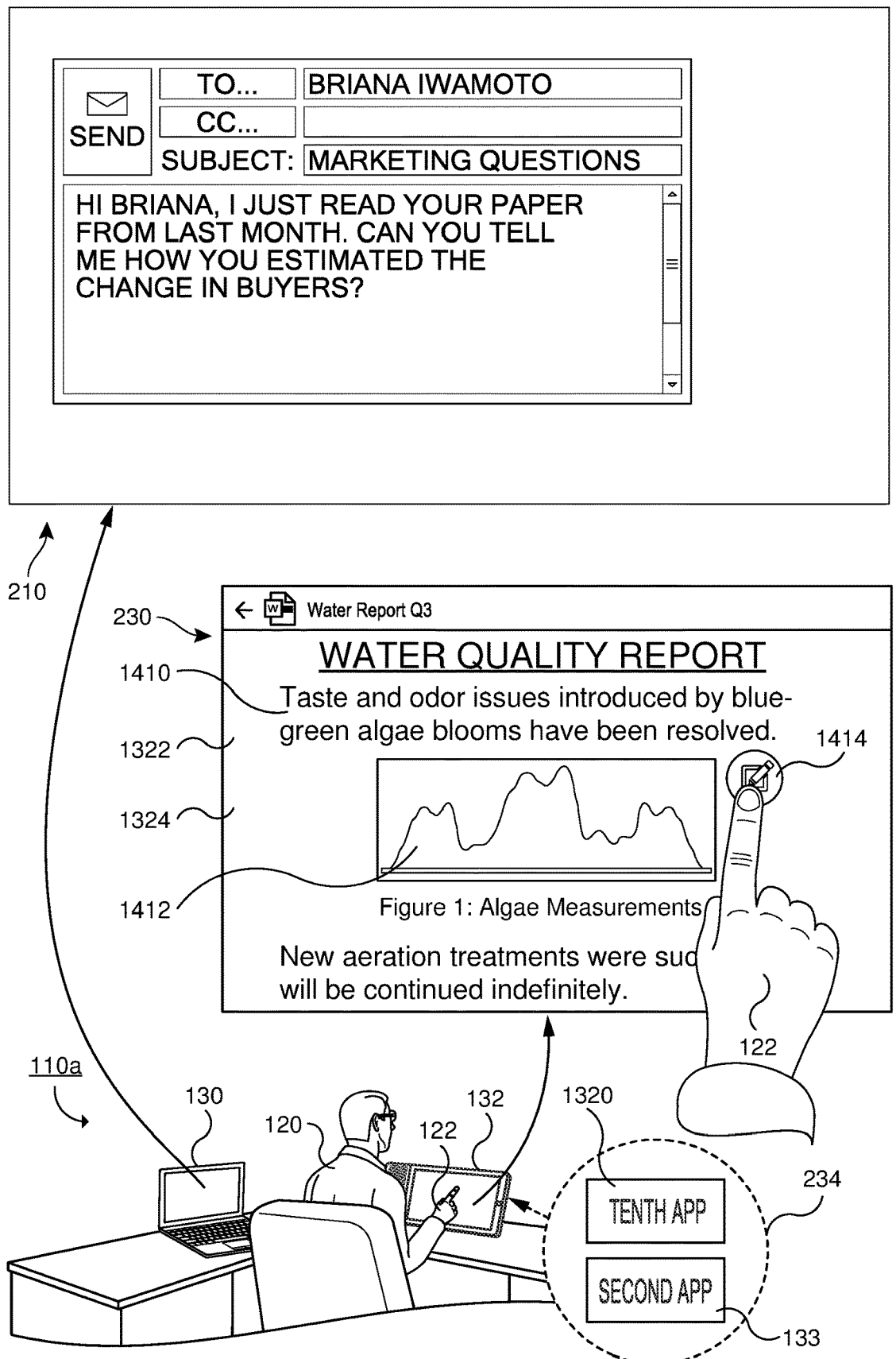
FIGS. 14A and 14B illustrate a twelfth example of the system 100 shown in FIGS. 1-2B performing unified UI interactions for user activity across multiple devices included in an actively paired set, in which a content element included in a file being viewed on the second device is, by actuating a UI control on the second device, opened for inspection on the first device.
Figure 14B:
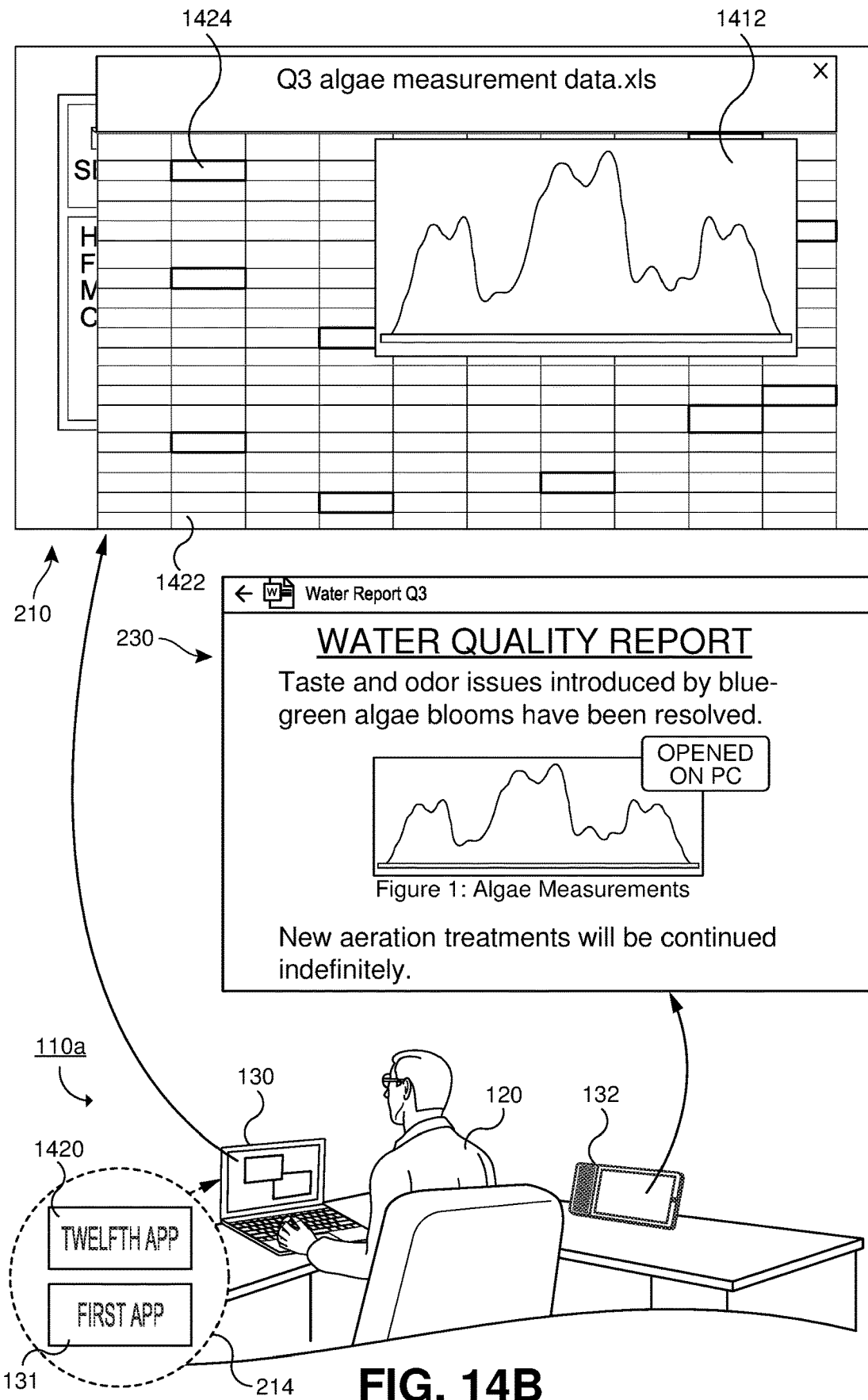

FIGS. 14A and 14B illustrate a twelfth example of the system 100 shown in FIGS. 1, 2A, and 2B performing unified UI interactions for user activity across multiple devices included in an actively paired set, in which a content element included in a file being viewed on the second device 132 is, by actuating a UI control on the second device 132, opened for inspection on the first device 130. The twelfth example in FIGS. 14A and 14B may be combined with any of the examples described in FIGS. 3A-13C and 15A-16C.

In FIG. 14A, a different file has been opened on the second device 132 in the manner described for opening the file 1318 in FIG. 13B, with the tenth software program instance 1320 presenting the seventeenth UI 1322, in which the file content portion 1324 is displaying file content 1410 stored in the file that has been opened. The displayed file content 1410 includes a content element 1412 (in this example, a chart generated by a spreadsheet program). The system 100 is configured to determine if the actively paired set including the second device 132 includes one or more inspection-capable devices other than the second device 132 that can be used to inspect the content element 1412 (for example, using an application suitable for opening and/or editing the content element 1412), much as described for identifying editing-capable devices for the file 1318 in connection with FIG. 13B. In this example, the first device 130 is identified as an inspection-capable device. As shown in FIG. 14A, in response to identifying an inspection-capable device for the content element 1412, the system 100 is configured to present in the seventeenth UI 1322 a content element inspection UI control 1414 (in this example, adjacent to the content element 1412) to allow the first user 120 to inspect the content element 1412 on an inspection-capable device. In some implementations, if no inspection-capable device is included in the actively paired set but a paired (and not actively paired) inspection-capable device is identified, the system 100 is configured to indicate (for example, by displaying an indication in the seventeenth UI 1322) the paired device as effective for inspecting the content element 1412 to make the first user 120 aware of this possibility. In FIG. 14A, the hand 212 of the first user 120 is used to actuate the element inspection UI control 1414.

In FIG. 14B, in response to the actuation of the content element inspection UI control 1414, the system 100 is configured to issue a message to the first device 130 (identified as an inspection-capable device) requesting that the first device 130 open the content element 1412. In response to receiving this message (for example, by the first software program instance 131), the first device 130 is configured to obtain and open the content element 1412 and/or a file associated with the content element 1412 using an associated twelfth software program instance 1420 (in this example, a spreadsheet application such as Microsoft Excel™). In this example, a spreadsheet file used to generate the content element 1412 has been opened by the twelfth software program instance 1420, which presents a nineteenth UI 1422 displaying associated file content 1424 for the spreadsheet file. Thus, as shown in FIGS. 14A and 14B, the first user 120 is able to have the convenience and efficiency of opening a file directly on the second device 132 with confidence that the first user 120 is able to quickly and dynamically inspect a content element of the file on an actively paired device offering a more capable application or convenient user input device (such as the keyboard 219 of the first device 130) for inspecting the content element. It is noted that although in FIGS. 13B and 14A the UI controls 1328 and 1414 were rendered within the UI 1322, in some examples such UI controls may be presented outside of a UI used to display a file.

Figure 15A:
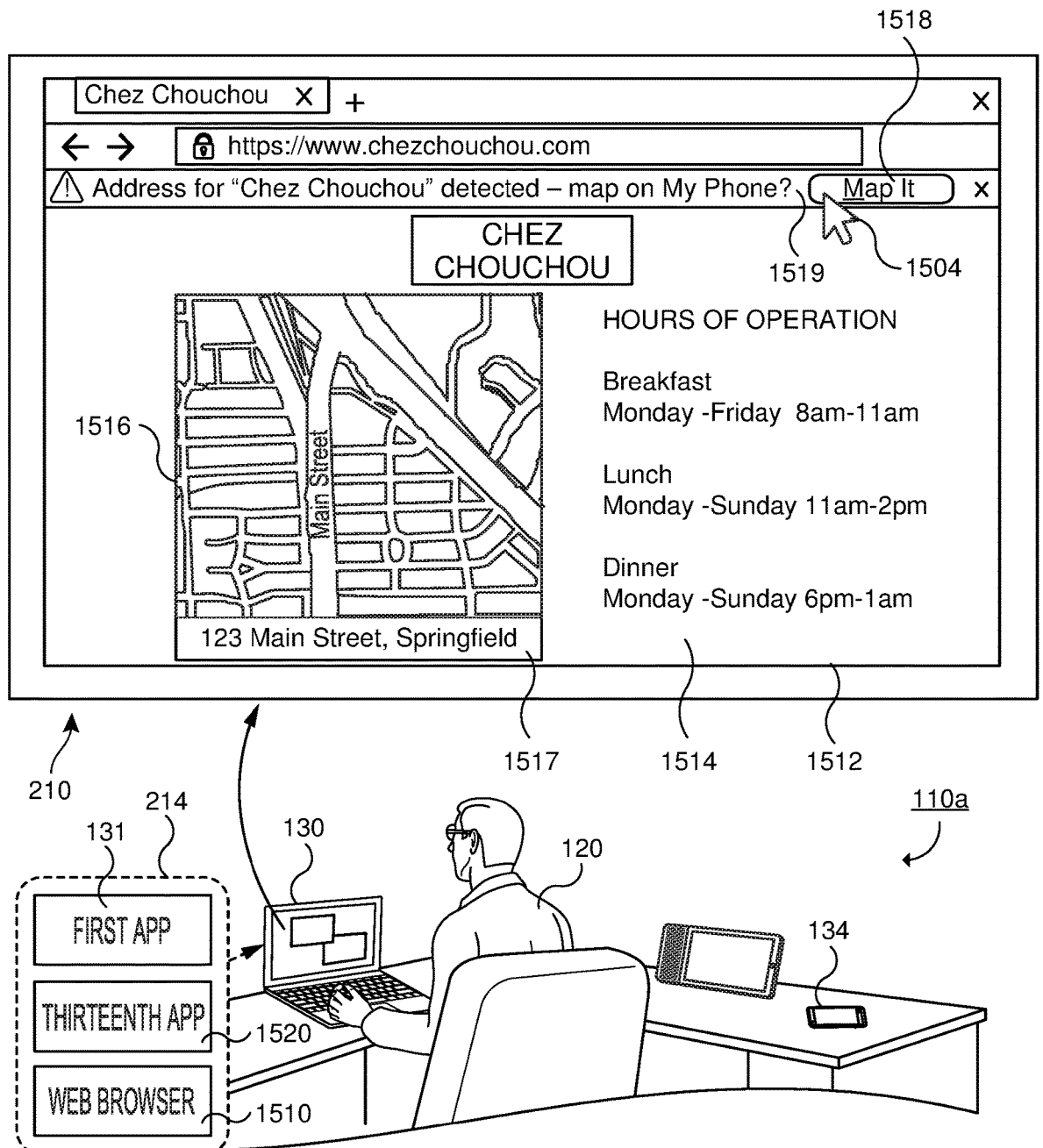
FIGS. 15A, 15B, and 15C illustrate a thirteenth example of the system shown in FIGS. 1-2B performing unified UI interactions for user activity across multiple devices included in an actively paired set, in which the first device presents a UI control to provide to the third device a geographic location identified in content rendered by the first device.
Figure 15C:
Figure 15B:
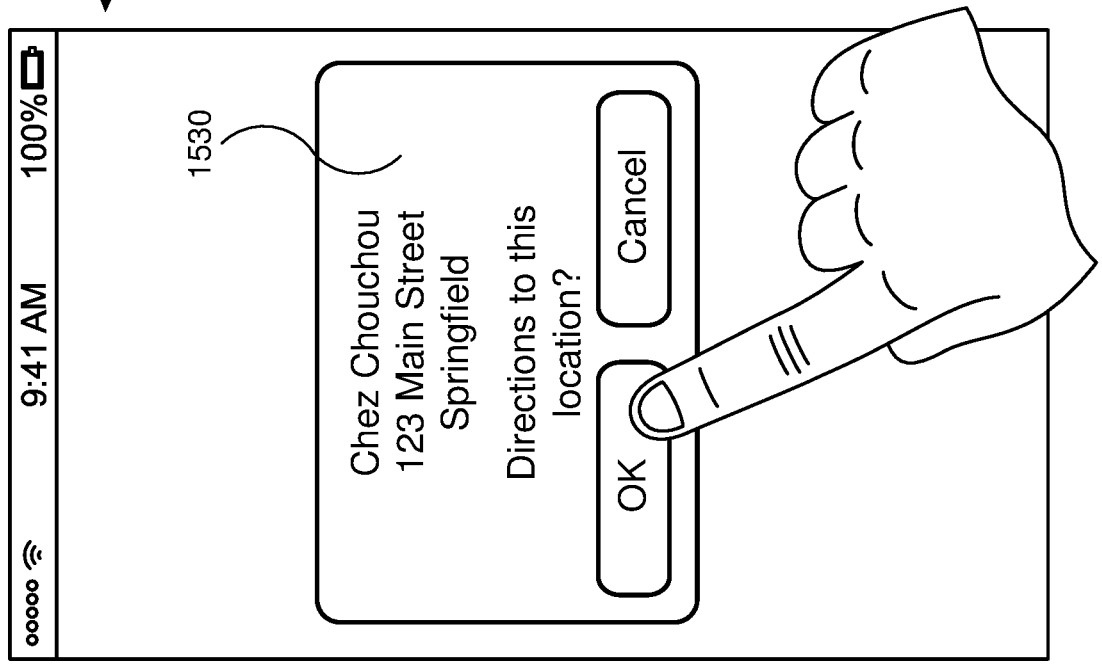

FIGS. 15A, 15B, and 15C illustrate a thirteenth example of the system 100 shown in FIGS. 1, 2A, and 2B performing unified UI interactions for user activity across multiple devices included in an actively paired set, in which the first device 130 presents a UI control to provide to the third device 134 a geographic location identified in content rendered by the first device 130. The thirteenth example in FIGS. 15A-15C may be combined with any of the examples described in FIGS. 3A-14B and 16A-16C. In FIGS. 15A and 15B, the first device 130 and the third device 134 are included in an actively paired set.

In FIG. 15A, the first user 120 is accessing a website via a twentieth UI 1512 presented on the first display 210 by a web browser application instance 1510 executing on the first device 130 (for example, in the execution environment 214). The twentieth UI 1512 is rendering a first webpage 1514, which includes a map element 1516 and an associated street address element 1517 (in this example, a text element including a street address). A pairing-aware thirteenth software program instance 1520 is configured to interact with the web browser application instance 1510 and the first software program instance 131. In some implementations, the thirteenth software program instance 1520 may operate as a plugin component for the web browser application instance 1510, and may be configured to identify the presence of an information item of a particular information type (in this example, a geographic location information type), and obtain the information item—in this example, a geographical location corresponding to a map element (for example, by recognizing a map element generated by a known mapping service and obtaining the geographical location based on the map element) and/or a street address element (for example, by recognizing an HTML <address> contact address tag and parsing a street address included in the tag) in a webpage.

The system 100 is configured to determine if the actively paired set including the first device 130 includes one or more guidance-capable devices that can be used for navigational guidance to an indicated geographical location (for example, a mapping application supporting guidance using a satellite-based geolocation service). The determination may be based on capability and/or configuration information obtained for the devices included in the actively paired set. In this example, the third device 134 is identified as a guidance-capable device. The system 100 is configured to, in response to both obtaining a geographical location from a webpage and identifying a guidance-capable device, present a location guidance UI control 1518 to allow the first user 120 to use a guidance-capable device for navigational guidance to the obtained geographical location. In the example shown in FIG. 15A, the presentation of the location guidance UI control 1518 includes presenting an information bar 1519 including the location guidance UI control 1518 in the twentieth UI 1512. In some examples, the location guidance UI control 1518 may be presented as a right click menu item and/or an mouseover item for the map element 1516 and/or the street address element 1517. In FIG. 15A, the location guidance UI control 1518 is actuated using a pointer 1504, in response to which the first device 130 transmits a message (which may include the geographical location) to the system 100 indicating that the location guidance UI control 1518 has been actuated.

As shown in FIG. 15B, the system 100 is configured to, in response to the actuation of the location guidance UI control 1518, issue a message to the third device 134 (identified a navigation-capable device) requesting that the third device 134 provide navigational guidance to the geographical location obtained in FIG. 15A. At the time shown in FIG. 15B, the third device 134 is in a locked state. The third device 134 is configured to, in response to receiving the message while the third device is in the locked state, present on the display 810 a notification 1530 allowing the first user 120 to initiate the requested navigational guidance (once the third device 134 is unlocked). In FIG. 15C, the third device 134 has been unlocked by the first user 120 and, in response to having received the message and the third device 134 being in an unlocked state, navigational guidance to the obtained geographic location is performed via a twenty-first UI 1540 presented on the display 810 by a mapping application executing on the third device 134.

Figure 16A:
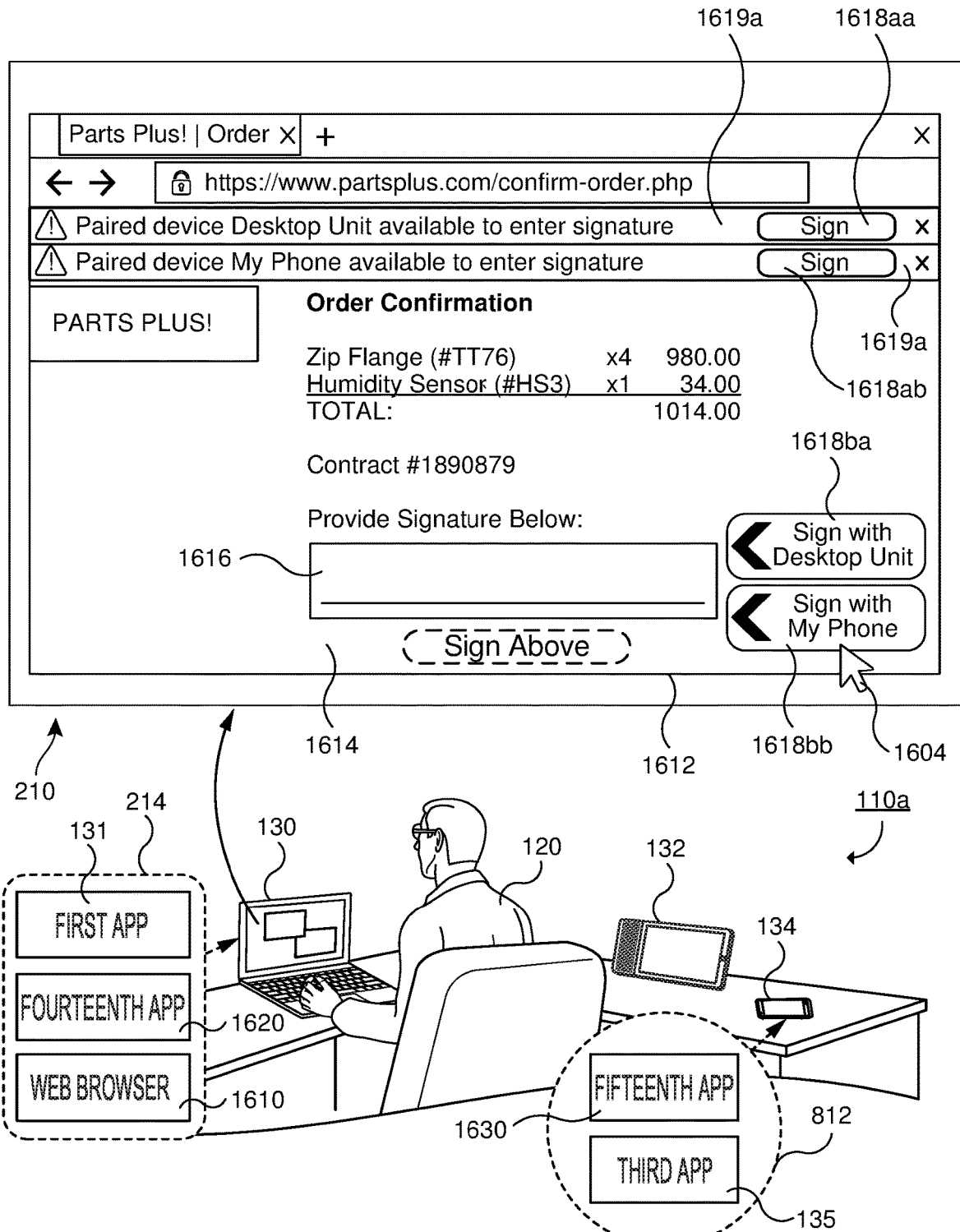
FIGS. 16A, 16B, and 16C illustrate a fourteenth example of the system shown in FIGS. 1-2B performing unified UI interactions for user activity across multiple devices included in an actively paired set, in which the first device initiates a user input operation on the third device resulting in a user input delivered from the third device to the initiating first device.
Figure 16B:
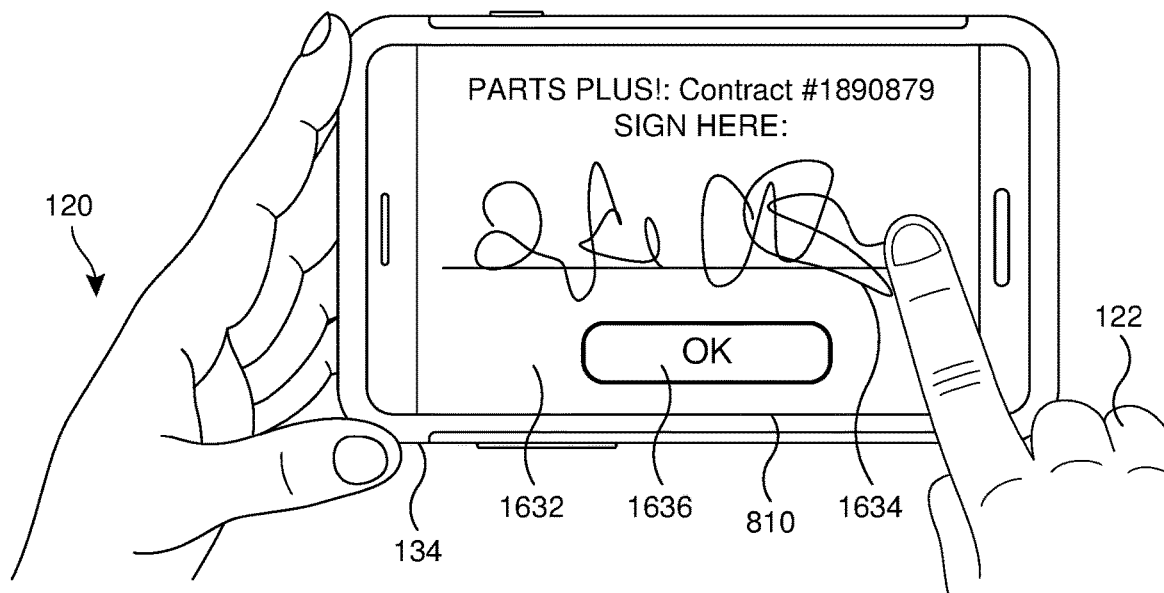
Figure 16C:
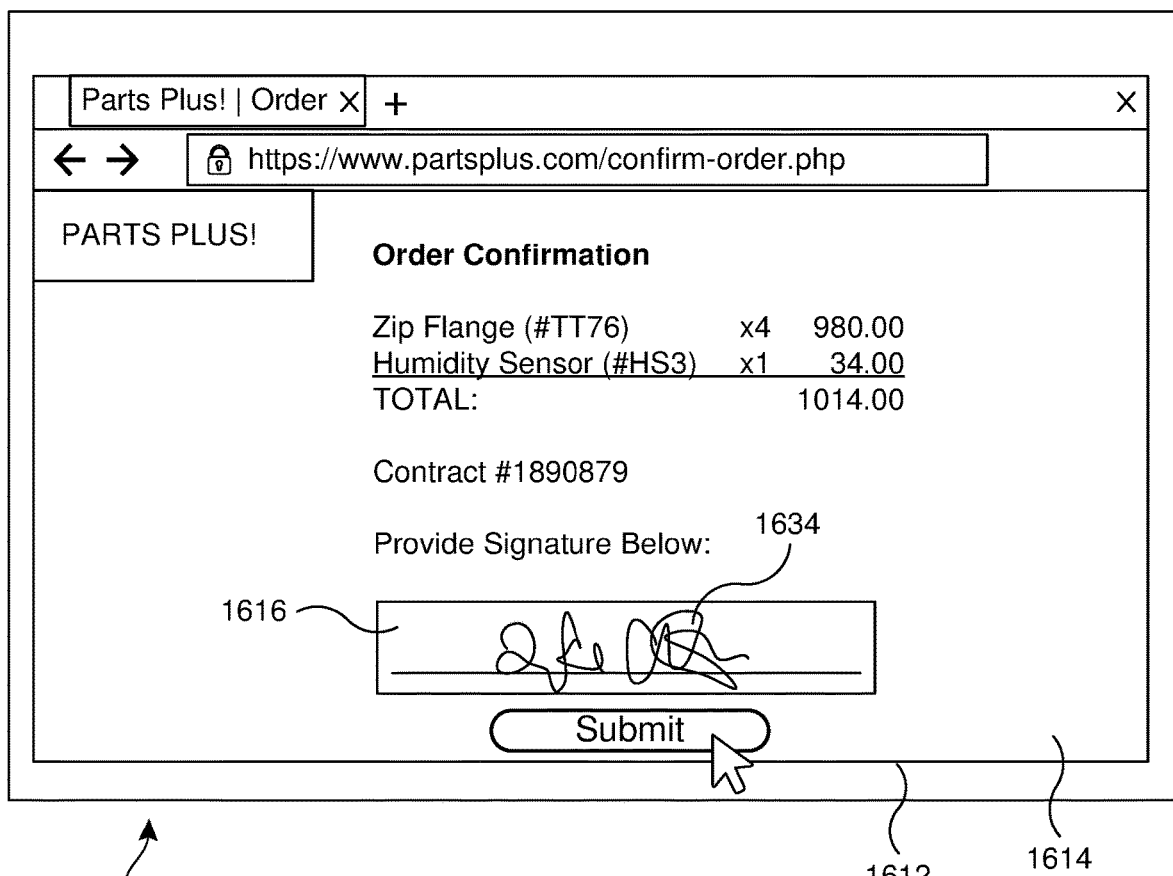

FIGS. 16A, 16B, and 16C illustrate a fourteenth example of the system 100 shown in FIGS. 1, 2A, and 2B performing unified UI interactions for user activity across multiple devices included in an actively paired set, in which the first device 130 initiates a user input operation on the third device 134 resulting in a user input delivered from the third device 134 to the initiating first device 130. The fourteenth example in FIGS. 16A-16C may be combined with any of the examples described in FIGS. 3A-15C. In FIGS. 16A-16C, the first device 130, the second device 132, and the third device 134 are included in an actively paired set.

In FIG. 16A, the first user 120 is accessing a website via a twenty-second UI 1612 presented on the first display 210 by a web browser application instance 1610 executing on the first device 130 (for example, in the execution environment 214). The twenty-second UI 1612 is rendering a second webpage 1614, which includes a signature entry element 1616. A pairing-aware fourteenth software program instance 1620 is configured to interact with the web browser application instance 1610 and the first software program instance 131. In some implementations, the thirteenth software program instance 1620 may operate as a plugin component for the web browser application instance 1610, and may be configured to identify the presence of a signature entry element in a webpage.

The system 100 is configured to determine if the actively paired set including the first device 130 includes one or more signature-entry-capable devices. The determination may be based on capability and/or configuration information obtained for the devices included in the actively paired set. In this example, both the second device 132 and the third device 134 are identified as signature-entry-capable devices. The system 100 is configured to, in response to both detecting a signature entry element in a webpage and identifying a signature-entry-capable device, present a corresponding signature entry UI control 1618 to allow the first user 120 to use the signature-entry-capable device for signature entry. In the example shown in FIG. 16A, two example signature entry UI controls 1618 are shown for the second device 132, including a signature entry UI control 1618*aa* in an information bar 1619*a* and a signature entry UI control 1618*ba* adjacent to the signature entry element 1616, and two example signature entry UI controls 1618 are shown for the third device 134, including a signature entry UI control 1618*ab* in an information bar 1619*b* and a signature entry UI control 1618*bb* adjacent to the signature entry element 1616. In some examples, a signature entry UI controls 1618 may be presented as a right click menu item and/or an mouseover item for the signature entry element 1616. In FIG. 15A, the signature entry UI control 1618*bb* for the third device 134 is actuated using a pointer 1604.

As shown in FIG. 16B, the system 100 is configured to, in response to the actuation of the signature entry UI control 1618*ab* or 1618*bb* for the third device 134, issue a message to the third device 134 requesting that the third device 134 obtain a signature from the first user 120. The third device 134 is configured to, in response to receiving this message (for example, via the third software program instance 135, present on the display 810 a twenty-third UI 1632 for a fifteenth software program instance 1630 executing on the third device 134. The fifteenth software program instance 1630 is configured to obtain a signature 1634 provided using the hand 122. The twenty-third UI 1632 includes a signature completion UI control 1636 to complete entry of the signature 1634 via the third device 134. In some examples, the second device 132 may be applied to similar effect in response to actuation of the of the signature entry UI control 1618*aa* or 1618*ba* for the second device 132. As shown in FIG. 16C, the system 100 is configured to, in response to actuation of the signature completion UI control 1636, transmit the signature 1634 from the third device 134 to the first device 130 and input the signature 1634 into the signature entry element 1634. Thus, as shown in FIGS. 16A-16C, the first user 120 is able to quickly and dynamically use a device with a touchscreen or other desirable input device for another device in an actively paired set lacking such an input device.

Figure 17:
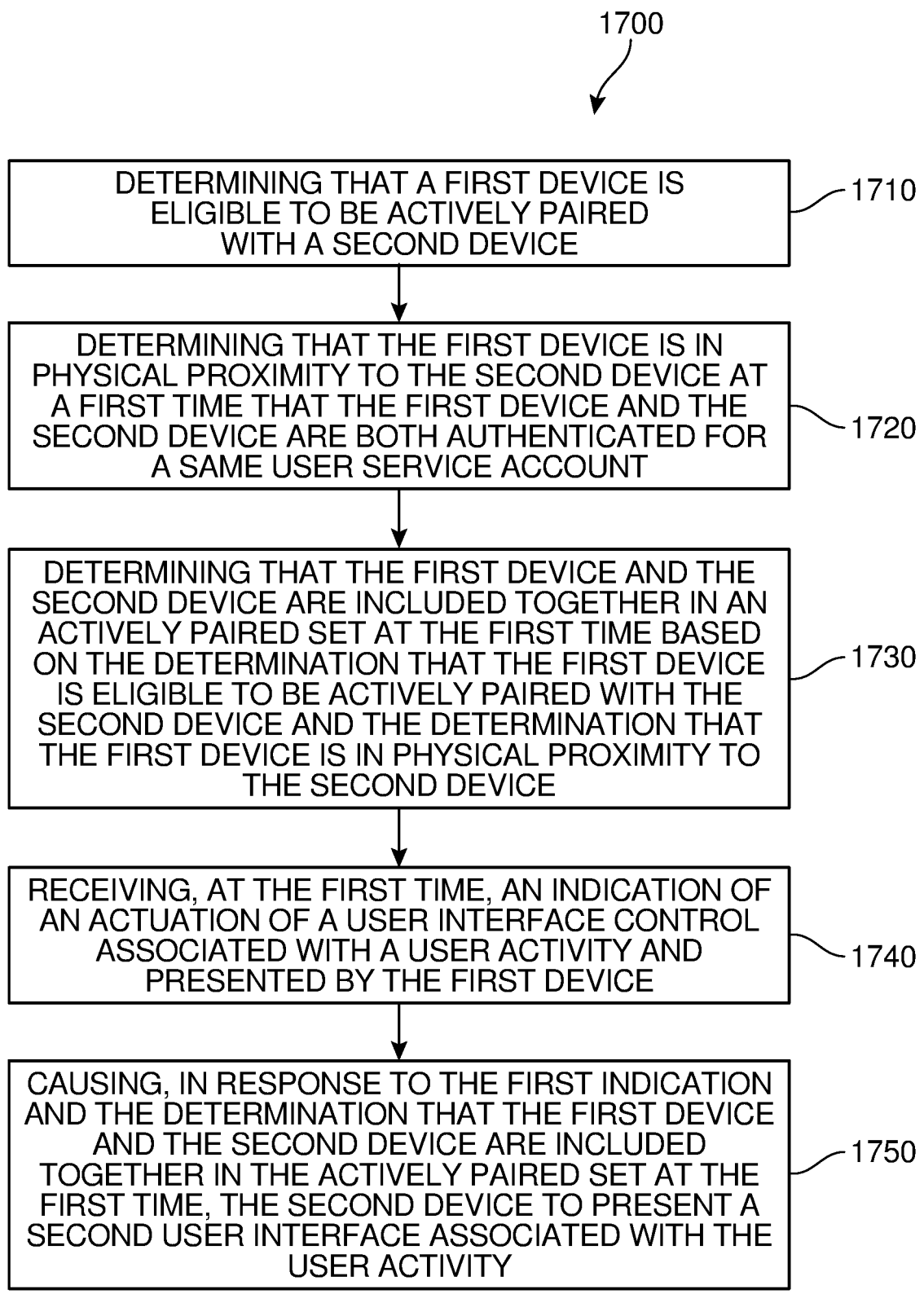
FIG. 17 is a flow chart illustrating an implementation of an example process for providing a unified user interface among actively paired user computing devices.

FIG. 17 is a flow chart illustrating an implementation of an example process 1700 for providing a unified user interface among actively paired user computing devices. In some examples, some or all of the process 1700 may be performed in combination with any of the features discussed in connection with FIGS. 1-16C, 50, and 51, although they may also be performed with any other features described herein. In FIG. 17, a first operation 1710 may include determining that a first user computing device is eligible to be actively paired with a second user computing device. In a second operation 1720, the process 1700 may include determining that the first user computing device is in physical proximity to the second user computing device at a first time that the first user computing device and the second user computing device are both authenticated for a same user service account. In a third operation 1730, the process 1700 may include determining that the first user computing device and the second user computing device are included together in an actively paired set at the first time based on the determination that the first user computing device is eligible to be actively paired with the second user computing device and the determination that the first user computing device is in physical proximity to the second user computing device. In a fourth operation 1740, the process 1700 includes receiving, at the first time, an indication of an actuation of a user interface control associated with a user activity and presented by the first user computing device. In a fifth operation 1750, the process 1700 includes causing, in response to the receipt of the indication and the determination that the first user computing device and the second user computing device are included together in the actively paired set at the first time, the second user computing device to present a second user interface associated with the user activity.

Figure 18:
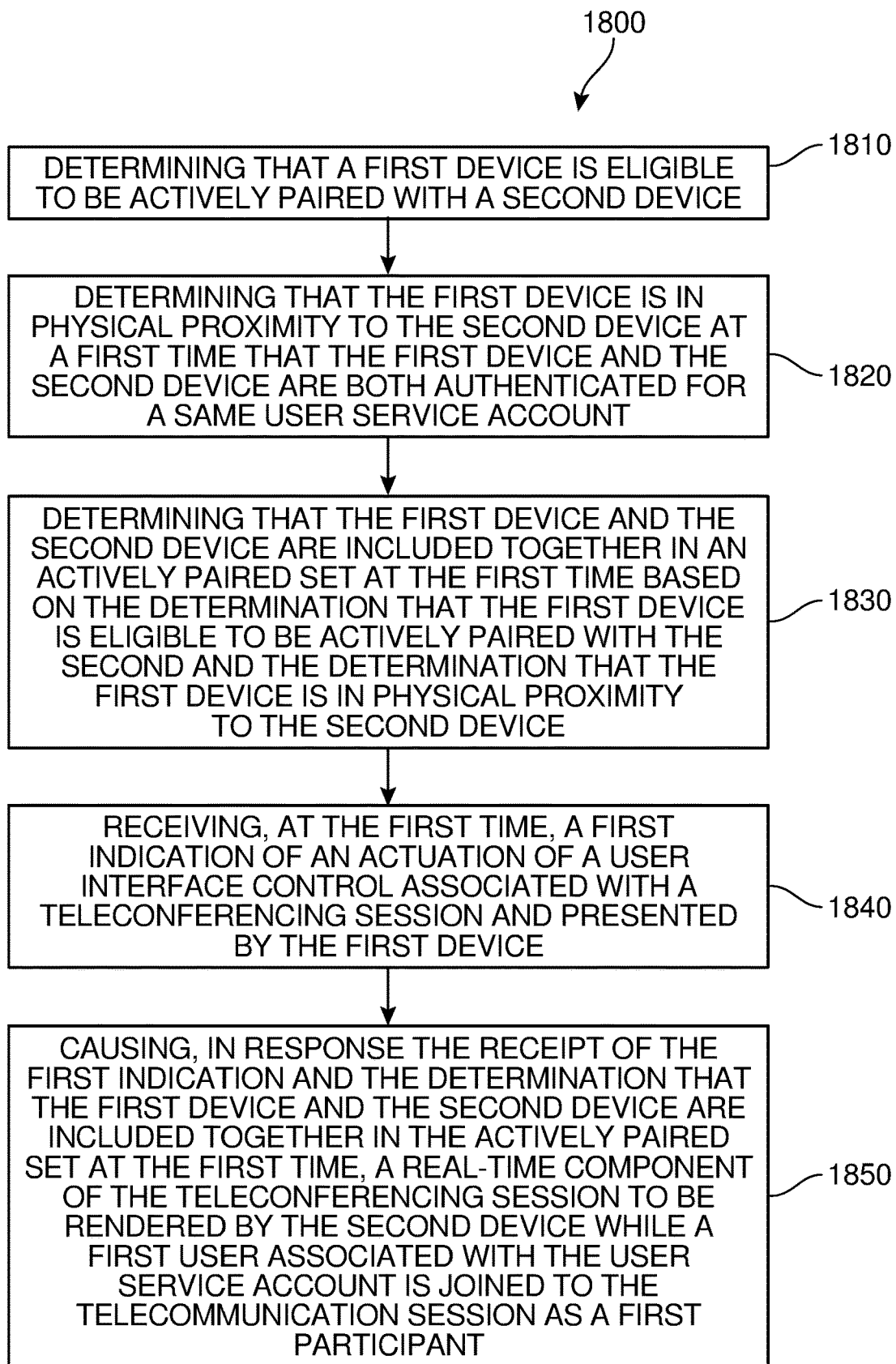
FIG. 18 is a flow chart illustrating an implementation of an example process for providing a unified user interface among actively paired user computing devices.

FIG. 18 is a flow chart illustrating an implementation of an example process 1800 for providing a unified user interface among actively paired user computing devices. In some examples, some or all of the process 1800 may be performed in combination with any of the features discussed in connection with FIGS. 1-16C, 50, and 51, although they may also be performed with any other features described herein. In FIG. 18, a first operation 1810 may include determining that a first user computing device is eligible to be actively paired with a second user computing device. In a second operation 1820, the process 1800 may include determining that the first user computing device is in physical proximity to the second user computing device at a first time that the first user computing device and the second user computing device are both authenticated for a same user service account. In a third operation 1830, the process 1800 may include determining that the first user computing device and the second user computing device are included together in an actively paired set at the first time based on the determination that the first user computing device is eligible to be actively paired with the second user computing device and the determination that the first user computing device is in physical proximity to the second user computing device. In a fourth operation 1840, the process 1800 includes receiving, at the first time, an indication of an actuation of a user interface control associated with a teleconferencing session and presented by the first user computing device. In a fifth operation 1850, the process 1800 includes causing, in response the receipt of the indication and the determination that the first user computing device and the second user computing device are included together in the actively paired set at the first time, a real-time component of the teleconferencing session to be rendered by the second user computing device while a first user associated with the user service account is joined to the teleconferencing session as a first participant.

The detailed examples of systems, devices, and techniques described in connection with FIGS. 1-18 are presented herein for illustration of the disclosure and its benefits. Such examples of use should not be construed to be limitations on the logical process embodiments of the disclosure, nor should variations of user interface methods from those described herein be considered outside the scope of the present disclosure. In some embodiments, various features described in FIGS. 1-18 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 19:
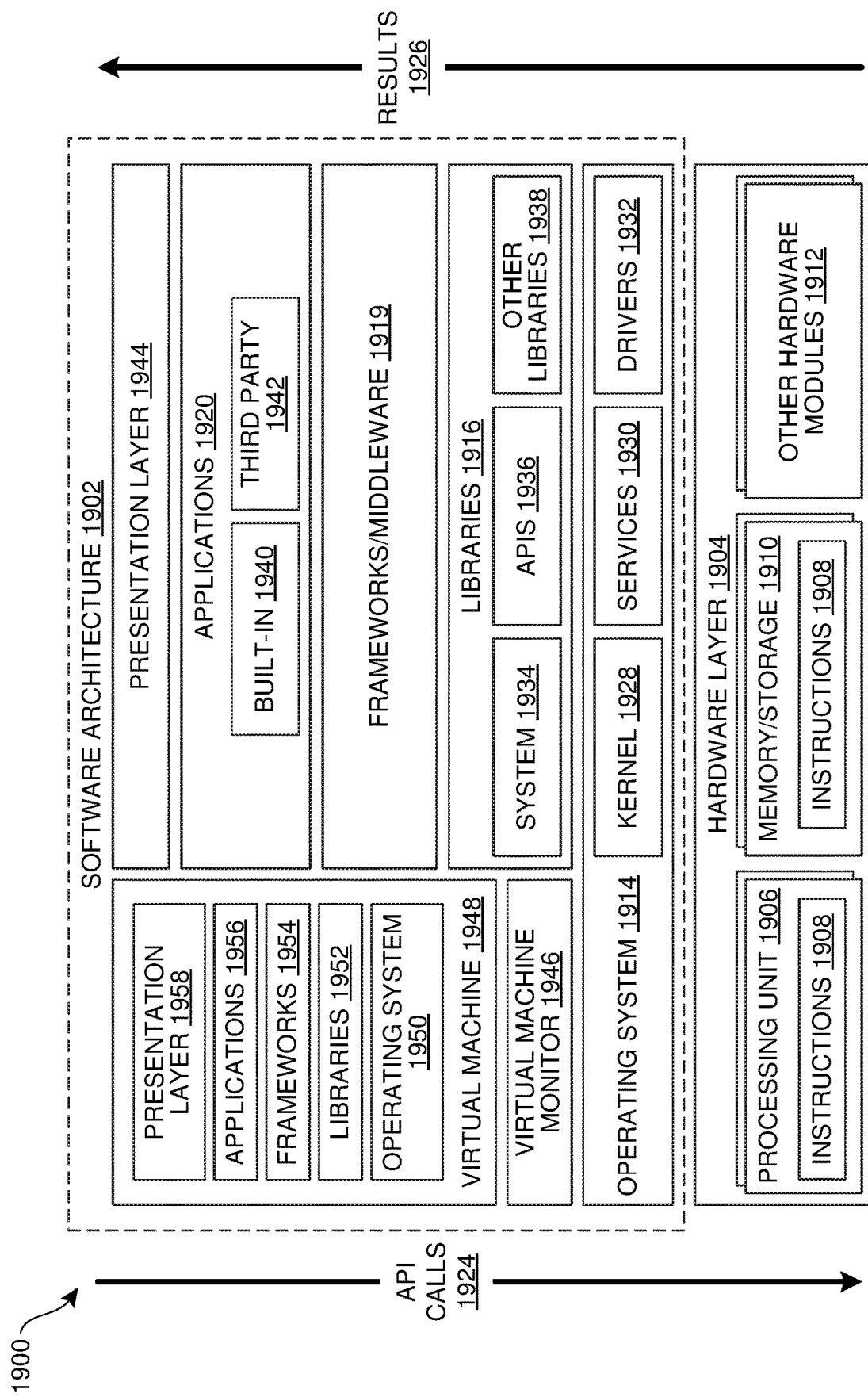
FIG. 19 is a block diagram illustrating an example software architecture, various portions of which may be used in conjunction with various hardware architectures herein described, which may implement any of the features herein described.

FIG. 19 is a block diagram 1900 illustrating an example software architecture 1902, various portions of which may be used in conjunction with various hardware architectures herein described, which may implement any of the above-described features. FIG. 19 is a non-limiting example of a software architecture and it will be appreciated that many other architectures may be implemented to facilitate the functionality described herein. The software architecture 1902 may execute on hardware such as a machine 2000 of FIG. 20 that includes, among other things, processors 2010, memory 2030, and input/output (I/O) components 2050. A representative hardware layer 1904 is illustrated and can represent, for example, the machine 2000 of FIG. 20. The representative hardware layer 1904 includes a processing unit 1906 and associated executable instructions 1908. The executable instructions 1908 represent executable instructions of the software architecture 1902, including implementation of the methods, modules and so forth described herein. The hardware layer 1904 also includes a memory/storage 1910, which also includes the executable instructions 1908 and accompanying data. The hardware layer 1904 may also include other hardware modules 1912. Instructions 1908 held by processing unit 1908 may be portions of instructions 1908 held by the memory/storage 1910.

The example software architecture 1902 may be conceptualized as layers, each providing various functionality. For example, the software architecture 1902 may include layers and components such as an operating system (OS) 1914, libraries 1916, frameworks 1918, applications 1920, and a presentation layer 1944. Operationally, the applications 1920 and/or other components within the layers may invoke API calls 1924 to other layers and receive corresponding results 1926. The layers illustrated are representative in nature and other software architectures may include additional or different layers. For example, some mobile or special purpose operating systems may not provide the frameworks/middleware 1918.

The OS 1914 may manage hardware resources and provide common services. The OS 1914 may include, for example, a kernel 1928, services 1930, and drivers 1932. The kernel 1928 may act as an abstraction layer between the hardware layer 1904 and other software layers. For example, the kernel 1928 may be responsible for memory management, processor management (for example, scheduling), component management, networking, security settings, and so on. The services 1930 may provide other common services for the other software layers. The drivers 1932 may be responsible for controlling or interfacing with the underlying hardware layer 1904. For instance, the drivers 1932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1916 may provide a common infrastructure that may be used by the applications 1920 and/or other components and/or layers. The libraries 1916 typically provide functionality for use by other software modules to perform tasks, rather than rather than interacting directly with the OS 1914. The libraries 1916 may include system libraries 1934 (for example, C standard library) that may provide functions such as memory allocation, string manipulation, file operations. In addition, the libraries 1916 may include API libraries 1936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1916 may also include a wide variety of other libraries 1938 to provide many functions for applications 1920 and other software modules.

The frameworks 1918 (also sometimes referred to as middleware) provide a higher-level common infrastructure that may be used by the applications 1920 and/or other software modules. For example, the frameworks 1918 may provide various graphic user interface (GUI) functions, high-level resource management, or high-level location services. The frameworks 1918 may provide a broad spectrum of other APIs for applications 1920 and/or other software modules.

The applications 1920 include built-in applications 1940 and/or third-party applications 1942. Examples of built-in applications 1940 may include, but are not limited to, a contacts application, a browser application, a location application, a media application, a messaging application, and/or a game application. Third-party applications 1942 may include any applications developed by an entity other than the vendor of the particular platform. The applications 1920 may use functions available via OS 1914, libraries 1916, frameworks 1918, and presentation layer 1944 to create user interfaces to interact with users.

Some software architectures use virtual machines, as illustrated by a virtual machine 1948. The virtual machine 1948 provides an execution environment where applications/modules can execute as if they were executing on a hardware machine (such as the machine 2000 of FIG. 20, for example). The virtual machine 1948 may be hosted by a host OS (for example, OS 1914) or hypervisor, and may have a virtual machine monitor 1946 which manages operation of the virtual machine 1948 and interoperation with the host operating system. A software architecture, which may be different from software architecture 1902 outside of the virtual machine, executes within the virtual machine 1948 such as an OS 1950, libraries 1952, frameworks 1954, applications 1956, and/or a presentation layer 1958.

Figure 20:
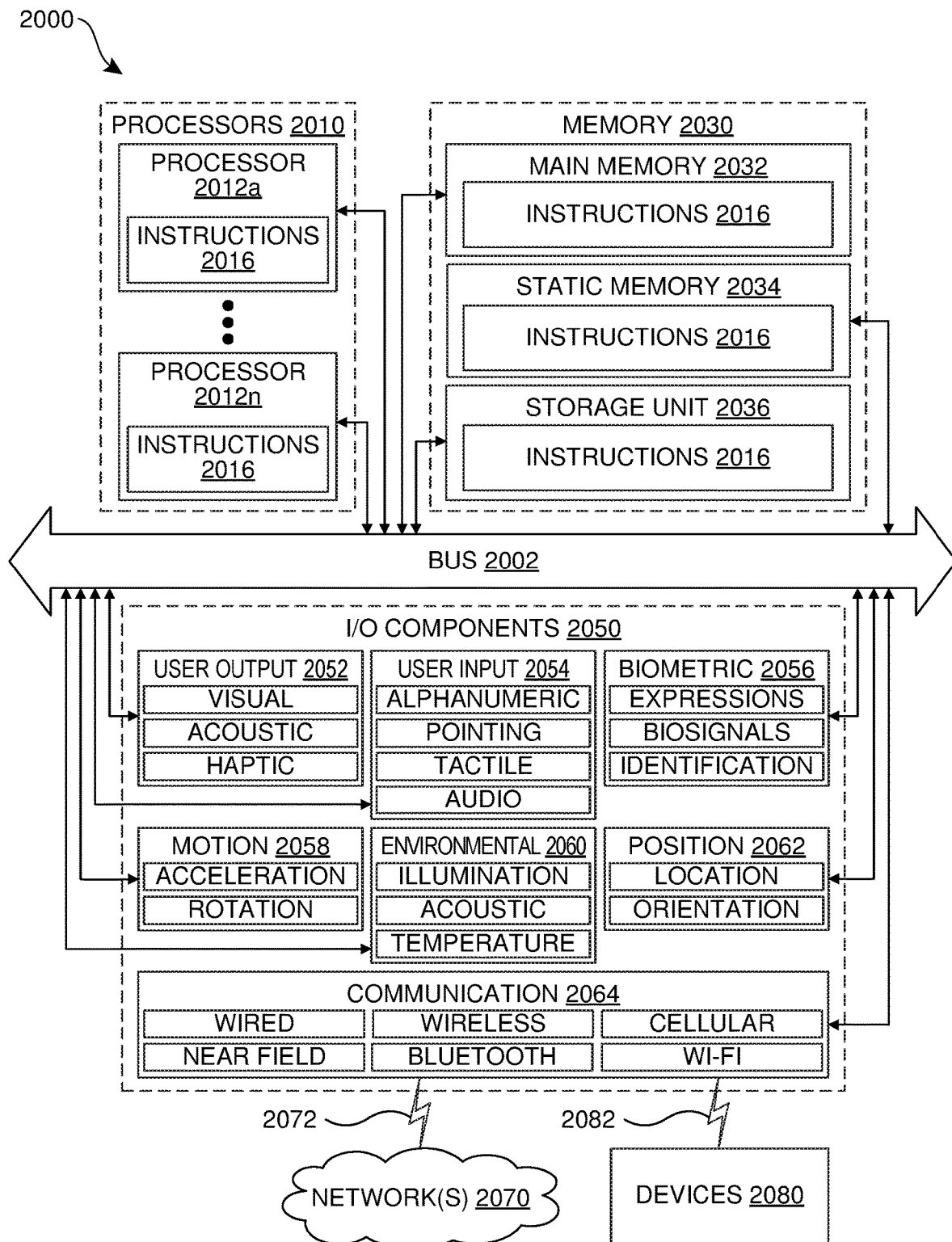
FIG. 20 is a block diagram illustrating components of an example machine configured to read instructions from a machine-readable medium and perform any of the features described herein.

FIG. 20 is a block diagram illustrating components of an example machine 2000 configured to read instructions from a machine-readable medium (for example, a machine-readable storage medium) and perform any of the features described herein. The example machine 2000 is in a form of a computer system, within which instructions 2016 (for example, in the form of software components) for causing the machine 2000 to perform any of the features described herein may be executed. As such, the instructions 2016 may be used to implement modules or components described herein. The instructions 2016 cause unprogrammed and/or unconfigured machine 2000 to operate as a particular machine configured to carry out the described features. The machine 2000 may be configured to operate as a standalone device or may be coupled (for example, networked) to other machines. In a networked deployment, the machine 2000 may operate in the capacity of a server machine or a client machine in a server-client network environment, or as a node in a peer-to-peer or distributed network environment. Machine 2000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 2000 is illustrated, the term "machine" include a collection of machines that individually or jointly execute the instructions 2016.

The machine 2000 may include processors 2010, memory 2030, and I/O components 2050, which may be communicatively coupled via, for example, a bus 2002. The bus 2002 may include multiple buses coupling various elements of machine 2000 via various bus technologies and protocols. In an example, the processors 2010 (including, for example, a central processing unit (CPU), a graphics processing unit (GPU), a digital signal processor (DSP), an ASIC, or a suitable combination thereof) may include one or more processors 2012a to 2012n that may execute the instructions 2016 and process data. In some examples, one or more processors 2010 may execute instructions provided or identified by one or more other processors 2010. The term "processor" includes a multi-core processor including cores that may execute instructions contemporaneously. Although FIG. 20 shows multiple processors, the machine 2000 may include a single processor with a single core, a single processor with multiple cores (for example, a multi-core processor), multiple processors each with a single core, multiple processors each with multiple cores, or any combination thereof. In some examples, the machine 2000 may include multiple processors distributed among multiple machines.

The memory/storage 2030 may include a main memory 2032, a static memory 2034, or other memory, and a storage unit 2036, both accessible to the processors 2010 such as via the bus 2002. The storage unit 2036 and memory 2032, 2034 store instructions 2016 embodying any one or more of the functions described herein. The memory/storage 2030 may also store temporary, intermediate, and/or long-term data for processors 2010. The instructions 2016 may also reside, completely or partially, within the memory 2032, 2034, within the storage unit 2036, within at least one of the processors 2010 (for example, within a command buffer or cache memory), within memory at least one of I/O components 2050, or any suitable combination thereof, during execution thereof. Accordingly, the memory 2032, 2034, the storage unit 2036, memory in processors 2010, and memory in I/O components 2050 are examples of machine-readable media.

As used herein, "machine-readable medium" refers to a device able to temporarily or permanently store instructions and data that cause machine 2000 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 2016) for execution by a machine 2000 such that the instructions, when executed by one or more processors 2010 of the machine 2000, cause the machine 2000 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 2050 may include a wide variety of hardware components adapted to receive input, provide output, produce output, transmit information, exchange information, capture measurements, and so on. The specific I/O components 2050 included in a particular machine will depend on the type and/or function of the machine. For example, mobile devices such as mobile phones may include a touch input device, whereas a headless server or IoT device may not include such a touch input device. The particular examples of I/O components illustrated in FIG. 20 are in no way limiting, and other types of components may be included in machine 2000. The grouping of I/O components 2050 are merely for simplifying this discussion, and the grouping is in no way limiting. In various examples, the I/O components 2050 may include user output components 2052 and user input components 2054. User output components 2052 may include, for example, display components for displaying information (for example, a liquid crystal display (LCD) or a projector), acoustic components (for example, speakers), haptic components (for example, a vibratory motor or force-feedback device), and/or other signal generators. User input components 2054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 2050 may include biometric components 2056, motion components 2058, environmental components 2060, and/or position components 2062, among a wide array of other physical sensor components. The biometric components 2056 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 2058 may include, for example, acceleration sensors (for example, an accelerometer) and rotation sensors (for example, a gyroscope). The environmental components 2060 may include, for example, illumination sensors, temperature sensors, humidity sensors, pressure sensors (for example, a barometer), acoustic sensors (for example, a microphone used to detect ambient noise), physical proximity sensors (for example, infrared sensing of nearby objects), and/or other components that may provide indications, measurements, or signals corresponding to a surrounding physical environment. The position components 2062 may include, for example, location sensors (for example, a Global Position System (GPS) receiver), altitude sensors (for example, an air pressure sensor from which altitude may be derived), and/or orientation sensors (for example, magnetometers).

The I/O components 2050 may include communication components 2064, implementing a wide variety of technologies operable to couple the machine 2000 to network(s) 2070 and/or device(s) 2080 via respective communicative couplings 2072 and 2082. The communication components 2064 may include one or more network interface components or other suitable devices to interface with the network(s) 2070. The communication components 2064 may include, for example, components adapted to provide wired communication, wireless communication, cellular communication, Near Field Communication (NFC), Bluetooth communication, Wi-Fi, and/or communication via other modalities. The device(s) 2080 may include other machines or various peripheral devices (for example, coupled via USB).

In some examples, the communication components 2064 may detect identifiers or include components adapted to detect identifiers. For example, the communication components 2064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 2062, such as, but not limited to, geo-location via Internet Protocol (IP) address, location via Wi-Fi, cellular, NFC, Bluetooth, or other wireless station identification and/or signal triangulation.

Copending and commonly owned U.S. Provisional Patent Application Ser. No. 62/929,744, filed on even date herewith, entitled "PROXIMITY-BASED PAIRING AND OPERATION OF USER-SPECIFIC COMPANION DEVICES" and is incorporated by reference herein to the extent not inconsistent herewith.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system comprising one or more processors and machine-readable media including instructions which, when executed by the one or more processors, cause the one or more processors to control the system to operate in two operation modes: a first operation mode not pairing a first user computing device with a second user computing device, and a second operation mode pairing the first user computing device with the second user computing device, wherein the system is configured to:
   determine an operation mode of the system by:
      determining whether the first user computing device is eligible to be paired with the second user computing device;
      determining whether the first user computing device is in physical proximity to the second user computing device;
      causing the system to operate in the first operation mode not pairing the second user computing device with the first user computing device when determining that the first user computing device is not eligible to be paired with the second user computing device, or when determining that the first user computing device is not in physical proximity to the second user computing device; and
      causing the system to operate in the second operation mode by pairing the first user computing device and the second user computing device when determining that the first user computing device is eligible to be paired with the second user computing device and that the first user computing device is in physical proximity to the second user computing device;
   receive a first indication of actuating a first operation via a first user interface associated with the first user computing device;
   perform the first operation to generate an operation result;
   responsive to the determined operation mode of the system being the first operation mode without pairing the second user computing device with the first user computing device, cause the operation result to be displayed exclusively on the first user computing device; and
   responsive to the determined operation mode of the system being the second operation mode pairing the first user computing device and the second user computing device, automatically cause the operation result to be displayed across the first user computing device and the second user computing device by:
      causing the first user computing device to display, via the first user interface, a first portion of the operation result, and
      causing the second user computing device to display, via a second user interface, a second portion of the operation result.

2. The system of claim 1, wherein pairing the first user computing device and the second user computing device comprises including the first and second user computing devices together in a first actively paired set at a first time, the instructions further cause the one or more processors to:
   determine that the first user computing device and the second user computing device have transitioned to be included together in the first actively paired set at a second time before the first time; and
   cause, in response to a determination that the first user computing device and the second user computing device have transitioned to be included together in the first actively paired set at the second time, the first user computing device to begin presenting the first user interface.

3. The system of claim 1, wherein pairing the first user computing device and the second user computing device comprises including the first and second user computing devices together in a first actively paired set at a first time, the instructions further cause the one or more processors to:
   determine that the first user computing device and the second user computing device are included together in a second actively paired set at a second time;
   transmit, in response to a determination that the first user computing device and the second user computing device are included together in the second actively paired set at the second time, a request message to the second user computing device requesting that the second user computing device begin presenting a third user interface associated with a second operation;
   receive a response message for the request message from the second user computing device, the response message indicating the second user computing device will not display the third user interface due to the second user computing device currently presenting a fourth user interface; and
   cause, in response to receipt of the response message, the first user computing device to begin presenting a fifth user interface associated with the second operation.

4. The system of claim 1, wherein pairing the first user computing device and the second user computing device comprises including the first and second user computing devices together in a first actively paired set at a first time, the instructions further cause the one or more processors to:
   determine that a third user computing device is included in a second actively paired set at a second time;
   determine that the third user computing device is in a locked state at the second time;
   cause, in response to a determination that the third user computing device is included in the second actively paired set at the second time and a determination that the third user computing device is in the locked state at the second time, the third user computing device to indicate the third user computing device is available for a second operation;

determine that the third user computing device is included in the second actively paired set at a third time after the second time;

determine that the third user computing device is not in the locked state at the third time; and cause, in response to a determination that the third user computing device is included in the second actively paired set at the second time and a determination that the third user computing device is not in the locked state at the third time, the third user computing device to present a third user interface associated with the second operation.

5. The system of claim 1, wherein pairing the first user computing device and the second user computing device comprises including the first and second user computing devices together in a first actively paired set at a first time, the instructions further cause the one or more processors to:

determine that the first user computing device, the second user computing device, and a third user computing device are included together in a second actively paired set at a second time; and in response to a determination that the first user computing device, the second user computing device, and the third user computing device are included together in the second actively paired set at the second time:

cause the first user computing device to present a third user interface associated with a second operation, cause the second user computing device to present a fourth user interface associated with the second operation, and cause the third user computing device to present a fifth user interface associated with the second operation.

6. The system of claim 1, wherein pairing the first user computing device and the second user computing device comprises including the first and second user computing devices together in a first actively paired set at a first time, the instructions further cause the one or more processors to:

determine that the first user computing device and a third user computing device are included together in a second actively paired set at a second time;

cause, in response to a determination that the first user computing device and the third user computing device are included together in the second actively paired set at the second time, the third user computing device to present a third user interface for obtaining a media item captured by the third user computing device;

receive a first media item obtained via the third user interface; and cause, in response to receipt of the first media item, the first user computing device to render the first media item.

7. The system of claim 1, wherein pairing the first user computing device and the second user computing device comprises including the first and second user computing devices together in a first actively paired set at a first time, the instructions further cause the one or more processors to:

determine that the first user computing device and the second user computing device are included together in the first actively paired set at a second time before the first time;

identify a first information item of a first information type in a document being rendered by the first user computing device at the second time;

cause, in response to an identification of the first information item and a determination that the first user computing device and the second user computing device are included together in the first actively paired set at the second time, the first user computing device to present an indication of availability of the second user computing device in association with the first information item and a first user interface control, wherein the first user interface control is for providing the first information item to the second user computing device; and cause, in response to presenting the indication of the availability of the second user computing device, the first information item to be provided to the second user computing device for use in presenting the second user interface.

8. The system of claim 1, wherein pairing the first user computing device and the second user computing device comprises including the first and second user computing devices together in a first actively paired set at a first time, the instructions further cause the one or more processors to:

determine that the first user computing device and the second user computing device are included together in the first actively paired set at a second time before the first time;

determine that the second user device can present a first document being presented by the first user computing device at the second time;

cause, in response to a determination that the first user computing device and the second user computing device are included together in the first actively paired set at the second time and a determination that the second user device can present the first document, the first user computing device to present an indication of availability of the second user computing device for presenting the first document and a first user interface control, wherein the first user interface control is for requesting the first document be presented by the second user computing device; and cause, in response to the indication of the availability of the second user computing device, the second user computing device to present the first document via the second user interface.

9. A method of providing a unified user interface among paired user computing devices by controlling the user computing devices to operate in two operation modes:

a first operation mode not pairing a first user computing device with a second user computing device, and a second operation mode pairing the first user computing device with the second user computing device, the method comprising:

determining an operation mode of the user computing devices by:

determining whether the first user computing device is eligible to be paired with the second user computing device;

determining whether the first user computing device is in physical proximity to the second user computing device;

causing the user computing devices to operate in the first operation mode not pairing the second user computing device with the first user computing device when determining that the first user computing device is not eligible to be paired with the second user computing device, or when determining that the first user computing device is not in physical proximity to the second user computing device; and causing the user computing devices to operate in the second operation mode by pairing the first user computing device and the second user computing device when determining that the first user computing device is eligible to be paired with the second user computing device and that the first user computing device is in physical proximity to the second user computing device;

receiving a first indication of actuating a first operation via a first user interface associated with the first user computing device;

performing the first operation to generate an operation result;

responsive to the determined operation mode of the user computing devices being the first operation mode without pairing the second user computing device with the first user computing device, causing the operation result to be displayed exclusively on the first user computing device; and responsive to the determined operation mode of the user computing devices being the second operation mode pairing the first user computing device and the second user computing device, automatically causing the operation result to be displayed across the first user computing device and the second user computing device by:

causing the first user computing device to display, via the first user interface, a first portion of the operation result, and causing the second user computing device to display, via a second user interface, a second portion of the operation result.

10. The method of claim 9, wherein pairing the first user computing device and the second user computing device comprises including the first and second user computing devices together in a first actively paired set at a first time, the method further comprising:

determining that the first user computing device and the second user computing device have transitioned to be included together in the first actively paired set at a second time before the first time; and causing, in response to a determination that the first user computing device and the second user computing device have transitioned to be included together in the first actively paired set at the second time, the first user computing device to begin presenting the first user interface.

11. The method of claim 9, wherein pairing the first user computing device and the second user computing device comprises including the first and second user computing devices together in a first actively paired set at a first time, the method further comprising:

determining that the first user computing device and the second user computing device have transitioned to not be included together in a second actively paired set at a second time before the first time; and in response to a determination that the first user computing device and the second user computing device have transitioned to not be included together in the second actively paired set at the second time:

causing the second user computing device to stop presenting a third user interface associated with a second operation, and causing the first user computing device to begin presenting a fourth user interface associated with the second operation.

12. The method of claim 9, wherein pairing the first user computing device and the second user computing device comprises including the first and second user computing devices together in a first actively paired set at a first time, the method further comprising:

determining that the first user computing device and the second user computing device are included together in a second actively paired set at a second time;

transmitting, in response to a determination that the first user computing device and the second user computing device are included together in the second actively paired set at the second time, a request message to the second user computing device requesting that the second user computing device begin presenting a third user interface associated with a second operation;

receiving a response message for the request message from the second user computing device, the response message indicating the second user computing device will not display the third user interface due to the second user computing device currently presenting a fourth user interface; and causing, in response to receipt of the response message, the first user computing device to begin presenting a fifth user interface associated with the second operation.

13. The method of claim 9, wherein pairing the first user computing device and the second user computing device comprises including the first and second user computing devices together in a first actively paired set at a first time, the method further comprising:

determining that the first user computing device and the second user computing device are included together in a second actively paired set at a second time;

transmitting, in response to a determination that the first user computing device and the second user computing device are included together in the second actively paired set at the second time, a request message to the second user computing device requesting the second device to begin presenting a third user interface;

receiving a response message from the second user computing device indicating that presentation by the second user computing device of a fourth user interface associated with a second operation is being stopped to present the third user interface; and causing, in response to receipt of the response message, the first user computing device to present a fifth user interface associated with the second operation.

14. The method of claim 9, wherein pairing the first user computing device and the second user computing device comprises including the first and second user computing devices together in a first actively paired set at a first time, the method further comprising:

determining that a third user computing device is included in a second actively paired set at a second time;

determining that the third user computing device is in a locked state at the second time;

causing, in response to a determination that the third user computing device is included in the second actively paired set at the second time and a determination that the third user computing device is in the locked state at the second time, the third user computing device to indicate the third user computing device is available for a second operation;

determining that the third user computing device is included in the second actively paired set at a third time after the second time;

determining that the third user computing device is not in the locked state at the third time; and causing, in response to a determination that the third user computing device is included in the second actively paired set at the second time and a determination that the third user computing device is not in the locked state at the third time, the third user computing device to present a third user interface associated with the second operation.

15. The method of claim 9, wherein pairing the first user computing device and the second user computing device comprises including the first and second user computing devices together in a first actively paired set at a first time, the method further comprising:

determining that the first user computing device, the second user computing device, and a third user computing device are included together in a second actively paired set at a second time; and in response to a determination that the first user computing device, the second user computing device, and the third user computing device are included together in the second actively paired set at the second time:

causing the first user computing device to present a third user interface associated with a second operation, causing the second user computing device to present a fourth user interface associated with the second operation, and causing the third user computing device to present a fifth user interface associated with the second operation.

16. The method of claim 9, wherein pairing the first user computing device and the second user computing device comprises including the first and second user computing devices together in a first actively paired set at a first time, the method further comprising:

determining that the first user computing device and a third user computing device are included together in a second actively paired set at a second time;

causing, in response to a determination that the first user computing device and the third user computing device are included together in the second actively paired set at the second time, the third user computing device to present a third user interface for obtaining a media item captured by the third user computing device;

receiving a first media item obtained via the third user interface; and causing, in response to receipt of the first media item, the first user computing device to render the first media item.

17. The method of claim 16, further comprising:

determining that the first user computing device and the third user computing device are included together in the second actively paired set at a third time before the second time; and causing, in response to a determination that the first user computing device and the third user computing device are included together in the second actively paired set at the third time, the first user computing device to present a user interface control for initiating presentation of the third user interface by the third user computing device.

18. The method of claim 9, wherein pairing the first user computing device and the second user computing device comprises including the first and second user computing devices together in a first actively paired set at a first time, the method further comprising:

determining that the first user computing device and the second user computing device are included together in the first actively paired set at a second time before the first time;

identifying a first information item of a first information type in a document being rendered by the first user computing device at the second time;

causing, in response to an identification of the first information item and a determination that the first user computing device and the second user computing device are included together in the first actively paired set at the second time, the first user computing device to present an indication of availability of the second user computing device in association with the first information item and a first user interface control, wherein the first user interface control is for providing the first information item to the second user computing device; and causing, in response to presenting the indication of the availability of the second user computing device, the first information item to be provided to the second user computing device for use in presenting the second user interface.

19. The method of claim 9, wherein pairing the first user computing device and the second user computing device comprises including the first and second user computing devices together in a first actively paired set at a first time, the method further comprising:

determining that the first user computing device and the second user computing device are included together in the first actively paired set at a second time before the first time;

determining that the second user device can present a first document being presented by the first user computing device at the second time;

causing, in response to a determination that the first user computing device and the second user computing device are included together in the first actively paired set at the second time and a determination that the second user device can present the first document, the first user computing device to present an indication of availability of the second user computing device for presenting the first document and a first user interface control, wherein the first user interface control is for requesting the first document be presented by the second user computing device; and causing, in response to the indication of the availability of the second user computing device, the second user computing device to present the first document via the second user interface.

20. The method of claim 9, wherein pairing the first user computing device and the second user computing device comprises including the first and second user computing devices together in a first actively paired set at a first time, the method further comprising:

determining that the first user computing device and the second user computing device are included together in the first actively paired set at a second time before the first time;

determining that the second user device can present a first content element included in a file being presented by the first user computing device at the second time;

causing, in response to a determination that the first user computing device and the second user computing device are included together in the first actively paired set at the second time and a determination that the second user device can present the first content element, the first user computing device to present an indication of availability of the second user computing device for presenting the first content element and a first user interface control, wherein the first user interface control is for requesting the first content element be presented by the second user computing device; and
causing, in response to the indication of the availability of the second user computing device, the second user computing device to present the first content element via the second user interface.

\* \* \* \* \*